United States Patent
Li

(10) Patent No.: US 11,647,196 B2
(45) Date of Patent: May 9, 2023

(54) METHOD AND APPARATUS FOR ENCODING IMAGE, METHOD AND APPARATUS FOR DECODING IMAGE, ELECTRONIC DEVICE, AND SYSTEM

(71) Applicant: ZTE CORPORATION, Guangdong (CN)

(72) Inventor: Ming Li, Guangdong (CN)

(73) Assignee: ZTE CORPORATION, Guangdong (CN)

( * ) Notice: Subject to any disclaimer, the term of this patent is extended or adjusted under 35 U.S.C. 154(b) by 0 days.

(21) Appl. No.: 17/255,044

(22) PCT Filed: May 24, 2019

(86) PCT No.: PCT/CN2019/088325
§ 371 (c)(1),
(2) Date: Dec. 22, 2020

(87) PCT Pub. No.: WO2020/001210
PCT Pub. Date: Jan. 2, 2020

(65) Prior Publication Data
US 2021/0168369 A1 Jun. 3, 2021

(30) Foreign Application Priority Data

Jun. 27, 2018 (CN) .......................... 201810681664.7

(51) Int. Cl.
*H04N 19/129* (2014.01)
*H04N 19/117* (2014.01)
(Continued)

(52) U.S. Cl.
CPC ......... *H04N 19/129* (2014.11); *H04N 19/117* (2014.11); *H04N 19/159* (2014.11); *H04N 19/176* (2014.11)

(58) Field of Classification Search
CPC .. H04N 19/129; H04N 19/117; H04N 19/159; H04N 19/176
See application file for complete search history.

(56) References Cited

U.S. PATENT DOCUMENTS

2007/0230564 A1* 10/2007 Chen .................. H04N 21/2662
375/E7.199
2010/0322306 A1* 12/2010 Au ........................ H04N 19/14
375/240.03
(Continued)

FOREIGN PATENT DOCUMENTS

CN 102685503 A 9/2012
CN 105872539 A 8/2016
(Continued)

OTHER PUBLICATIONS

International Search Report for the International Patent Application No. PCT/CN2019/088325, dated Aug. 14, 2019, 2 pages.
(Continued)

*Primary Examiner* — Dave Czekaj
*Assistant Examiner* — Shanika M Brumfield
(74) *Attorney, Agent, or Firm* — KDW Firm PLLC

(57) ABSTRACT

Provided are a method and apparatus for encoding a picture, a method and apparatus for decoding a picture, an electronic device, and a system. The method for encoding a picture includes: determining a prediction value of an encoded block, and calculating a prediction residual between the encoded block and the prediction value; performing a transformation on the prediction residual at least once to obtain transform data, and determining transform coefficients using the transform data; determining a scanning mode of the transform coefficients and a size of the coefficient group of the transform coefficients, dividing the transform coefficients into at least one coefficient group, scanning transform coefficients comprised in each of the at least one coefficient (Continued)

group according to the scanning mode, and converting the transform coefficients into at least one syntax element; and encoding the size of the coefficient group and a value of the at least one syntax element, and writing encoded bits to a code stream.

18 Claims, 8 Drawing Sheets

(51) Int. Cl.
*H04N 19/159* (2014.01)
*H04N 19/176* (2014.01)

(56) References Cited

U.S. PATENT DOCUMENTS

| | | | |
|---|---|---|---|
| 2011/0206135 A1* | 8/2011 | Drugeon | H04N 19/129 |
| | | | 375/E7.026 |
| 2011/0249726 A1* | 10/2011 | Nguyen | H04N 19/61 |
| | | | 375/240.03 |
| 2012/0163455 A1* | 6/2012 | Zheng | H04N 19/134 |
| | | | 375/E7.243 |
| 2013/0202029 A1 | 8/2013 | Lou et al. | |
| 2016/0353111 A1 | 12/2016 | Zhang et al. | |
| 2016/0353113 A1* | 12/2016 | Zhang | H04N 19/174 |
| 2017/0332098 A1* | 11/2017 | Rusanovskyy | H04N 19/126 |
| 2018/0152704 A1 | 5/2018 | Nguyen et al. | |
| 2018/0176581 A1 | 6/2018 | Huang et al. | |
| 2019/0082179 A1* | 3/2019 | Ahn | H04N 19/124 |
| 2019/0306536 A1* | 10/2019 | Lim | H04N 19/182 |

FOREIGN PATENT DOCUMENTS

| | | |
|---|---|---|
| CN | 107660339 A | 2/2018 |
| JP | 2013110740 A | 6/2013 |
| JP | 2018521554 A | 8/2018 |
| KR | 20170106592 A | 9/2017 |
| KR | 20180013910 A | 2/2018 |
| KR | 20180061046 A | 6/2018 |
| WO | 2016205999 A1 | 12/2016 |

OTHER PUBLICATIONS

First Official Action for Japanese Patent Application No. 2020-571788 dated dated Mar. 8, 2022 (18 pages).
Supplementary Partial European Search Report for EP19826712 dated Mar. 14, 2022 (12 pages).
Nguyen et al., Multi-level significance maps for Large Transform Units, Joint Collaborative Team on Video Coding (JCT-VC) of ITU-T SG16 WP3 and ISO/IEC JTC1/SC29/WG11 7th Meeting: Geneva, Nov. 21-30, 2011, [JCTVC-G644], JCTVC-G644 (version 5), ITU-T, Nov. 26, 2011, <URL:http://phenix.it-sudparis.eu/jct/doc_end_user/documents/7_Geneva/wg11/JCTVC-G65-v5.zip>: JCTVC-G644.
Series H: Audiovisual and Multimedia Systems Infrastructure of audiovisual services—Coding of moving video, Recommendation ITU-TH.265 (Apr. 2013) High efficiency video coding,ITU T, 2013 years, 06 months, 07 days, <URL: https://www.itu.int/rec/dologin_pub.asp?lang=e&id=T-R.265-R.201304 S!PDF-E&type=items>.
Second Official Action for Japanese Patent Application No. 2020-571788 dated dated Oct. 18, 2022 (18 pages).
Request for the Submission of an Opinion dated Feb. 14, 2023, for Korean Patent Application No. 10-2021-7002590 (19 pages).

* cited by examiner

METHOD AND APPARATUS FOR ENCODING IMAGE, METHOD AND APPARATUS FOR DECODING IMAGE, ELECTRONIC DEVICE, AND SYSTEM

CROSS-REFERENCE TO RELATED APPLICATIONS

This is a National Stage Application, filed under 35 U.S.C. 371, of International Patent Application No. PCT/CN2019/088325, filed on May 24, 2019, which is based on and claims priority to Chinese Patent Application No. 201810681664.7 filed with the CNIPA Jun. 27, 2018, the disclosures of which are incorporated herein by reference in their entireties.

TECHNICAL FIELD

The present application relates to the field of communications, and specifically, relates to a method and apparatus for encoding a picture, a method and apparatus for decoding a picture, an electronic device, and a system.

BACKGROUND

Digital video and picture compression coding techniques remove redundancy present in video and pictures using the correlation between sample values of pixels in video and pictures. The picture compression technology reduces the redundancy between two adjacent pixels in the spatial domain in a manner of predicting to-be-encoded pixels using adjacent encoded pixels based on the correlation in the spatial domain between the samples of adjacent pixels in the picture. This kind of manner is often referred to as Intra Prediction. Digital video consists of a series of consecutive pictures. In addition to the correlation between adjacent pixels in the spatial domain in a single-frame picture, the digital video compression technology also adopts the correlation between adjacent pictures in the time domain, for example, by using the manners of motion estimation and motion compensation, to predict the current encoded picture by using the encoded picture as a reference. This kind of manner is often called Inter Prediction.

In the encoding process, through the manners of intra prediction and inter prediction, the encoder determines a prediction value of an encoded block, calculates a residual between the encoded block sample and the prediction value, and uses the residual as the prediction residual of the encoded block. To further reduce the spatial domain redundancy present in the prediction residual, the encoder may perform the transform on the prediction residual. Generally, the prediction residual of the encoded block may be represented as an M×N two-dimensional matrix, where both M and N are positive integers, and M and N may be equal or unequal. The encoder transforms this two-dimensional matrix and performs processing the data in the transformed two-dimensional matrix to obtain transform coefficients on which the entropy encoding is to be performed. For example, in the H.265/HEVC standard, and the processing may be to perform quantization on the data or not to perform quantization on the data. The encoder scans the transform coefficients represented by the two-dimensional matrix and encodes the transform coefficients. In the H.265/HEVC standard, the two-dimensional matrix of the encoder transform coefficients is divided into one or more 4×4 fixed-size coefficient groups (CGs). The encoder encodes the transform coefficients in the 4×4 blocks sequentially using a specified scanning order. The main defect of this method is that the use of the fixed-size coefficient group does not allow the encoder to choose the most efficient way to encode coefficients according to the distribution of transform coefficients in the two-dimensional matrix. For example, when the size of the coefficient group is fixed to 4×4 blocks, a flag bit is required to encoded, in a coefficient scanning order (actually in the inverse order), for each of coefficient groups starting with the coefficient group including the last non-zero coefficient to indicate whether this coefficient group includes a non-zero transform coefficient. In this way, the overhead for encoding the flag bit becomes high when there are a large number of non-zero coefficients in the transform coefficient matrix.

SUMMARY

Embodiments of the present disclosure provide a method and apparatus for encoding a picture, a method and apparatus for decoding a picture, an electronic device, and a system, to at least solve the problem in the related art that the fixed-size coefficient group does not allow the encoder to choose the most efficient way to encode coefficients according to the distribution of transform coefficients in the two-dimensional matrix.

According to an embodiment of the present application, a method for encoding a picture is provided. The method includes: determining a prediction value of an encoded block, and calculating a prediction residual between the encoded block and the prediction value; performing a transformation on the prediction residual at least once to obtain transform data, and determining transform coefficients using the transform data; determining a scanning mode of the transform coefficients and a size of the coefficient group of the transform coefficients, dividing the transform coefficients into one or more coefficient groups, scanning transform coefficients included in each coefficient group according to the scanning mode, and converting the transform coefficients into one or more syntax elements; and encoding the size of the coefficient group and values of one or more syntax elements, and writing encoded bits to a code stream.

Optionally, the step of determining the prediction value of the encoded block includes at least one of the following: determining the prediction value of the encoded block by using one or more encoded pictures as reference pictures; or, determining the prediction value of the encoded block by using an encoded portion of a picture where the encoded block is located as a reference.

Optionally, the step of determining the transform coefficients using the transform data includes: in response to determining to perform quantification on the transform data, performing quantification processing on the transform data to obtain the transform coefficients; and in response to determining not to perform quantification on the transform data, setting the transform coefficients using the transform data.

Optionally, the step of determining the size of the coefficient group of the transform coefficients includes: determining the size of the coefficient group of the transform coefficients according to preset candidate values.

Optionally, the step of determining the size of the coefficient group of the transform coefficients according to the preset candidate values includes: determining the size of the coefficient group of the transform coefficients from the preset candidate values using a rate-distortion optimization method.

Optionally, the number of encoded bits of the transform coefficients when a value in the candidate values is used as the size of the coefficient group is calculated, and a value that minimizes the number of encoded bits is selected from the candidate values as the size of the coefficient group of the transform coefficients.

Optionally, the step of determining the size of the coefficient group of the transform coefficients according to the preset candidate values includes: determining the size of the coefficient group of the transform coefficients according to distribution of the transform coefficients.

Optionally, the distribution of the transform coefficients refers to a concentration degree of non-zero coefficients in the transform coefficients detected after the transform coefficients are scanned, where the concentration degree of the non-zero coefficients refers to the number of zero coefficients among the non-zero coefficients in the transform coefficients, and the smaller the number of the zero coefficients, the higher the concentration degree of non-zero coefficients; and a value of the candidate value that is capable of making the concentration degree the highest is selected from the candidate values as the size of the coefficient group of the transform coefficients. Optionally, the candidate values include at least one of: one or more fixed values, one or more configured values, or a value of a size of a coefficient group used by an encoded block adjacent to the encoded block.

Optionally, when the preset candidate values are one or more configured values, the method further includes: writing an identification parameter of the candidate values into one or more data units in the code stream, where the identification parameter is used for indicating one or more configured candidate values, and the one or more data units in the code stream include at least one of: one or more parameter sets, a slice header, or a block layer data unit.

Optionally, the identification parameter of the preset candidate values of the coefficient group includes at least one of: a size of a coefficient group, a side length of a coefficient group, or a width and a height of a coefficient group.

Optionally, the identification parameter is written into the code stream in one or more of the following manners: writing maximum and minimum values of the identification parameter into the code stream; writing the maximum value of the identification parameter and a maximum division hierarchy of the coefficient group into the code stream; writing the maximum value of the identification parameter and a difference between maximum and minimum values of the size of the coefficient group into the code stream; writing the minimum value of the identification parameter and a maximum upward division hierarchy of the coefficient group into the code stream; or writing the minimum value of the identification parameter and the difference between maximum and minimum values of the size of the coefficient group into the code stream.

Optionally, the step in which the identification parameter is written into the code stream in one or more of the following manners further includes: writing a default value of the identification parameter into the code stream.

Optionally, the identification parameter of the preset candidate values of the size of the coefficient group includes one or more flag bits indicating whether a corresponding size of the coefficient group is a size of the coefficient group included in the candidate values.

Optionally, the identification parameter of the preset candidate values of the size of the coefficient group indicates the size of the one or more coefficient groups corresponding to one or more preset prediction modes.

Optionally, the identification parameter of the preset candidate values of the size of the coefficient group indicates the size of the one or more coefficient groups corresponding to one or more preset transforms.

Optionally, the identification parameter of the preset candidate values of the size of the coefficient group indicates the size of the one or more coefficient groups corresponding to one or more preset transform types.

Optionally, the identification parameter of the preset candidate values of the size of the coefficient group indicates the size of the one or more coefficient groups corresponding to one or more preset quantization parameters; or the identification parameter indicates the size of the one or more coefficient groups corresponding to one or more preset quantization parameter value ranges.

Optionally, the identification parameter of the preset candidate values of the size of the coefficient group indicates the size of the one or more coefficient groups corresponding to a preset profile/tier/level.

Optionally, the step of determining the size of the coefficient group of the transform coefficients includes: setting, according to a first encoding parameter of the encoded block, the size of the coefficient group of the transform coefficients in the encoded block as a size of the coefficient group corresponding to the first encoding parameter, where the first encoding parameter includes at least one of: a size of a transform block included in the encoded block, a prediction mode of the encoded block, a transform type used by the transform block included in the encoded block, or a quantization parameter.

Optionally, the step of setting, according to the first encoding parameter of the encoded block, the size of the coefficient group of the transform coefficients in the encoded block as the size of the coefficient group corresponding to the first encoding parameter includes: in response to the size of the transform block included in the encoded block being equal to a first preset value, setting the size of the coefficient group as a size of the coefficient group corresponding to the first preset value.

Optionally, the step of setting, according to the first encoding parameter of the encoded block, the size of the coefficient group of the transform coefficients in the encoded block as the size of the coefficient group corresponding to the first encoding parameter includes: in response to the prediction mode of the encoded block being equal to a first preset mode, setting the size of the coefficient group as a size of the coefficient group corresponding to the first preset mode.

Optionally, the step of setting, according to the first encoding parameter of the encoded block, the size of the coefficient group of the transform coefficients in the encoded block as the size of the coefficient group corresponding to the first encoding parameter includes: when the transform type used by the transform block included in the encoded block is equal to a first transform type, setting the size of the coefficient group as a size of the coefficient group corresponding to the first transform type.

Optionally, the step of setting, according to the first encoding parameter of the encoded block, the size of the coefficient group of the transform coefficients in the encoded block as the size of the coefficient group corresponding to the first encoding parameter includes: when a value of the quantization parameter is equal to a second preset value, setting the size of the coefficient group as a size of the coefficient group corresponding to the second preset value; or when the value of the quantization parameter is within a first preset value range, setting the size of the coefficient group as a size of the coefficient group corresponding to the first preset value range.

Optionally, the step of determining the scanning mode of the transform coefficients includes: determining a scanning mode for the transform coefficients according to preset candidate scanning modes, where the scanning mode is an order to process elements in a two-dimensional matrix of the transform coefficients.

Optionally, the step of determining the scanning mode for the transform coefficients according to the preset candidate scanning modes includes: determining the scanning mode of the transform coefficients from the preset candidate scanning modes using a rate-distortion optimization method.

Optionally, the number of encoded bits of the transform coefficients when a scanning mode in the candidate scanning modes is used is calculated, and a scanning mode that minimizes the number of encoded bits is selected from the candidate scanning modes as the scanning mode of the transform coefficients.

Optionally, the step of determining the scanning mode for the transform coefficients according to the preset candidate scanning modes includes: determining the scanning mode of the transform coefficients according to distribution of the transform coefficients.

Optionally, the distribution of the transform coefficients refers to a concentration degree of non-zero coefficients in the transform coefficients detected after the transform coefficients are scanned, where the concentration degree of the non-zero coefficients refers to a number of zero coefficients among the non-zero coefficients in the transform coefficients, and the smaller the number of the zero coefficients, the higher the concentration degree of non-zero coefficients; and a scanning mode in the candidate value that is capable of making the concentration degree the highest is selected from the preset candidate scanning modes as the scanning mode of the transform coefficients.

Optionally, the candidate scanning modes include at least one of: one or more fixed scanning modes, one or more configured scanning modes, or a scanning mode used by an encoded block adjacent to the encoded block.

Optionally, when the preset candidate scanning modes are one or more configured scanning modes, the method further includes: writing a candidate scanning mode parameter into one or more data units in the code stream, where the candidate scanning mode parameter is used for indicating the configured candidate scanning mode, and the data unit in the code stream includes at least one of: one or more parameter sets, a slice header, or a block layer data unit.

Optionally, the candidate scanning mode parameter further includes an order to process the elements in the two-dimensional matrix of the transform coefficients.

Optionally, the candidate scanning mode parameter further includes a default value of the candidate scanning mode parameter.

Optionally, the candidate scanning mode parameter includes one or more flag bits indicating whether a corresponding scanning mode is included in the candidate scanning modes.

Optionally, the candidate scanning mode parameter indicates one or more scanning modes corresponding to one or more preset prediction modes.

Optionally, the candidate scanning mode parameter one or more scanning modes corresponding to one or more preset transforms.

Optionally, the candidate scanning mode parameter indicates one or more scanning modes corresponding to one or more preset transform types.

Optionally, the candidate scanning mode parameter indicates one or more scanning modes corresponding to one or more preset quantization parameters, or that the candidate scanning mode parameter indicates one or more scanning modes corresponding to one or more preset quantization parameter value ranges.

Optionally, the candidate scanning mode parameter indicates one or more scanning modes corresponding to a preset profile/tier/level.

Optionally, the step of determining the scanning mode of the transform coefficients includes: setting, according to a second encoding parameter of the transform block, the scanning mode of the transform coefficients in the encoded block as a scanning mode of a coefficient group corresponding to the second encoding parameter; where the second encoding parameter includes at least one of: a size of a transform block included in the encoded block, a prediction mode of the encoded block, a transform type used by the transform block included in the encoded block, or a size of the encoded block, and the scanning mode is an order to process elements in a two-dimensional matrix of the transform coefficients.

Optionally, the step of setting, according to the second encoding parameter of the transform block, the scanning mode of the transform coefficients in the encoded block as the scanning mode of the coefficient group corresponding to the second encoding parameter includes: in response to the size of the transform block included in the encoded block being equal to a third preset value, setting the scanning mode of the transform coefficients as a scanning mode corresponding to the third preset value.

Optionally, the step of setting, according to the second encoding parameter of the transform block, the scanning mode of the transform coefficients in the encoded block as the scanning mode of the coefficient group corresponding to the second encoding parameter includes: in response to the prediction mode of the encoded block being equal to a second preset mode, setting the scanning mode of the transform coefficients as a scanning mode corresponding to the second preset mode.

Optionally, the step of setting, according to the second encoding parameter of the transform block, the scanning mode of the transform coefficients in the encoded block as the scanning mode of the coefficient group corresponding to the second encoding parameter includes: when the transform type used by the transform block included in the encoded block is equal to a second transform type, setting the scanning mode of the transform coefficients as a scanning mode corresponding to the second transform type.

Optionally, the step of setting, according to the second encoding parameter of the transform block, the scanning mode of the transform coefficients in the encoded block as the scanning mode of the coefficient group corresponding to the second encoding parameter includes: when the size of the encoded block is equal to a fourth preset value, setting the scanning mode of the transform coefficients as a scanning mode corresponding to the fourth preset value.

Optionally, the step of determining the scanning mode of the transform coefficients and the size of the coefficient group of the transform coefficients includes: determining jointly the size of the coefficient group and the scanning mode of the transform coefficients using a rate-distortion optimization method.

Optionally, the step of converting the transform coefficients into one or more syntax elements includes: according to the scanning mode of the transform coefficients and the size of the coefficient group, dividing the transform coefficients into one or more coefficient groups, scanning the transform coefficients included in the one or more coefficient groups according to the scanning mode, and representing the transform coefficients as at least one of the following syntax elements: a syntax element indicating a starting position of a non-zero coefficient, a syntax element indicating that a coefficient group includes a non-zero coefficient, a syntax element indicating a position of a non-zero coefficient in a coefficient group, or a syntax element indicating a value of a non-zero coefficient in a coefficient group.

Optionally, the step of encoding the size of the coefficient group and the value of the syntax element and writing the encoded bits to the code stream includes: encoding a size of the coefficient group used by the transform coefficients in one of the following manners: encoding the size of the coefficient group, encoding a value of an index number corresponding to the size of the coefficient group, or setting a flag bit corresponding to the size of the coefficient group, and encoding a value of the flag bit.

Optionally, the step of encoding the size of the coefficient group and the value of the syntax element and writing the encoded bits to the code stream includes: writing the encoded bits into a data unit in the code stream, where the data unit in the code stream includes at least one of: one or more parameter sets, a slice header, or a block layer data unit.

According to another embodiment of the present application, a method for decoding a picture is provided. The method includes: parsing a code stream, and determining a prediction value of a decoded block; parsing the code stream, and determining a scanning mode of a transform coefficient in the decoded block, a size of the coefficient group, and a value of a syntax element related to a transform coefficient; according to the scanning mode of the transform coefficients and the size of the coefficient group, processing the coefficient group in the decoded block, and converting the value of the syntax element into a transform coefficient in the coefficient group; processing the transform coefficient to obtain a recovery value of the transform coefficient; performing one or more transforms on the recovery value of the transform coefficient to obtain a prediction residual of the decoded block; and determining a recovery value of the decoded block using the prediction value and the prediction residual.

Optionally, the step of parsing the code stream and determining the prediction value of the decoded block includes at least one of the following manners: parsing the code stream to obtain an inter prediction parameter of the decoded block, and determining the prediction value of the decoded block using one or more decoded pictures as reference pictures according to the inter prediction parameter; or parsing the code stream to obtain an intra prediction parameter of the decoded block, and determining the prediction value of the decoded block using a decoded portion in a picture where the decoded block is located as a reference according to the intra prediction parameter.

Optionally, the step of parsing the code stream and determining the size of the coefficient group of the transform coefficient in the decoded block includes: parsing the code stream to obtain a first coefficient group parameter from a data unit in the code stream, and determining the size of the coefficient group according to the first coefficient group parameter; where the data unit in the code stream includes at least one of: one or more parameter sets, a slice header, or a block layer data unit.

Optionally, the step of determining the size of the coefficient group according to the first coefficient group parameter includes: setting the size of the coefficient group using the first coefficient group parameter.

Optionally, the step of determining the size of the coefficient group according to the first coefficient group parameter includes: in response to the first coefficient group parameter indicating an adjacent decoded block of the decoded block, setting the size of the coefficient group using a size of the coefficient group of the adjacent decoded block.

Optionally, the step of determining the size of the coefficient group according to the first coefficient group parameter includes: determining the size of the coefficient group of the transform coefficient in the decoded block from candidate values of the size of the coefficient group according to the first coefficient group parameter.

Optionally, the method further includes: in response to the first coefficient group parameter including an index number, setting the size of the coefficient group using a size of the coefficient group corresponding to the index number in the candidate values.

Optionally, the method further includes: in response to the first coefficient group parameter including a flag bit, setting the size of the coefficient group using a size of the coefficient group corresponding to the flag bit in the candidate values.

Optionally, the candidate values of the size of the coefficient group are one or more fixed values.

Optionally, the method further includes: in response to the first coefficient group parameter including an identification parameter, configuring the candidate values of the size of the coefficient group using the identification parameter.

Optionally, the identification parameter includes at least one of: a size of a coefficient group, a side length of a coefficient group, or a width and a height of a coefficient group.

Optionally, the candidate values of the size of the coefficient group are configured using the identification parameter through one or more of the following manners: obtaining maximum and minimum values of the identification parameter, determining a value of the identification parameter excluding the maximum and minimum values according to a preset division manner, and setting the candidate values using the value of the identification parameter; obtaining the maximum value of the identification parameter and a maximum division hierarchy of the coefficient group, determining a value of the identification parameter excluding the maximum value according to the preset division manner, and setting the candidate values using the value of the identification parameter; obtaining the maximum value of the identification parameter and a different between maximum and minimum values of the size of the coefficient group, determining a value of the identification parameter excluding the maximum value according to the preset division manner, and setting the candidate values using the value of the identification parameter; obtaining the minimum value of the identification parameter and a maximum upward division hierarchy of the coefficient group, determining a value of the identification parameter excluding the minimum value according to the preset division manner, and setting the candidate values using the value of the identification parameter; or obtaining the maximum value of the identification parameter and the different between the maximum and minimum values of the size of the coefficient group, determining a value of the identification parameter excluding the minimum value according to the preset division manner, and setting the candidate values using the value of the identification parameter.

Optionally, the preset division manner includes at least one of: a quaternary division, a trinary division, or a binary division.

Optionally, the step of configuring the candidate values of the size of the coefficient group using the identification parameter includes: setting the candidate values using a default value of the identification parameter.

Optionally, the step of configuring the candidate values of the size of the coefficient group using the identification parameter includes: the identification parameter being one or more flag bits indicating whether a corresponding size of the coefficient group is included in the candidate values, and setting the size of the coefficient group included in the candidate values according to the identification parameter.

Optionally, the step of configuring the candidate values of the size of the coefficient group using the identification parameter includes: the identification parameter indicating one or more size of the coefficient groups corresponding to a preset profile/tier/level, and setting the size of the coefficient group included in the candidate values according to the identification parameter.

Optically, the step of determining the size of the coefficient group according to the first coefficient group parameter includes: the first coefficient group parameter including a first decoding parameter of the decoded block, and setting the size of the coefficient group as a size of the coefficient group corresponding to the first decoding parameter according to the first decoding parameter of the decoded block, where the first decoding parameter includes at least one of: a size of a transform block included in the decoded block, a prediction mode of the decoded block, a transform type used by the transform block included in the decoded block, or a quantization parameter.

Optionally, the step of setting the size of the coefficient group as the size of the coefficient group corresponding to the first decoding parameter includes: in response to the size of the transform block included in the decoded block being equal to a first preset value, setting the size of the coefficient group as a size of the coefficient group corresponding to the first preset value.

Optionally, the method further includes: obtaining the size of the coefficient group corresponding to the first preset value according to the first coefficient group parameter.

Optionally, the step of setting the size of the coefficient group as the size of the coefficient group corresponding to the first decoding parameter includes: when the prediction mode of the decoded block is equal to a first preset mode, setting the size of the coefficient group as a size of the coefficient group corresponding to the first preset mode.

Optionally, the method further includes: obtaining the size of the coefficient group corresponding to the first preset mode according to the first coefficient group parameter.

Optionally, the step of setting the size of the coefficient group as the size of the coefficient group corresponding to the first decoding parameter includes: when the transform type used by the transform block included in the decoded block is equal to a first transform type, setting the size of the coefficient group as a size of the coefficient group corresponding to the first transform type. Optionally, the method further includes: obtaining the size of the coefficient group corresponding to the first transform type according to the first coefficient group parameter.

Optionally, the step of setting the size of the coefficient group as the size of the coefficient group corresponding to the first decoding parameter includes: when a value of the quantization parameter is equal to a second preset value, setting the size of the coefficient group as a size of the coefficient group corresponding to the second preset value; or when the value of the quantization parameter is within a first preset value range, setting the size of the coefficient group as a size of the coefficient group corresponding to the first preset value range.

Optionally, the method further includes: obtaining the size of the coefficient group corresponding to the second preset value according to the first coefficient group parameter, or obtaining the size of the coefficient group corresponding to the first preset value range according to the first coefficient group parameter.

Optionally, the step of parsing the code stream and determining the scanning mode of the transform coefficient includes: parsing the data unit in the code steam to obtain a first scanning mode parameter, and determining the scanning mode of the transform coefficient according to the first scanning mode parameter, where the scanning mode is an order to process elements in a two-dimensional matrix of the transform coefficient, and the data unit in the code stream includes at least one of: one or more parameter sets, a slice header, or a block layer data unit.

Optionally, the step of parsing the data unit in the code steam to obtain the first scanning mode parameter and determining the scanning mode of the transform coefficient according to the first scanning mode parameter includes: using a scanning mode indicated by the first scanning mode parameter as the scanning mode of the transform coefficient.

Optionally, the step of using the scanning mode indicated by the first scanning mode parameter as the scanning mode of the transform coefficient includes: the first scanning mode parameter indicating an adjacent decoded block of the decoded block, and setting the scanning mode of the transform coefficient using a scanning mode of the adjacent decoded block.

Optionally, the step of using the scanning mode indicated by the first scanning mode parameter as the scanning mode of the transform coefficient further includes: determining the scanning mode of the transform coefficient from candidate scanning modes according to the first scanning mode parameter.

Optionally, the method further includes: the first scanning mode parameter including a scanning mode index number, and setting the scanning mode of the transform coefficient using a scanning mode corresponding to the scanning mode index number in the candidate scanning modes.

Optionally, the method further includes: the first scanning mode parameter including a scanning mode indication flag bit, and setting the scanning mode of the transform coefficient using a scanning mode corresponding to the scanning mode indication flag bit in the candidate scanning modes.

Optionally, the candidate scanning modes include at least one of: one or more fixed scanning modes or the candidate scanning mode configured using the first scanning mode parameter.

Optionally, the step of configuring the candidate scanning mode using the first scanning mode parameter includes: the first scanning mode parameter including a default scanning mode, and setting the candidate scanning mode using the default scanning mode.

Optionally, the step of configuring the candidate scanning mode using the first scanning mode parameter includes: the first candidate scanning mode parameter including one or more candidate scanning mode indication flag bits, and setting the candidate scanning mode using a scanning mode corresponding to the one or more candidate scanning mode indication flag bits.

Optionally, the step of configuring the candidate scanning mode using the first scanning mode parameter includes: setting the candidate scanning mode using one or more scanning modes corresponding to a preset profile/tier/level indicated by the first scanning mode parameter.

Optionally, the step of configuring the candidate scanning mode using the first scanning mode parameter includes: setting the candidate scanning mode using a correspondence between a position of the transform coefficient indicated by the first scanning mode parameter and a position of the scanned transform coefficient.

Optionally, the step of parsing the data unit in the code steam to obtain the first scanning mode parameter and determining the scanning mode of the transform coefficient according to the first scanning mode parameter includes: the first scanning mode parameter including a second decoding parameter of the decoded block, and determining the scanning mode of the transform coefficient according to the second decoding parameter, where the second decoding parameter includes at least one of: a size of a transform block included in the decoded block, a prediction mode of the decoded block, a transform type used by the transform block included in the decoded block, or a size of the decoded block.

Optionally, the step of setting the scanning mode of the transform coefficient as the scanning mode corresponding to the second decoding parameter according to the second decoding parameter includes: in response to the size of the transform block included in the decoded block being equal to a third preset value, setting the scanning mode of the transform coefficient as a scanning mode corresponding to the third preset value.

Optionally, the method further includes: obtaining the scanning mode corresponding to the third preset value according to the first coefficient group parameter.

Optionally, the step of setting the scanning mode of the transform coefficient as the scanning mode corresponding to the second decoding parameter according to the second decoding parameter includes: in response to the prediction mode of the decoded block being equal to a second preset mode, setting the scanning mode of the transform coefficient as a scanning mode corresponding to the second preset mode.

Optionally, the method further includes: obtaining the scanning mode corresponding to the second preset mode according to the first coefficient group parameter.

Optionally, the step of setting the scanning mode of the transform coefficient as a scanning mode corresponding to the second decoding parameter according to the second decoding parameter includes: in response to the transform type used by the transform block included in the decoded block being equal to a second transform type, setting the scanning mode of the transform coefficient as a scanning mode corresponding to the second transform type.

Optionally, the method further includes: obtaining the scanning mode corresponding to the second transform type according to the first coefficient group parameter.

Optionally, the step of setting the scanning mode of the transform coefficient as a scanning mode corresponding to the second decoding parameter according to the second decoding parameter includes: in response to the size of the decoded block being equal to a fourth preset value, setting the scanning mode of the transform coefficient as a scanning mode corresponding to the fourth preset value.

Optionally, the method further includes: obtaining the scanning mode corresponding to the fourth preset value according to the first coefficient group parameter.

Optionally, the step of parsing the code stream and determining the value of the syntax element related to the transform coefficient includes that the syntax element includes at least one of: a syntax element indicating a starting position of a non-zero coefficient; a syntax element indicating that a coefficient group includes a non-zero coefficient; a syntax element indicating a position of a non-zero coefficient in a coefficient group; or a syntax element indicating a value of a non-zero coefficient in a coefficient group.

Optionally, the step of processing the transform coefficient to obtain the recovery value of the transform coefficient includes: in response to determining to perform scaling processing on the transform coefficient, performing the scaling processing on the transform coefficient to obtain the recovery value of the transform coefficient; or in response to determining not to perform scaling processing on the transform coefficient, setting the recovery value of the transform coefficient using the transform coefficient.

Optionally, before the processing is performed on the transform coefficient, the method further includes: parsing the code stream to obtain a third parameter for constructing a recovery value of the prediction residual of the decoded block, and determining whether to perform the scaling processing on the transform coefficient according to the third parameter.

Optionally, the step of determining the recovery value of the decoded block using the prediction value and the prediction residual further includes: performing in-loop filtering processing on the sum of the prediction value and the prediction residual.

According to another embodiment of the present application, an apparatus for encoding a picture is provided. The apparatus includes: a first determination module, which is configured to determine a prediction value of an encoded block, and calculate a prediction residual between the encoded block and the prediction value; a transform module, which is configured to perform one or more transforms on the prediction residual to obtain transform data, and determine transform coefficients using the transform data; a second determination module, which is configured to determine a scanning mode of the transform coefficients and a size of the coefficient group of the transform coefficients, divide the transform coefficients into one or more coefficient groups, scan transform coefficients included in each coefficient group according to the scanning mode, and convert the transform coefficients into one or more syntax element; and an encoding module, which is configured to encode the size of the coefficient group and values of the one or more syntax elements, and write encoded bits to a code stream.

According to another embodiment of the present application, an apparatus for decoding a picture is provided. The apparatus includes: a decoding module, which is configured to parse a code stream, and determine a prediction value of a decoded block, a scanning mode of a transform coefficient in the decoded block, a size of the coefficient group, and a value of a syntax element related to a transform coefficient; a conversion module, which is configured to, according to the scanning mode of the transform coefficients and the size of the coefficient group, process the coefficient group in the decoded block, and convert the syntax element into a transform coefficient in the coefficient group; a processing module, which is configured to process the transform coefficient to obtain a recovery value of the transform coefficient; a transform module, which is configured to process the transform coefficient, perform one or more transforms on the processed data to obtain a prediction residual of the decoded block; and a calculation module, which is configured to determine a recovery value of the decoded block using the prediction value and the prediction residual.

According to another embodiment of the present application, an electronic device is provided. The electronic device includes: the encoding apparatus described above, a collection device, and a storage device; where the collection device is configured to collect a picture corresponding to the encoded block, and output the picture after the picture is subject to preprocessing, and the storage device is configured to receive an outputted code stream, and store the code stream after the code stream is subject to the system layer processing.

According to another embodiment of the present application, an electronic device is provided. The electronic device includes: the decoding apparatus, a receiving device, and a display device. The receiving device is configured to receive a code stream, and the display device is configured to display the recovered picture.

According to another embodiment of the present application, a storage medium is further provided. The storage medium is configured to store a computer program which, when executed, performs steps of any one of the method embodiments described above.

In the present application, since the transform coefficient matrix is allowed to be encoded and decoded using the non-fixed-size coefficient group, the problem in the related art that the fixed-size coefficient group does not allow the encoder to choose the most efficient way to encode coefficients according to the distribution of transform coefficients in the two-dimensional matrix can be solved, thereby effectively reducing the encoding overhead of the flag bit of the coefficient group and improving the efficiency for encoding the transform coefficient.

BRIEF DESCRIPTION OF DRAWINGS

The drawings described herein are used to provide a further understanding of the present application and form a part of the present application. The exemplary embodiments and descriptions thereof in the present application are used to explain the present application and not to limit the present application in any improper way. In the drawings.

DETAILED DESCRIPTION

Hereinafter, the present application will be described in detail with reference to drawings and in conjunction with embodiments. It is to be noted that if not in collision, the embodiments and features therein in the present application may be combined with each other.

It is to be noted that the terms "first", "second" and the like in the description, claims and drawings of the present application are used to distinguish between similar objects and are not necessarily used to describe a particular order or sequence.

In the following embodiments, the video refers to a picture sequence composed of pictures. The code stream refers to a code stream generated when a video encoder encodes the video, or refers to a transport stream and/or a media file obtained after the code stream generated when the video encoder encodes the video is subject to the system layer processing, where the transport stream and/or the media file include the code stream generated when the video encoder encodes the video. A video can be obtained by decoding the code stream. The system layer processing is an encapsulation operation on the video code stream, for example, the video code stream is encapsulated as a data payload into the transport stream, or the video code stream is encapsulated as a payload into the media file. The system layer processing further includes encapsulating the transport stream or the media file including the video code stream as a data payload into a stream for transmission or a file for storage. The data unit generated after the system layer processing is also referred to as a system layer data unit, and information (such as header information of the system layer data unit, etc.,) added to the system layer data unit in the process of encapsulating the data payload through the system layer processing is referred to as system layer information. The sub-code stream refers to a partial code stream extracted from the code stream. A video picture can be obtained by decoding the sub-code stream. The video image may be a picture with a lower resolution than the video picture obtained by decoding the code stream, or may be a picture with a lower frame rate than the video obtained by decoding the code stream, and the video picture may include partial content of the video picture obtained by decoding the code stream.

Embodiment One

Figure 1:
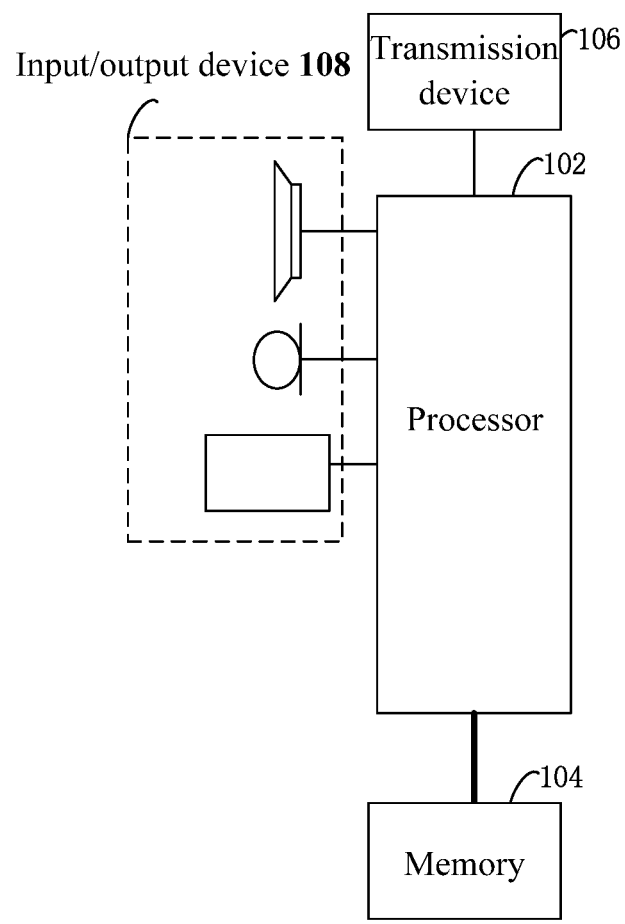
FIG. 1 is a diagram illustrating hardware structures of a mobile terminal for a method for encoding a picture according to an embodiment of the present disclosure.

The method embodiment provided in Embodiment one of the present application can be performed in a mobile terminal, a computer terminal or other similar computing apparatuses. Using an example in which the method is to be executed in the mobile terminal for illustration, FIG. 1 is a block diagram illustrating hardware structures of a mobile terminal for a method for encoding a picture according to an embodiment of the present disclosure. As shown in FIG. 1, a mobile terminal 10 may include one or more (only one is shown in FIG. 1) processors 102 (the processors 102 may include, but are not limited to, a microprocessor such as a microcontroller unit (MCU), a programmable logic device such as a field programmable gate array (FPGA), and other processing apparatuses), and a memory 104 used for storing data. Optionally, the preceding mobile terminal may further include a transmission apparatus 106 for a communication function and an input-output device 108. It is to be understood by those of ordinary skill in the art that the structure shown in FIG. 1 is merely illustrative and not intended to limit the structure of the preceding mobile terminal. For example, the mobile terminal 10 may further include more or fewer components than the components shown in FIG. 1, or may have a configuration different from the configuration shown in FIG. 1.

The memory 104 may be configured to store a computer program such as a software program and a module of application software, for example, a computer program corresponding to the method for encoding the picture in the embodiment of the present disclosure. The processor 102 executes the computer program stored in the memory 104 to perform various functional applications and data processing, that is, to implement the method described above. The memory 104 may include a high-speed random access memory, and may further include a nonvolatile memory such as one or more magnetic storage apparatuses, flash memories, or other nonvolatile solid-state memories. In some examples, the memory 104 may further include memories that are remotely disposed with respect to the processors 102. These remote memories may be connected to the mobile terminal 10 via a network. The examples of the preceding network include, but are not limited to, the Internet, an intranet, a local area network, a mobile communication network, and a combination thereof.

The transmission apparatus 106 is configured to receive or send data via a network. Specific examples of the preceding network may include a wireless network provided by a communication provider of the mobile terminal 10. In an example, the transmission apparatus 106 includes a network interface controller (NIC) which may be connected to other network devices via a base station and thus can communicate with the Internet. In an example, the transmission apparatus 106 may be a radio frequency (RF) module which is configured to communicate with the Internet in a wireless way.

Figure 2:
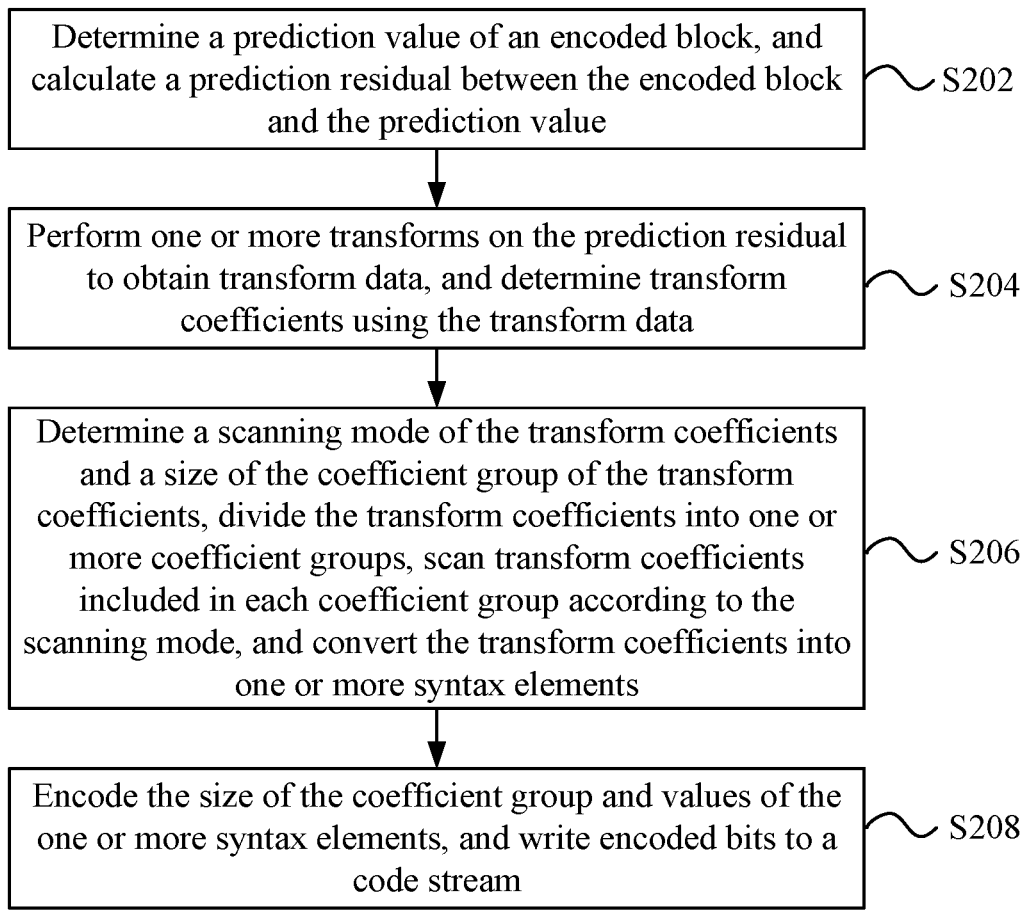
FIG. 2 is a flowchart of a method for encoding a picture according to an embodiment of the disclosure.

This embodiment provides a method for encoding a picture executed on the mobile terminal described above. FIG. 2 is a flowchart of a method for encoding a picture according to an embodiment of the present disclosure. As shown in FIG. 2, the method includes steps S202, S204, S206, and S208.

In step S202, a prediction value of an encoded block is determined, and a prediction residual between the encoded block and the prediction value is calculated.

In step S204, one or more transforms are performed on the prediction residual to obtain transform data, and transform coefficients are determined using the transform data.

In step S206, a scanning mode of the transform coefficients and a size of the coefficient group of the transform coefficients are determined, the transform coefficients are divided into one or more coefficient groups, transform coefficients included in each coefficient group are scanned according to the scanning mode, and the transform coefficients are converted into one or more syntax elements.

In step S208, the size of the coefficient group and values of the one or more syntax elements are encoded, and encoded bits are written to a code stream.

Optionally, the step in which the prediction value of the encoded block is determined includes at least one of: determining the prediction value of the encoded block by using one or more encoded pictures as reference pictures, or determining the prediction value of the encoded block by using an encoded portion of a picture where the encoded block is located as a reference.

Optionally, the step in which the transform coefficients are determined using the transform data includes: in response to determining to perform quantification on the transform data, performing quantification processing on the transform data to obtain the transform coefficients; and in response to determining not to perform quantification on the transform data, setting the transform coefficients using the transform data.

Optionally, the step in which the size of the coefficient group of the transform coefficients is determined includes: determining the size of the coefficient group of the transform coefficients according to preset candidate values.

Optionally, the step in which the size of the coefficient group of the transform coefficients is determined according to the preset candidate values includes: determining the size of the coefficient group of the transform coefficients from the preset candidate values using a rate-distortion optimization method.

Optionally, the number of encoded bits of the transform coefficients when a value in the candidate values is used as the size of the coefficient group is calculated, and a value that minimizes the number of encoded bits is selected from the candidate values as the size of the coefficient group of the transform coefficients.

Optionally, the step in which the size of the coefficient group of the transform coefficients is determined according to the preset candidate values includes: determining the size of the coefficient group of the transform coefficients according to distribution of the transform coefficients.

Optionally, the distribution of the transform coefficients refers to a concentration degree of non-zero coefficients in the transform coefficients detected after the transform coefficients are scanned, where the concentration degree of the non-zero coefficients refers to the number of zero coefficients among the non-zero coefficients in the transform coefficients, and the smaller the number of the zero coefficients, the higher the concentration degree of non-zero coefficients; and a value of the candidate value that is capable of making the concentration degree the highest is selected from the candidate values as the size of the coefficient group of the transform coefficients. Optionally, the candidate values include at least one of: one or more fixed values, one or more configured values, or a value of a size of the coefficient group used by an encoded block adjacent to the encoded block.

Optionally, when the preset candidate values are one or more values of the configuration, the method further includes: writing an identification parameter of the candidate values into one or more data units in the code stream, where the identification parameter is used for indicating one or more configured candidate values, and the one or more data units in the code stream include at least one of: one or more parameter sets, a slice header, or a block layer data unit.

Optionally, the identification parameter of the preset candidate values of the size of the coefficient group includes at least one of: a size of a coefficient group, a side length of a coefficient group, or a width and a height of a coefficient group.

Optionally, the identification parameter is written into the code stream in one or more of the following manners: writing maximum and minimum values of the identification parameter into the code stream; writing the maximum value of the identification parameter and a maximum division hierarchy of the coefficient group into the code stream; writing the maximum value of the identification parameter and a difference between maximum and minimum values of the size of the coefficient group into the code stream; writing the minimum value of the identification parameter and a maximum upward division hierarchy of the coefficient group into the code stream; or writing the minimum value of the identification parameter and the difference between maximum and minimum values of the size of the coefficient group into the code stream.

Optionally, the step in which the identification parameter is written into the code stream in one or more of the following manners further includes: writing a default value of the identification parameter into the code stream.

Optionally, the identification parameter of the preset candidate values of the size of the coefficient group includes one or more flag bits indicating whether a corresponding size of the coefficient group is a size of the coefficient group included in the candidate values.

Optionally, the identification parameter of the preset candidate values of the size of the coefficient group indicates one or more size of the coefficient groups corresponding to one or more preset prediction modes.

Optionally, the identification parameter of the preset candidate values of the size of the coefficient group indicates one or more size of the coefficient groups corresponding to one or more preset transforms.

Optionally, the identification parameter of the preset candidate values of the size of the coefficient group indicates one or more size of the coefficient groups corresponding to one or more preset transform types.

Optionally, the identification parameter of the preset candidate values of the size of the coefficient group indicates one or more size of the coefficient groups corresponding to one or more preset quantization parameters, or the identification parameter indicates one or more size of the coefficient groups corresponding to one or more preset quantization parameter value ranges.

Optionally, the identification parameter of the preset candidate values of the size of the coefficient group indicates one or more size of the coefficient groups corresponding to a preset profile/tier/level.

Optionally, the step in which the size of the coefficient group of the transform coefficients is determined includes: setting, according to a first encoding parameter of the encoded block, the size of the coefficient group of the transform coefficients in the encoded block as a size of the coefficient group corresponding to the first encoding parameter, where the first encoding parameter includes at least one of: a size of a transform block included in the encoded block, a prediction mode of the encoded block, a transform type used by the transform block included in the encoded block, or a quantization parameter.

Optionally, the step in which the size of the coefficient group of the transform coefficients in the encoded block is set as the size of the coefficient group corresponding to the first encoding parameter according to the first encoding parameter of the encoded block includes: when the size of the coefficient group included in the encoded block is equal to a first preset value, setting the size of the coefficient group as a size of the coefficient group corresponding to the first preset value.

Optionally, the step in which the size of the coefficient group of the transform coefficients in the encoded block is set as the size of the coefficient group corresponding to the first encoding parameter according to the first encoding parameter of the encoded block includes: in response to the prediction mode of the encoded block being equal to a first preset mode, setting the size of the coefficient group as a size of the coefficient group corresponding to the first preset mode.

Optionally, the step in which the size of the coefficient group of the transform coefficients in the encoded block is set as the size of the coefficient group corresponding to the first encoding parameter according to the first encoding parameter of the encoded block includes: when the transform type used by the transform block included in the encoded block is equal to a first transform type, setting the size of the coefficient group as a size of the coefficient group corresponding to the first transform type.

Optionally, the step in which the size of the coefficient group of the transform coefficients in the encoded block is set as the size of the coefficient group corresponding to the first encoding parameter according to the first encoding parameter of the encoded block includes: when a value of the quantization parameter is equal to a second preset value, setting the size of the coefficient group as a size of the coefficient group corresponding to the second preset value, or when the value of the quantization parameter is within a first preset value range, setting the size of the coefficient group as a size of the coefficient group corresponding to the first preset value range.

Optionally, the step in which the scanning mode of the transform coefficients is determined includes: determining a scanning mode for the transform coefficients according to preset candidate scanning modes, where the scanning mode is an order to process elements in a two-dimensional matrix of the transform coefficients.

Optionally, the step in which the scanning mode is determined for the transform coefficients according to the preset candidate scanning modes includes: determining the scanning mode of the transform coefficients from the preset candidate scanning modes using a rate-distortion optimization manner.

Optionally, the number of encoded bits of the transform coefficients when a scanning mode in the candidate scanning modes is used is calculated, and a scanning mode that minimizes the number of encoded bits is selected from the candidate scanning modes as the scanning mode of the transform coefficients.

Optionally, the step in which the scanning mode is determined for the transform coefficients according to the preset candidate scanning modes includes: determining the scanning mode of the transform coefficients according to distribution of the transform coefficients.

Optionally, the distribution of the transform coefficients refers to a concentration degree of non-zero coefficients in the transform coefficients detected after the transform coefficients are scanned, where the concentration degree of the non-zero coefficients refers to a number of zero coefficients among the non-zero coefficients in the transform coefficients, and the smaller the number of the zero coefficients, the higher the concentration degree of non-zero coefficients; and a scanning mode in the candidate value that is capable of making the concentration degree the highest is selected from the preset candidate scanning modes as the scanning mode of the transform coefficients.

Optionally, the candidate scanning modes include at least one of: one or more fixed scanning modes, one or more configured scanning modes, or a scanning mode used by an encoded block adjacent to the encoded block.

Optionally, when the preset candidate scanning modes are one or more scanning modes of the configuration, the method further includes: writing a candidate scanning mode parameter into one or more data units in the code stream, where the candidate scanning mode parameter is used for indicating the configured candidate scanning mode, and the data unit in the code stream includes at least one of: one or more parameter sets, a slice header, or a block layer data unit.

Optionally, the candidate scanning mode parameter further includes an order to process the elements in the two-dimensional matrix of the transform coefficients.

Optionally, the candidate scanning mode parameter further includes a default value of the candidate scanning mode parameter.

Optionally, the candidate scanning mode parameter includes one or more flag bits indicating whether a corresponding scanning mode is included in the candidate scanning modes.

Optionally, the candidate scanning mode parameter includes that the candidate scanning mode parameter indicates one or more scanning modes corresponding to one or more preset prediction modes.

Optionally, the candidate scanning mode parameter includes that the candidate scanning mode parameter indicates one or more scanning modes corresponding to one or more preset transforms.

Optionally, the candidate scanning mode parameter includes that the candidate scanning mode parameter indicates one or more scanning modes corresponding to one or more preset transform types.

Optionally, the candidate scanning mode parameter includes that the candidate scanning mode parameter indicates one or more scanning modes corresponding to one or more preset quantization parameters, or the candidate scanning mode parameter indicates one or more scanning modes corresponding to one or more preset quantization parameter value ranges.

Optionally, the candidate scanning mode parameter includes that the candidate scanning mode parameter indicates one or more scanning modes corresponding to a preset profile/tier/level.

Optionally, the step in which the scanning mode of the transform coefficients is determined includes: setting, according to a second encoding parameter of the transform block, the scanning mode of the transform coefficients in the encoded block as a scanning mode of a coefficient group corresponding to the second encoding parameter, where the second encoding parameter includes at least one of: a size of a transform block included in the encoded block, a prediction mode of the encoded block, a transform type used by the transform block included in the encoded block, or a size of the encoded block, and the scanning mode is an order to process elements in a two-dimensional matrix of the transform coefficients.

Optionally, the step in which the scanning mode of the transform coefficients in the encoded block is set as the scanning mode of the coefficient group corresponding to the second encoding parameter according to the second encoding parameter of the transform block includes: in response to the size of the transform block included in the encoded block being equal to a third preset value, setting the scanning mode of the transform coefficients as a scanning mode corresponding to the third preset value.

Optionally, the step in which the scanning mode of the transform coefficients in the encoded block is set as the scanning mode of the coefficient group corresponding to the second encoding parameter according to the second encoding parameter of the transform block includes: in response to the prediction mode of the encoded block being equal to a second preset mode, setting the scanning mode of the transform coefficients as a scanning mode corresponding to the second preset mode.

Optionally, the step in which the scanning mode of the transform coefficients in the encoded block is set as the scanning mode of the coefficient group corresponding to the second encoding parameter according to the second encoding parameter of the transform block includes: when the transform type used by the transform block included in the encoded block is equal to a second transform type, setting the scanning mode of the transform coefficients as a scanning mode corresponding to the second transform type.

Optionally, the step in which the scanning mode of the transform coefficients in the encoded block is set as the scanning mode of the coefficient group corresponding to the second encoding parameter according to the second encoding parameter of the transform block includes: when the size of the encoded block is equal to a fourth preset value, setting the scanning mode of the transform coefficients as a scanning mode corresponding to the fourth preset value.

Optionally, the step in which the scanning mode of the transform coefficients and the size of the coefficient group of the transform coefficients are determined includes: determining jointly the size of the coefficient group and the scanning mode of the transform coefficients using the rate-distortion optimization method Optionally, the step in which the transform coefficients are converted into one or more syntax elements includes: according to the scanning mode of the transform coefficients and the size of the coefficient group, dividing the transform coefficients into one or more coefficient groups, scanning the transform coefficients included in the one or more coefficient groups according to the scanning mode, and representing the transform coefficients as at least one of the following syntax elements: a syntax element indicating a starting position of a non-zero coefficient, a syntax element indicating that a coefficient group includes a non-zero coefficient, a syntax element indicating a position of a non-zero coefficient in a coefficient group, or a syntax element indicating a value of a non-zero coefficient in a coefficient group.

Optionally, the step in which the size of the coefficient group and values of the one or more syntax elements are encoded includes: encoding a size of the coefficient group used by the transform coefficients in one of the following manners: encoding the size of the coefficient group, encoding a value of an index number corresponding to the size of the coefficient group, or setting a flag bit corresponding to the size of the coefficient group and encoding a value of the flag bit.

Optionally, the step in which the size of the coefficient group and values of the one or more syntax elements are encoded includes: writing the encoded bits into a data unit in the code stream, where the data unit in the code stream includes at least one of: one or more parameter sets, a slice header, or a block layer data unit.

Optionally, a picture may be divided into multiple maximum coding units. The maximum coding unit is a square picture region. The picture may be divided into one or more slices, and each slice may include the integer number of maximum coding units, or may include a non-integer number of maximum coding units. Optionally, the picture may further be divided into one or more tiles, and each tile may include the integer number of maximum coding units, or may include a non-integer number of maximum coding units. A division unit 201 may be configured to divide the picture according to a fixed manner, or may be configured as a division manner of dynamically adjusting the picture. For example, in order to adapt the maximum transmission unit (MTU) of a network, a dynamic slice division manner is used to ensure that the number of encoded bits per slice does not exceed the limit of MTU.

Optionally, the maximum coding unit is divided into one or more encoded blocks, and the encoded block obtained after division may be further divided into even more encoded blocks. The division manner may be one or more of a quad-tree division, a bi-tree division, or a tri-tree division.

Optionally, using the common rate-distortion optimization (RDO) method, the prediction value of the encoded block is determined, and output parameters related to inter prediction and intra prediction used by the prediction value are obtained.

Optionally, an inter prediction value of the encoded block is determined using one or more encoded pictures as reference pictures. First one or more reference lists are constructed using the reference pictures, where each reference list includes one or more reference pictures, and a matching block where the encoded block is located in the reference pictures is determined. The prediction value of the encoded block is constructed using this matching block, and a difference (i.e., prediction residual) between the encoded block and the prediction value is calculated.

Parameters used for indicating the position of the matching block are outputted, including a reference list indication, a reference index, a motion vector (MV), etc., where the reference picture list indication is used for indicating a reference list where a reference picture including the matching block is located, the reference picture index is used for indicating a reference picture including the matching block in the reference list, and the MV is used for indicating a relative position offset between the encoded block and the matching block in the same picture pixel coordinate system. Optionally, the prediction value of the encoded block is calculated using a recovered pixel adjacent to the encoded block as an input value of a filter, where the filter may be an interpolation filter, or may be a low-pass filter (e.g. a filter for calculating the direct current (DC) value). Specially, the matching block of the encoded block is searched for in the portion of the picture where the encoded block is located, where this portion has been partially recovered, and the matching block is used as the prediction value of the encoded block. The RDO method is used for determining a method (i.e., intra prediction mode) used for calculating the prediction value of the encoded block as well as the prediction value. The output parameters in the above process include a parameter used for indicating the intra prediction mode.

Optionally, the RDO method is also used for calculating the prediction residual between an original value and the prediction value of the encoded block. The prediction residual may be represented as an N×M two-dimensional matrix, where N and M are positive integers, and N and M may be equal or unequal.

Optionally, from the perspective of signal processing, a transform manner may be represented by a transform matrix. A rectangular (a square herein is a special case of a rectangle) block of the same size and shape as the encoded block may be used as a transform block of the prediction residual, or the prediction residual may be divided into multiple rectangular blocks (including the case where the height or width is one pixel) and the transform processing is separately performed on each rectangular block in turn.

Optionally, quantization is performed on the data using a scalar quantizer, and the quantization parameter (QP) of the quantizer is determined by a control unit. For example, a control unit may use an existing code rate control manner to determine a quantization step length of the quantizer and determine the QP according to the correspondence between the quantization step and the QP. The output of the quantization process is a quantization value (i.e., the "Level" value) of a coefficient, and the quantization value may usually be represented by a two-dimensional matrix.

Optionally, a scaling operation may also be performed on the quantization value of the coefficient using the same QP as that in the quantization process to obtain the recovery value of the coefficient. Optionally, in response to determining not to perform the quantization processing on the encoded block (e.g., using the RDO method to determine whether to perform quantization on the encoded block), inverse transform is directly performed on the data obtained by transforming the prediction residual.

Optionally, the recovery value of the coefficient is processed through inverse transform to obtain the recovery value of the prediction residual.

Optionally, the RDO method is further used for performing filtering. Specifically, this embodiment also includes a filtering method performed by a filter consisting of two filters in cascade: a deblocking filter and a sample value adaptive additive offset compensation filter (Sample Adaptive Offset, SAO). Optionally, the operation of performing filtering on data in a picture buffer region may be performed in the picture layer, that is, after recovery values of all encoded blocks in the picture have been written to the picture buffer, the filtering processing is performed on the data in the picture buffer region. Optionally, the operation of performing filtering on the data in the picture buffer region may be performed in the block layer, that is, when recovery data of a certain encoded block is no longer used as reference data for subsequent encoded blocks, the filtering processing is performed on the recovery data of this encoded block. Filter parameters are determined using the RDO method and then used as output parameters for the filtering process. The filter parameters include indication information of the filter used, a filter coefficient, and a control parameter of the filter.

Optionally, binarization and entropy encoding are performed on the encoding data of the picture, the parameters are converted into standard-compliant fields consisting of one or more "0" and "1" bits, and the fields are organized into a code stream according to a syntax structure of the code stream in the standard. The encoding data includes both texture data and non-texture data of the picture. The texture data is mainly transform coefficients of the encoded block, and the non-texture data includes all other data except the texture data, including output parameters involved in the various processing processes described above as well as parameters such as parameter sets, header information and auxiliary information.

Optionally, the processed texture data is transform coefficients represented in the form of an M×N two-dimensional matrix, where M and N are positive integers and M and N may be equal or unequal. The two-dimensional matrix may correspond to one transform block, and thus in the following description, the "transform block" is used to refer to the transform coefficients represented in the form of an M×N two-dimensional matrix. In a case where the quantization is performed on the encoded block, the transform coefficients are quantization values (i.e., "Level" values) of the coefficients outputted in the quantization process; whereas in a case where quantization is not performed on the encoded block, the transform coefficients are data outputted in the transform process after the prediction residual is transformed.

Optionally, the size of the coefficient group can be determined. The coefficient group includes W×H transform coefficients, where W and H are positive integers, W and H may be equal or unequal, and W≤M and H≤N. The used size of the coefficient group is determined from preset candidate value for the transform block. The preset candidate values may be fixed values, or may be configurable values. In a case where the preset candidate values are configurable values, identification information related to the size of the coefficient group may be encoded in one or more of the following data units, including one or more parameter sets, a slice header, and a coding unit, and then written to the code stream, where the identification information is used for indicating set size of the coefficient groups able to be used.

Optionally, the size of the coefficient group of the transform block may be determined using an implicit derivation manner. A preset size of the coefficient group may be selected according to one or more encoding parameters such as an encoding mode of an encoded block in which the transform block is located, a size of the transform block, a quantization parameter, a transform type used by the transform block, etc. In the following examples, two size of the coefficient groups, i.e., 4×4 and 8×8, can be used. This method can be extended to a case where more size of the coefficient groups can be used. The size of the coefficient group can be determined using one method in the following examples or jointly determined using multiple methods.

For example, the size of the coefficient group is set to 8×8 when the size of the transform block in the encoded block is greater than 16×16, and the size of the coefficient group is set to 4×4 when the size of the transform block in the encoded block is less than or equal to 16×16. For the non-square rectangular transform block, the correspondingly used size of the coefficient group may be set according to the height and width of the transform block. For example, when the smaller one of the height and the width of the transform block is greater than 16, a rectangular coefficient group of which the smaller one of the height and the width is equal to 8 is used; otherwise, a rectangular coefficient group of which the smaller one of the height and the width is equal to 4 is used.

For example, the size of the coefficient group used by the transform block in the encoded block of the inter prediction mode is set to 8×8 (the size of the coefficient group used by the transform blocks of 8×8 and 4×4 is set to 4×4), and the size of the coefficient group used by the transform block in the encoded block of the intra prediction mode is set to 8×8 (the size of the coefficient group used by the transform blocks of 16×16, 8×8 and 4×4 is set to 4×4).

For example, generally, when the quantization parameter is large, there are a lot of zero-value transform coefficients in the two-dimensional matrix. Since each coefficient group has a corresponding flag bit to identify whether all the transform coefficients in this coefficient group are 0 (or to identify whether this coefficient group includes a non-zero transform coefficient), when a large coefficient group in which all coefficients included are possibly zero is used, the coefficient group can be represented using just one flag bit. Compared with the case in which a small coefficient group is used, the use of larger coefficient group when the quantization parameter is large can effectively reduce the encoding overhead of the flag bit. The following is illustrated using an example of a setting manner of the quantization parameter in the H.256/HEVC standard. One implementation is that when the value of the quantization parameter is greater than or equal to 37, the size of the coefficient group is set to 8×8 (the size of the coefficient group used by the transport bocks of 8×8 and 4×4 is set to 4×4); otherwise, the size of the coefficient group is set to 4×4.

For example, for the encoded block using the transform designed based on discrete cosine transform (DCT), the size of the coefficient group is to 8×8 (the size of the coefficient group used by transform blocks of 8×8 and 4×4 is set to 4×4). For the encoded block using the transform designed based on discrete sine transform (DST), the size of the coefficient group is to 4×4. For the encoded block using the transform designed based on Karhunen-Loève Transform (KLT), the size of the coefficient group is to 8×8 (the size of the coefficient group used by transform blocks of 8×8 and 4×4 is set to 4×4). For the encoded block using two or more transforms, the size of the coefficient group is to 8×8 (the size of the coefficient group used by transform blocks of 8×8 and 4×4 is set to 4×4).

Optionally, the scanning mode of transform coefficients in the transform block can also be determined. The scanning mode refers to an order to process elements in the two-dimensional matrix of the transform coefficients. Generally, when the elements in one two-dimensional matrix with M rows and N columns are read in the order indicated by the scanning mode, a one-dimensional matrix with 1 row and M×N columns (or a one-dimensional matrix with M×N rows and 1 column) may be equivalently obtained. One or more scanning modes for the transform coefficient matrix may be preset, for example, a zig-zag scanning order, horizontal scanning order, vertical scanning order, diagonal scanning order (e.g. diagonal up-right scanning order), etc. The scanning mode is selected from preset candidate scanning modes for the transform block. The same scanning mode may be used for coefficient groups in the transform block and transform coefficients in the coefficient group, or different scanning modes may be used for coefficient groups in the transform block and transform coefficients in the coefficient group.

Optionally, the scanning mode of the transform coefficient matrix of the transform block may be determined using an implicit derivation manner. The preset corresponding scanning mode may be selected according to one or more encoding parameters such as an encoding mode of an encoded block in which the transform block is located, a size of the transform block, etc. For example, the inter prediction mode is set to use the diagonal right-up scanning mode, the intra prediction mode when the size of the encoded block is greater than 8×8 is set to use the diagonal right-up scanning mode, the intra prediction mode when the size of the encoded block is less than or equal to 8×8 is set to use the scanning mode in which the intra prediction direction indicates the direction, and the direct current (DC) mode, the planar mode and other modes that do not use directional prediction are set to use the diagonal right-up scanning mode. To reduce the number of preset scanning modes, the intra prediction directions may be categorized, and each category corresponds to different scanning modes. For example, the intra prediction direction in the vertical direction and the intra prediction direction with a specified angle offset to left and right in the vertical direction correspond to the vertical scanning mode, the intra prediction direction in the horizontal direction and the intra prediction direction with a specified angle offset up and down in the horizontal direction correspond to the horizontal scanning mode, and the intra prediction direction of an angle of 45 degrees and the intra prediction with a specified angle offset up and down in this angular direction correspond to the diagonal scanning mode. The scanning mode is selected for the encoded block according to one or more encoding parameters such as the encoding mode and the size of the encoded block.

Optionally, in a case where the size of the coefficient group of the transform block has been determined, the scanning mode of the transform block is determined according to the distribution of transform coefficients in the transform block. The distribution refers to the concentration degree of non-zero coefficients in the transform block detected after the transform coefficients in the transform block are scanned using the scanning mode (or in the inverse scanning order). Generally, the fewer zero coefficients among the non-zero coefficients according to the scanning order (or inverse scanning order), the higher the concentration degree of non-zero coefficients is considered to be. A scanning mode that is capable of making the concentration degree of non-zero coefficients the highest is selected from the candidate scanning modes as the scanning mode of the transform block. Another implementation is that, in a case where the size of the coefficient group used by the transform block has been determined, the available candidate scanning modes are sequentially used as the scanning mode of the transform block, the number of encoded bits in the transform coefficients in the transform block is calculated, and the candidate scanning mode that minimizes the number of encoded bits is selected as the scanning mode of the transform block. The available candidate scanning modes refer to scanning modes that are capable of being used to encode the transform block in the preset candidate scanning modes. For example, there may be a configuration that the specified one or more scanning modes are not used for encoded blocks of a specific prediction mode. For example, there may be a configuration that the specified one or more scanning modes are not used for one or more specific sizes of encoded block or transform block. Information for indicating the scanning mode used by the transform block is encoded in one or more of the following data units, including one or more parameter sets, a slice header, a coding unit, or a transform block data unit, and then written to the code stream.

Optionally, an adaptive scanning mode may be determined for the transform block. The various scanning modes used in the preceding method process the coefficient groups in the transform block and the transform coefficients in the coefficient groups in a fixed order, and different scanning modes defines different scanning orders. The term "adaptive scanning mode" refers to a flexible rather than a fixed processing order adopted to process the coefficient groups in the transform block and a flexible rather than a fixed processing order adopted to process the transform coefficients in the coefficient groups. One implementation is that a scanning mode is constructed according to the distribution of transform coefficients in the transform block such that the concentration degree of non-zero coefficients in the transform block is the highest. Generally, the fewer zero coefficients among the non-zero coefficients according to the scanning order (or in an inverse scanning order), the higher the concentration degree of non-zero coefficients is considered to be. Another implementation is that, in a case where the size of the coefficient group used by the transform block has been determined, a scanning mode that minimizes the sum of the number of encoded bits of the transform coefficients in the transform block and the number of overhead bits for encoding the scanning mode is constructed. After the scanning mode is determined, the scanning mode needs to be encoded. One method for that is to encode the correspondence table between the positions of the transform coefficients in the transform block encoding process and the positions of the transform coefficients after the scanning. For example, for a transform coefficient whose coordinate position is equal to (m, n) in the transform block (or whose index number is equal to m×nTbS+n, where nTbS is the width of the transform block), the corresponding number position of this transform coefficient after the scanning is equal to k. It is to be noted that the equivalence information indicated by the correspondence table in the code stream is that the position coordinates of a transform coefficient which is obtained by parsing the code stream and whose position number is equal to k in the transform block are (m, n) (or the index number of this transform coefficient is equal to m×nTbS+n, where nTbS is the width of the transform block). Information about the scanning mode used by the transform block is encoded in one or more of the following data units, including one or more parameter sets, a slice header, a coding unit or a transform block data unit, and then written to the code stream.

Optionally, the transform coefficients in the transform block are divided into one or more coefficient groups according to the size of the coefficient group, and the elements in the transform coefficient matrix are processed according to the determined scanning mode. The coefficient groups in the transform coefficient matrix are processed sequentially using the forward or inverse order of the scanning mode. For each coefficient group, the transform coefficients in the coefficient group are processed sequentially using the forward or inverse order of the scanning mode. The order of scanning the coefficient groups and the order of scanning the transform coefficients in the coefficient group may be the same or different. The bits generated by encoding the transform block are written to the code stream, and the bits represents one or more of the following information: the size of the coefficient group used by the transform block, a scanning mode used by the transform block, or the transform coefficients in the transform block.

Figure 3:
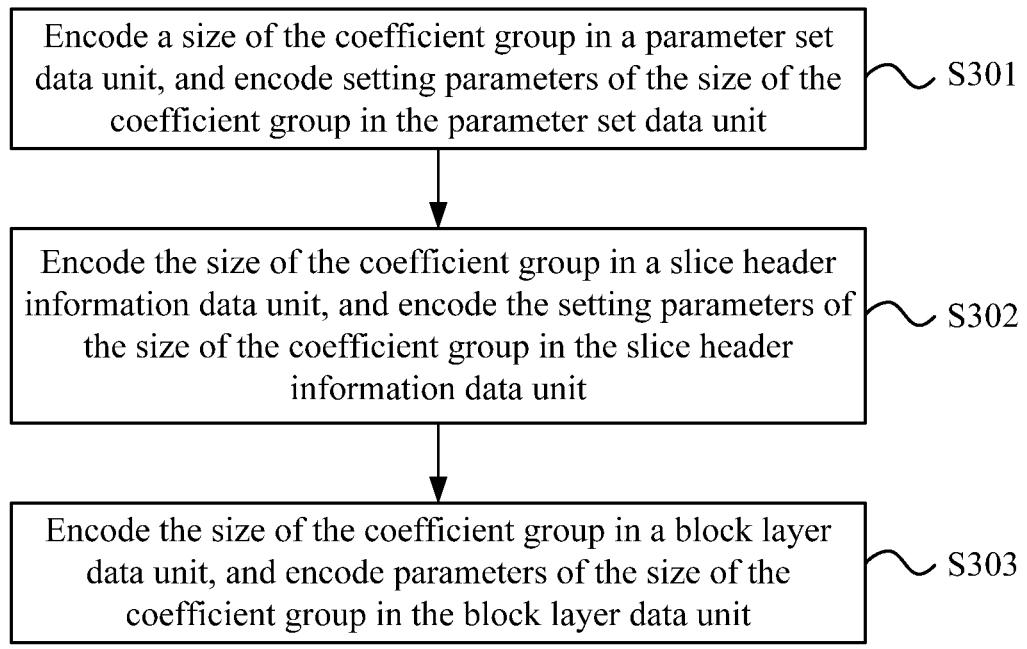
FIG. 3 is a flowchart of data processing of encoding the size of the coefficient group according to an embodiment of the disclosure.

FIG. 3 is a flowchart of data processing of encoding the size of the coefficient group according to an embodiment of the disclosure. The output of the processing process is a code stream obtained after parameters related to the size of the coefficient group are encoded.

In step S301, the size of the coefficient group is encoded in a parameter set data unit. The setting parameters of the size of the coefficient group are encoded in the parameter set data unit. The parameter set data unit refers to a parameter set data unit used for carrying parameter data applicable to the entire sequence, such as a video parameter set (VPS) in the H.256/HEVC standard and a sequence parameter set (SPS). The parameter set data unit may also include a parameter set data unit for carrying parameter data applicable to the picture, such as an adaptive parameter set (APS) and a picture parameter set (PPS) in the H.256/HEVC standard. In particular, when the parameters in the APS or PPS remain unchanged for each picture in the entire sequence, that is, the parameters in the APS or PPS are applicable to each picture in the entire sequence, the APS or PPS in this case is equivalent to a parameter set data unit carrying parameter data that is applicable to the entire sequence. Optionally, in particular, a manner may be set or a default set manner may be adopted to overwrite the corresponding data in the parameter set data unit applicable to the sequence with the data in the parameter set data unit applicable to the picture. The values of fields related to the size of the coefficient group in the parameter set data unit are set according to a configuration file. These fields are encoded, and the encoded bits are written to a code stream corresponding to the parameter set data unit. Herein, what recorded in the configuration file is used for setting the parameters in the initialization process.

A flag bit is set in the parameter set data unit for indicating whether multiple size of the coefficient groups are allowed to be used. When the flag bit indicates "Allowed to be used", the size of the coefficient group used for encoding the transform coefficients in the encoded block may be selected from more than one candidate size of the coefficient groups in the process of encoding the encoded block. When the flag bit indicates "Not allowed to be used", only a default set size of the coefficient group is used to encode the transform coefficients.

A default value of the size of the coefficient group may be encoded in the parameter set data unit. For example, when the minimum size of the transform block is set to 8×8, 4×4 or 8×8 is encoded in the parameter set data unit as the default value of the size of the coefficient group according to the parameter setting in the configuration file. Optionally, one encoding method is that the encoding of the default value of the size of the coefficient group may not depend on any flag bit. Optionally, another encoding method is to encode the default value of the size of the coefficient group in the parameter set data unit in a case where the preceding flag bit indicates "multiple size of the coefficient groups are not allowed to be used".

When the preceding flag bit indicates "multiple size of the coefficient groups are allowed to be used", the size of the coefficient groups allowed to be used are encoded.

Optionally, one encoding method is to encode the maximum and minimum size of the coefficient groups allowed to be used in the parameter set data unit, and implicitly derive other size of the coefficient groups allowed to be used in a set derivation manner from the largest to the smallest (e.g., in a quad-tree manner). For example, if the maximum and minimum size of the coefficient groups allowed to be used are set and encoded to be 32×32 and 4×4, respectively, then according to the preceding quad-tree manner, the size of the coefficient groups allowed to be used, which are indicated by the fields of the parameter set data unit, include 32×32, 16×16, 8×8, and 4×4. A second encoding method is to encode the maximum size of the coefficient group allowed to be used and the maximum division hierarchy according to the division manner (e.g., the quad-tree manner) in the parameter set data unit. For example, if the maximum size of the coefficient group allowed to be used is set and encoded to be 32×32 and the maximum allowable division hierarchy is set to 3, then the size of the coefficient groups allowed to be used, which are indicated by the fields of the parameter set data unit, include 32×32, 16×16, 8×8, and 4×4. Alternatively, the difference between the maximum and minimum size of the coefficient groups allowed to be used may be used to replace the maximum division hierarchy. In the above example, the difference between the maximum and minimum allowable values may be represented as log232−log24=3. A third encoding method is to encode the minimum size of the coefficient group allowed to be used and the maximum upward hierarchy according to the division manner (e.g., the quad-tree manner) in the parameter set data unit. For example, if the minimum size of the coefficient group allowed to be used is set and encoded to be 4×4 and the maximum upward hierarchy is set to 3, then the size of the coefficient groups allowed to be used, which are indicated by the fields of the parameter set data unit, include 32×32, 16×16, 8×8, and 4×4. Alternatively, the difference between the maximum and minimum size of the coefficient groups allowed to be used may be used to replace the maximum upward hierarchy. In the above example, the difference between the maximum and minimum allowable values may be represented as log232−log24=3.

Optionally, one encoding method is to encode the maximum and minimum side lengths of the coefficient group allowed to be used in the parameter set data unit, and implicitly derive other size of the coefficient groups allowed to be used in a set derivation manner from the maximum side length to the minimum side length (e.g., in a binary manner). For example, if the maximum and minimum side lengths are set and encode to be 16 and 4, respectively, then available side lengths of the coefficient group allowed to be used, which are indicated by the fields of the parameter set data unit, include 16, 8 and 4, and corresponding indicated size of the coefficient groups (represented in the form of "width× height") include 16×16, 16×8, 16×4, 8×16, 8×8, 8×4, 4×16, 4×8, and 4×4. A second encoding method is to encode the maximum side length of the coefficient group allowed to be used and the maximum division hierarchy according to the division manner (e.g., the binary manner) in the parameter set data unit. For example, if the maximum side length of the coefficient group allowed to be used is set and encoded to be 16 and the maximum division hierarchy is 2, then available side lengths of the coefficient group allowed to be used, which are indicated by the fields of the parameter set data unit, include 16, 8, and 4, and corresponding indicated size of the coefficient groups include 16×16, 16×8, 16×4, 8×16, 8×8, 8×4, 4×16, 4×8, and 4×4. Alternatively, the difference between the maximum and minimum side lengths of the coefficient group allowed to be used may be used to replace the maximum division hierarchy. In the above example, the difference between the maximum and minimum allowable values may be represented as log216−log24=2. A second encoding method is to encode the minimum side length of the coefficient group allowed to be used and the maximum upward hierarchy according to the division manner (e.g., the binary manner) in the parameter set data unit. For example, if the minimum side length of the coefficient group allowed to be used is set and encoded to be 4 and the maximum upward hierarchy is 2, then available side lengths of the coefficient group allowed to be used, which are indicated by the fields of the parameter set data unit, include 16, 8, and 4, and corresponding indicated sizes of the coefficient group include 16×16, 16×8, 16×4, 8×16, 8×8, 8×4, 4×16, 4×8, and 4×4. Alternatively, the difference between the maximum and minimum side lengths of the coefficient group allowed to be used may be used to replace the maximum upward hierarchy. In the above example, the difference between the maximum and minimum allowable values may be represented as log216−log24=2. A fourth encoding method is to set a flag bit for each of available side lengths in the parameter set data unit, where the flag bit is used for indicating whether a side length corresponding to this flag bit is allowed to be used. For example, when the available side lengths include 32, 16, 8, and 4 while the side lengths allowed to be used are 16, 8, and 4, in the parameter set data unit, the flag bit corresponding to the side length of 32 is set to "Not allowed to be used" and then encoded, and three flag bits corresponding to side lengths of 16, 8, and 4 respectively are set to "Allowed to be used" and encoded. In this manner, available side lengths of the coefficient group allowed to be used, which are indicated by the fields of the parameter set data unit, include 16, 8, and 4, and the corresponding indicated sizes of the coefficient group include 16×16, 16×8, 16×4, 8×16, 8×8, 8×4, 4×16, 4×8, and 4×4.

Optionally, one encoding method is to encode the maximum and minimum values allowed to be used of the width and height of the coefficient group in the parameter set data unit, and implicitly derive other size of the coefficient groups allowed to be used in a set derivation manner from the maximum width and height to the minimum width and height (e.g., in a binary manner). For example, if the maximum and minimum values allowed to be used of the width of the coefficient group are set and encoded to be 16 and 4 respectively and the maximum and minimum values allowed to be used of the height of the coefficient group are set and encoded to be 8 and 4 respectively, then the widths of the coefficient group allowed to be used, which are indicated by the fields of the parameter set data unit, include 16, 8 and 4, indicated heights of the coefficient group allowed to be used include 8 and 4, and the corresponding indicated size of the coefficient groups (represented in the form of "width×height") include 16×8, 16×4, 8×8, 8×4, 4×8, and 4×4. A second encoding method is to, in the parameter set data unit, encode the maximum width of the coefficient group allowed to be used and the maximum division hierarchy according to the division manner (e.g., the binary manner), and encode the maximum height of the coefficient group allowed to be used and the maximum division hierarchy according to the division manner (e.g., the binary manner). For example, if the maximum width of the coefficient group allowed to be used is set and encoded to be 16 and the maximum division hierarchy is 2 and the maximum height of the coefficient group allowed to be used is set and encoded to be 8 and the maximum division hierarchy is 1, then the widths of the coefficient group allowed to be used, which are indicated by the fields of the parameter set data unit, include 16, 8 and 4, indicated heights of the coefficient group allowed to be used include 8 and 4, and the corresponding indicated size of the coefficient groups (represented in the form of "width×height") include 16×8, 16×4, 8×8, 8×4, 4×8, and 4×4. Alternatively, the difference between the maximum and minimum widths of the coefficient group allowed to be used may be used to replace the maximum division hierarchy, and in the above example, the difference between the maximum and minimum allowable values may be represented as log216−log24=2. Alternatively, the difference between the maximum and minimum heights of the coefficient group allowed to be used may be used to replace the maximum division hierarchy, and in the above example, the difference between the maximum and minimum allowable values may be represented as log28−log24=1. A third encoding method is to, in the parameter set data unit, encode the minimum width of the coefficient group allowed to be used and the maximum upward hierarchy according to the division manner (e.g., the binary manner), and encode the minimum height of the coefficient group allowed to be used and the maximum division hierarchy according to the division manner (e.g., the binary manner). For example, if the minimum width of the coefficient group allowed to be used is set and encoded to be 4 and the maximum upward hierarchy is 2 and the minimum height of the coefficient group allowed to be used is set and encoded to be 4 and the maximum upward hierarchy is 1, then the widths of the coefficient group allowed to be used, which are indicated by the fields of the parameter set data unit, include 16, 8 and 4, indicated heights of the coefficient group allowed to be used include 8 and 4, and the corresponding indicated size of the coefficient groups (represented in the form of "width×height") include 16×8, 16×4, 8×8, 8×4, 4×8, and 4×4. Alternatively, the difference between the maximum and minimum widths of the coefficient group allowed to be used may be used to replace the maximum upward hierarchy, and in the above example, the difference between the maximum and minimum allowable values may be represented as log216−log24=2. Alternatively, the difference between the maximum and minimum heights of the coefficient group allowed to be used may be used to replace the maximum upward hierarchy, and in the above example, the difference between the maximum and minimum allowable values may be represented as log28−log24=1. A fourth encoding method is to set a flag bit for each available width and each available height in the parameter set data unit, where the flag bit is used for indicating whether a width and height corresponding to this flag bit are allowed to be used. For example, when the available width and height both include 32, 16, 8, and 4 while the widths allowed to be used are 16, 8, and 4 and the heights allowed to be used are 8 and 4, in the parameter set data unit, the flag bit corresponding to the width of 32 is set to "Not allowed to be used" and then encoded, three flag bits corresponding to the widths of 16, 8 and 4 are set to "Allowed to be used" and then encoded, two flag bits corresponding to the heights of 32 and 16 are set to "Not allowed to be used" and then encoded, and two flag bits corresponding to the heights of 8 and 4 are set to "Allowed to be used" and then encoded. In this manner, widths of the coefficient group allowed to be used, which are indicated by the fields of the parameter set data unit, include 16, 8, and 4, indicated heights of the coefficient group allowed to be used include 8 and 4, and the corresponding indicated size of the coefficient groups (represented in the form of "width×height") include 16×8, 16×4, 8×8, 8×4, 4×8, and 4×4.

Optionally, one encoding method is to set a flag bit for the size of each available coefficient group in the parameter set data unit, where the flag bit is used for indicating whether a size of the coefficient group corresponding to this flag bit is allowed to be used. For example, when the available size of the coefficient groups include 16×16, 16×8, 16×4, 8×16, 8×8, 8×4, 4×16, 4×8 and 4×4, if 16×8, 16×4, 8×8, 8×4, 4×8 and 4×4 are allowed to be used, the flag bits corresponding to these six size of the coefficient groups are set to "Allowed to be used" and encoded in the parameter set data unit while the flag bits corresponding to the other three size of the coefficient groups, i.e., 16×16, 8×16 and 4×16, are set to "Not allowed to be used" and encoded.

Optionally, in the parameter set data unit, the size of the coefficient group allowed to be used may be set separately for encoded blocks using different encoding modes by using the methods described above. For example, if the size of the coefficient groups allowed to be used, which are set for the encoded block of the intra prediction mode, are 8×8 and 4×4 and then encoded and the size of the coefficient groups allowed to be used, which are set for the encoded block of the inter prediction mode, are 16×16, 8×8 and 4×4 and then encoded, the size of the coefficient groups allowed to be used, which are indicated by the fields of the parameter set data unit, for the transform block in the encoded block using the intra prediction mode are 8×8 and 4×4, and the size of the coefficient groups allowed to be used for the transform block in the encoded block using the inter prediction mode are 16×16, 8×8 and 4×4.

Optionally, in the parameter set data unit, the size of the coefficient group allowed to be used may be set separately for transform blocks using different number of transforms by using the methods described above. For example, if the size of the coefficient groups allowed to be used, which are set for the transform block using one transform, are 8×8 and 4×4 and then encoded and the size of the coefficient groups allowed to be used, which are set for the transform block using multiple transforms, are 16×16, 8×8 and 4×4 and then encoded, the size of the coefficient groups allowed to be used, which are indicated by the fields of the parameter set data unit, for the transform block using one transform are 8×8 and 4×4, and the size of the coefficient groups allowed to be used for the transform block using multiple transforms are 16×16, 8×8 and 4×4.

Optionally, in the parameter set data unit, the size of the coefficient group allowed to be used may be set separately for transform blocks using different transform manners by using the methods described above. For example, if the size of the coefficient groups allowed to be used that are set for the transform block using the transform designed based on DCT are 8×8 and 4×4 and then encoded, the size of the coefficient groups allowed to be used that are set for the transform block using the transform designed based on DST are 16×16, 8×8 and 4×4 and then encoded, and the size of the coefficient groups allowed to be used that are set for the transform block using the transform designed based on KLT are 32×32, 16×16, 8×8 and 4×4 and then encoded, the size of the coefficient groups allowed to be used, which are indicated by the fields of the parameter set data unit, for the transform block using the transform designed based on DCT are 8×8 and 4×4, the size of the coefficient groups allowed to be used for the transform block using the transform designed based on DST are 16×16, 8×8 and 4×4, and the size of the coefficient groups allowed to be used for the transform block using the transform designed based on KLT are 32×32, 16×16, 8×8 and 4×4.

Optionally, in the parameter set data unit, a control parameter used for switching the size of the coefficient groups allowed to be used is set and encoded. For example, when the quantization parameter is used as the control parameter for switching the size of the coefficient groups allowed to be used, for example, in a defining manner of the quantization parameter in the H.256/HEVC standard, if the value of the quantization parameter is greater than or equal to 37, the size of the coefficient groups allowed to be used are 16×16, 8×8, and 4×4; if the value of the quantization parameter is less than 37 but greater than or equal to 27, the size of the coefficient group allowed to be used is 8×8; and if the value of the quantization parameter is less than 27, the size of the coefficient group allowed to be used is 4×4. The division intervals of the quantization parameter and the size of the coefficient groups allowed to be used in each interval are set in the parameter set data unit by using the preceding methods and then encoded.

Optionally, the size of the coefficient groups able to be used are preset in the profile/tier/level, and for different profiles/tiers/levels, the size of the coefficient group able to be used having one or more values is set. For example, for a lower level (for example, correspondingly for encoding the video with a resolution of 640×480 and below), the size of the coefficient group whose default value is equal to 4×4 is used; for a higher level (for example, correspondingly for encoding the video with a large resolution such as 720p, 1080p, and 2K), two size of the coefficient groups may be used, i.e., 8×8 and 4×4; and for the highest level (for example, correspondingly for encoding the video with a super resolution such as 4K and 8K), three size of the coefficient groups may be used, i.e., 16×16, 8×8 and 4×4. In the parameter set data unit, indication information of the profile/tier/level is encoded.

An optional code stream organization method using the methods described above is described below, and this method is used for the size of the coefficient groups allowed to be used. The fields of the code stream organization method are located in one or more parameter set data units. The fields included in the code stream generated by the code stream organization method are as follows.

TABLE 1

| Code stream organization in the parameter set data unit | |
|---|---|
| | Descriptor |
| ......  log2_min_cg_side_length  log2_diff_max_cg_side_length  ......  } | ue(v)  ue(v) |

The semantics of each syntax element in Table 1 is as follows:

log2_min_cg_side_length represents the minimum side length of the coefficient group, where the minimum side length of the coefficient group is equal to (1<<log2_min_cg_side_length), in which<<is the arithmetic right shift operator, and log2_min_cg_side_length is subject to entropy encoding using the method of ue(v); and log2_diff_max_cg_side_length represents the difference between the maximum and minimum side lengths of the coefficient group, where the maximum side length of the coefficient group is equal to (1<< (log2_min_cg_side_length+ log2_diff_max_cg_side_length)), and log2_diff_max_cg_side_length is subject to entropy encoding using the method of ue(v).

The method of setting parameters in Table 1 is shown in the following examples. For example, in the configuration file, when the coefficient group whose default size is 4×4 is used, the value of log2_min_cg_side_length is set to 2, the value of log2_diff_max_cg_side_length is set to 0, and these two fields are encoded using the method of ue(v) and encoded bits are written to the code stream.

For example, in the configuration file, when both the coefficient group with the minimum size of 4×4 and the coefficient group with the maximum size of 16×16 are used, the value of log2_min_cg_side_length is set to 2, the value of log2_diff_max_cg_side_length is set to 2, and these two fields are encoded using the method of ue(v) and encoded bits are written to the code stream. As described in the implementation methods described above, the available side lengths of the coefficient group allowed to be used, which are indicated by the fields of the parameter set data unit, include 16, 8, and 4, and the corresponding indicated size of the coefficient groups include 16×16, 16×8, 16×4, 8×16, 8×8, 8×4, 4×16, 4×8, and 4×4.

Another optional code stream organization method using the methods described above is described below, and this method is used for encoding the size of the coefficient groups allowed to be used by the transform blocks in the encoded blocks of the inter prediction mode and the intra prediction mode. The fields of the code stream organization method are located in one or more parameter set data units.

The fields included in the code stream generated by the code stream organization method are as follows.

TABLE 2

Code stream organization in the parameter set data unit

| | Descriptor |
|---|---|
| ...... | |
| log2_min_cg_side_length | ue(v) |
| log2_diff_max_inter_cg_side_length | ue(v) |
| log2_diff_max_intra_cg_side_length | ue(v) |
| ...... | |
| } | |

The semantics of each syntax element in Table 2 is as follows:

log2_min_cg_side_length represents the minimum side length of the coefficient group, where the minimum side length of the coefficient group is equal to (1<<log2_min_cg_side_length), in which<<is the arithmetic right shift operator, and log2_min_cg_side_length is subject to entropy encoding using the method of ue(v);

log2_diff_max_inter_cg_side_length represents the difference between the maximum and minimum side lengths of the coefficient group of the transform block in the encoded block using the inter prediction mode, where the maximum side length of the coefficient group is equal to (1<< (log2_min_cg_side_length_log2_diff_max_cg_side_length)), and log2_diff_max_cg_side_length is subject to entropy encoding using the method of ue(v); and log2_diff_max_intra_cg_side_length represents the difference between the maximum and minimum side lengths of the coefficient group of the transform block in the encoded block using the intra prediction mode, where the maximum side length of the coefficient group is equal to (1<< (log2_min_cg_side_length+ log2_diff_max_cg_side_length)), and log2_diff_max_cg_side_length is subject to entropy encoding using the method of ue(v).

The method of setting parameters in Table 2 is shown in the following examples. For example, in the configuration file, when the coefficient group whose default size is 4×4 is used, the value of log2_min_cg_side_length is set to 2, the value of both log2_diff_max_inter_cg_side_length and log2_diff_max_intra_cg_side_length is set to 0, and these two fields are encoded using the method of ue(v) and encoded bits are written to the code stream. In this case, the size of the coefficient group used by both the encoded block of the inter prediction mode and the encoded block of the intra prediction mode is 4×4.

For example, in the configuration file, when both the coefficient group with the minimum size of 4×4 and the coefficient group with the maximum size of 16×16 are used, the value of log2_min_cg_side_length is set to 2, the value of both log2_diff_max_inter_cg_side_length and log2_diff_max_intra_cg_side_length is set to 2, and these three fields are encoded using the method of ue(v) and encoded bits are written to the code stream. As described in the implementation methods described above, the available side lengths of the coefficient group allowed to be used, which are indicated by the fields of the parameter set data unit, include 16, 8, and 4, and the corresponding indicated sizes of the coefficient group include 16×16, 16×8, 16×4, 8×16, 8×8, 8×4, 4×16, 4×8, and 4×4. In this case, the same coefficient group allowed to be used is used in the transform blocks in the encoded block of the inter prediction mode and the encoded block of the intra prediction mode.

For example, in the configuration file, when both the coefficient group with the minimum size of 4×4, the coefficient group allowed to be used in the encoded block of the inter prediction mode with the maximum size of 16×16, and the coefficient group allowed to be used in the encoded block of the intra prediction mode with the maximum size of 8×8 are used, the value of log2_min_cg_side_length is set to 2, the value of log2_diff_max_inter_cg_side_length is set to 2, the value of log2_diff_max_intra_cg_side_length is set to 2, and these three fields are encoded using the method of ue(v) and encoded bits are written to the code stream. As described in the implementation methods described above, the available side lengths of the coefficient group allowed to be used by the encoded block of the inter prediction mode, which are indicated by the fields of the parameter set data unit, include 16, 8, and 4, and the corresponding indicated sizes of the coefficient group include 16×16, 16×8, 16×4, 8×16, 8×8, 8×4, 4×16, 4×8, and 4×4; and the available side lengths of the coefficient group allowed to be used by the encoded block of the intra prediction mode, which are indicated by the fields of the parameter set data unit, include 8 and 4, and the corresponding indicated size of the coefficient groups include 8×8, 8×4, 4×8, and 4×4. In this case, the coefficient groups allowed to be used in the transform blocks in the encoded block of the inter prediction mode and the encoded block of the intra prediction mode are not completely the same.

In step S302, the size of the coefficient group is encoded in a slice header information data unit. The setting parameters of the size of the coefficient group are encoded in the slice header information data unit.

The parameter set identifier of the parameter set that the slice refers to is encoded in the slice header information data unit. In the process of encoding the slice, the size of the coefficient groups able to be used, which are set in the parameter set that the slice refers to, may be used.

Optionally, in particular, information of the size of the coefficient groups able to be used may be encoded in slice header information to correspondingly overwrite the corresponding parameter setting in the parameter set that the slice refers to. The encoding methods used herein are the same as the methods of encoding the size of the coefficient group in the parameter set in step S301 except for the method of indicating the size of the coefficient group by encoding the profile/tier/level, but the encoded bits are written to the code stream of the slice header information data unit.

Optionally, when the parameter set that the slice refers to does not include parameters related to the size of the coefficient group, the size of the coefficient groups able to be used may be encoded in the slice header information. The encoding methods used herein are the same as the methods of encoding the size of the coefficient group in the parameter set in step S301 except for the method of indicating the size of the coefficient group by encoding the profile/tier/level, but the encoded bits are written to the code stream of the slice header information data unit.

In step S303, the size of the coefficient group is encoded in a block layer data unit. The parameters of the size of the coefficient group are encoded in the block layer data unit.

In the block layer data unit, a parameter used for indicating the size of the coefficient group used by the transform block in the encoded block is encoded. For example, one encoding method is to encode the used size of the coefficient group in the block layer data unit. For example, one encoding method is to encode one index value in the block layer data unit, where the index value corresponds to one size of the coefficient group. For example, one encoding method is to encode one or more flag information in the block layer data unit, where the flag information is used for indicating that the transform block in the encoded block uses the same size of the coefficient group as one encoded transform block indicated by the flag information, and the encoded transform block may be an encoded transform block (e.g. upper adjacent block, left adjacent block, etc.) located in the same picture as the transform block, or may be an encoded block (i.e., time domain adjacent block) that is not located in the same picture as the transform block. For example, the flag information having "the same size of the coefficient group as the upper adjacent transform block" is encoded in the block layer data unit.

Figure 4:
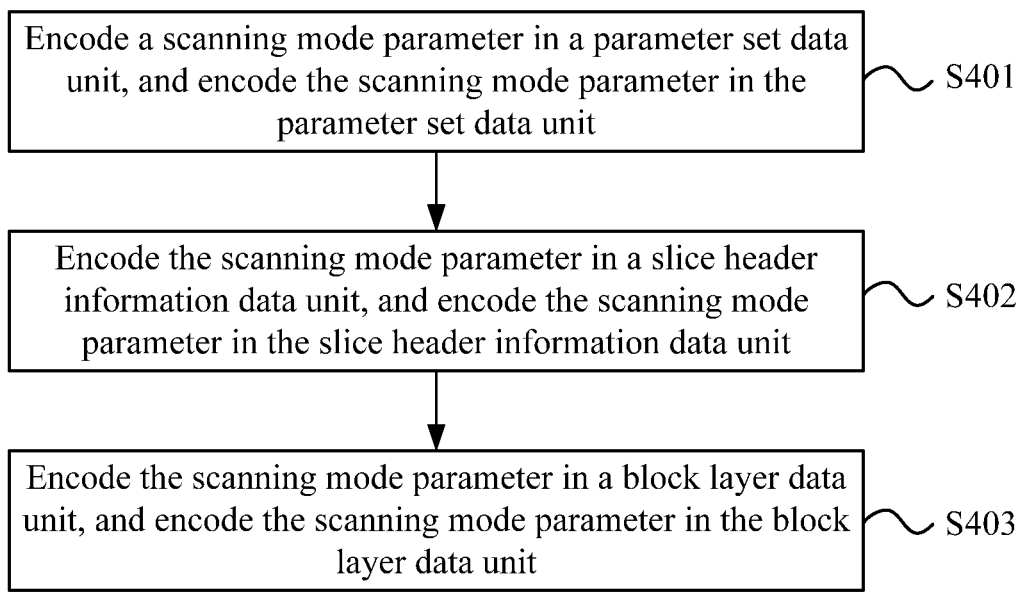
FIG. 4 is flowchart of data processing of encoding a scanning mode parameter according to an embodiment of the disclosure.

FIG. 4 is a flowchart of data processing of encoding a scanning mode parameter according to an embodiment of the disclosure.

Optionally, the output of the processing process is a code stream obtained after parameters related to the scanning mode are encoded.

In step S401, the scanning mode parameter is encoded in a parameter set data unit. The scanning mode parameter is encoded in the parameter set data unit.

Indication information of scanning modes allowed to be used is encoded in the parameter set data unit. The scanning mode may be a scanning mode having a preset fixed path, or may be a scanning mode having a non-fixed path. When the scanning mode having a non-fixed path is used, optionally, a correspondence of coordinates of the transform coefficient before and after scanning is encoded in the parameter set data unit. For example, for a transform coefficient whose coordinate position is equal to (m, n) in the transform block (or whose index number is equal to m×nTbS+n, where nTbS is the width of the transform block), the corresponding number position of this transform coefficient after the scanning is equal to k.

Optionally, the sizes of the coefficient group able to be used are preset in the profile/tier/level, and for different profiles/tiers/levels, one or more scanning modes able to be used are set. For example, for a lower level (for example, correspondingly for encoding the video with a resolution of 640×480 and below), the default diagonal up-right scanning mode, horizontal scanning mode of the transform coefficients and vertical scanning mode are used; for a higher level (for example, correspondingly for encoding the video with a large resolution such as 720p, 1080p, and 2K), besides the preceding three default scanning modes used for the lower level, a zig-zag scanning mode and other diagonal scanning modes (e.g. diagonal down-right, diagonal up-left, etc.,) may also be used; and for the highest level (for example, correspondingly for encoding the video with a super resolution such as 4K and 8K), besides the preceding scanning modes, a scanning mode having a non-fixed scan path may also be used. In the parameter set data unit, indication information of the profile/tier/level is encoded. For the scanning mode having a non-fixed path, a correspondence of coordinates of the transform coefficient before and after scanning is encoded in the parameter set data unit. For example, for a transform coefficient whose coordinate position is equal to (m, n) in the transform block (or whose index number is equal to m×nTbS+n, where nTbS is the width of the transform block), the corresponding number position of this transform coefficient after the scanning is equal to k.

In step S402, the scanning mode parameter is encoded in a slice header information data unit. The scanning mode parameter is encoded in the slice header information data unit.

The parameter set identifier of the parameter set that the slice refers to is encoded in the slice header information data unit. In the process of encoding the slice, the scanning modes able to be used, which are set in the parameter set that the slice refers to, may be used.

Optionally, in particular, the scanning mode parameter able to be used may be encoded in slice header information to correspondingly overwrite the corresponding parameter setting in the parameter set that the slice refers to. The encoding methods used herein are the same as the methods of encoding the scanning mode parameter in the parameter set in step S401 except for the method of indicating the scanning mode by encoding the profile/tier/level, but the encoded bits are written to the code stream of the slice header information data unit.

Optionally, when the parameter set that the slice refers to does not include the scanning mode parameter, the scanning mode parameters able to be used may be encoded in the slice header information. The encoding methods used herein are the same as the methods of encoding the scanning mode parameter in the parameter set in step S401 except for the method of indicating the scanning mode by encoding the profile/tier/level, but the encoded bits are written to the code stream of the slice header information data unit.

Optionally, a correspondence of coordinates of the transform coefficient before and after scanning is encoded in the slice header information data unit. For example, for a transform coefficient whose coordinate position is equal to (m, n) in the transform block (or whose index number is equal to m×nTbS+n, where nTbS is the width of the transform block), the corresponding number position of this transform coefficient after the scanning is equal to k.

In step S403, the scanning mode parameter is encoded in a block layer data unit. The scanning mode parameter is encoded in the block layer data unit.

In the block layer data unit, a parameter used for indicating the scanning mode used by the transform block in the encoded block is encoded. For example, one encoding method is to encode one index value in the block layer data unit, where the index value corresponds to one scanning mode. Optionally, one encoding method is to encode a correspondence of coordinates of the transform coefficient before and after scanning in the block layer data unit. For example, for a transform coefficient whose coordinate position is equal to (m, n) in the transform block (or whose index number is equal to m×nTbS+n, where nTbS is the width of the transform block), the corresponding number position of this transform coefficient after the scanning is equal to k. For example, one encoding method is to encode one or more flag information in the block layer data unit, where the flag information is used for indicating that the transform block in the encoded block uses the same scanning mode as one encoded transform block indicated by the flag information, and the encoded transform block may be an encoded transform block (e.g. upper adjacent block, left adjacent block, etc.) located in the same picture as the transform block, or may be an encoded block (i.e., time domain adjacent block) that is not located in the same picture as the transform block. For example, the flag information having "the same scanning mode as the upper adjacent transform block" is encoded in the block layer data unit.

From the description the preceding embodiment, it will be apparent to those skilled in the art that the method in the preceding embodiment may be implemented by software plus a necessary general-purpose hardware platform, or may of course be implemented by hardware. However, in many cases, the former is a preferred implementation. Based on this understanding, the solution provided by the present application may be embodied in the form of a computer software product. The computer software product is stored in a storage medium (such as a read-only memory (ROM)/ random access memory (RAM), a magnetic disk or an optical disk) and includes several instructions for enabling a terminal device (which may be a mobile phone, a computer, a server, a network device, or the like) to execute the method according to each embodiment of the present application.

Embodiment Two

Figure 5:
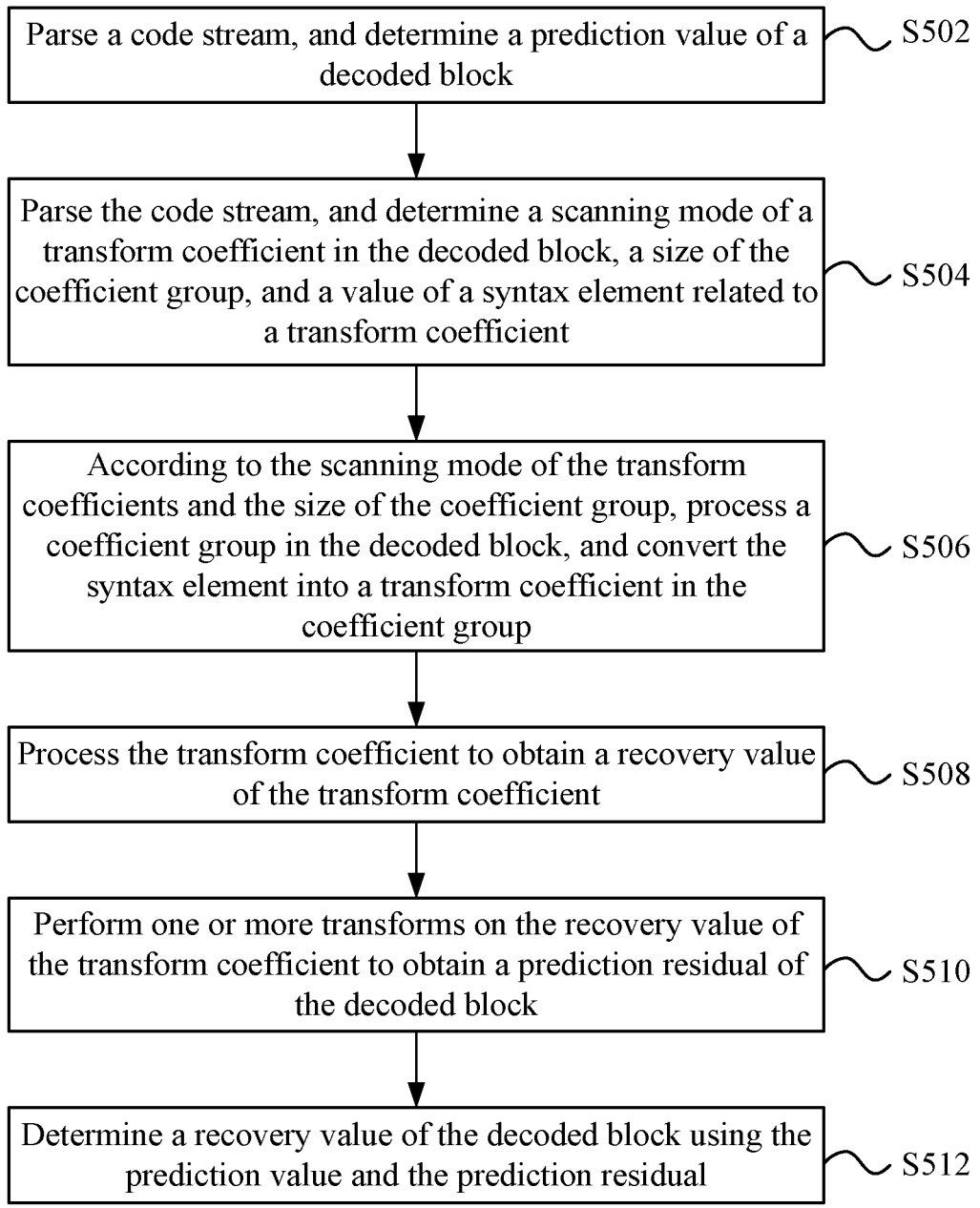
FIG. 5 is a flowchart of a method for decoding a picture according to an embodiment of the disclosure.

This embodiment provides a method for decoding a picture executed on the mobile terminal described above. FIG. 5 is a flowchart of a method for decoding a picture according to an embodiment of the present disclosure. As shown in FIG. 5, the data processing includes steps S502, S504, S506, S508, S510, and S512.

In step S502, a code stream is parsed, and a prediction value of a decoded block is determined.

In step S504, the code stream is parsed, and a scanning mode of a transform coefficient in the decoded block, a size of the coefficient group, and a value of a syntax element related to a transform coefficient are determined.

In step S506, according to the scanning mode of the transform coefficients and the size of the coefficient group, a coefficient group in the decoded block is processed, and the syntax element is converted into a transform coefficient in the coefficient group.

In step S508, the transform coefficient is processed to obtain a recovery value of the transform coefficient.

In step S510, one or more transforms are performed on the recovery value of the transform coefficient to obtain a prediction residual of the decoded block.

In step S512, a recovery value of the decoded block is determined using the prediction value and the prediction residual.

Optionally, the step in which the code stream is parsed and the prediction value of the decoded block is determined includes at least one of the following manners: parsing the code stream to obtain an inter prediction parameter of the decoded block, and determining the prediction value of the decoded block using one or more decoded pictures as reference pictures according to the inter prediction parameter; or parsing the code stream to obtain an intra prediction parameter of the decoded block, and determining the prediction value of the decoded block using a decoded portion in a picture where the decoded block is located as a reference according to the intra prediction parameter.

Optionally, the step in which the code stream is parsed and the size of the coefficient group of the transform coefficient in the decoded block is determined includes: parsing the code stream to obtain a first coefficient group parameter from a data unit in the code stream, and determining the size of the coefficient group according to the first coefficient group parameter, where the data unit in the code stream includes at least one of: one or more parameter sets, a slice header, or a block layer data unit.

Optionally, the step in which the size of the coefficient group is determined according to the first coefficient group parameter includes: setting the size of the coefficient group using the first coefficient group parameter.

Optionally, the step in which the size of the coefficient group is determined according to the first coefficient group parameter includes: the first coefficient group parameter indicating an adjacent decoded block of the decoded block, and setting the size of the coefficient group using a size of the coefficient group of the adjacent decoded block.

Optionally, the step in which the size of the coefficient group is determined according to the first coefficient group parameter includes: determining the size of the coefficient group of the transform coefficient in the decoded block from candidate values of the size of the coefficient group according to the first coefficient group parameter.

Optionally, the method further includes: the first coefficient group parameter including an index number, and setting the size of the coefficient group using a size of the coefficient group corresponding to the index number in the candidate values.

Optionally, the method further includes: the first coefficient group parameter including a flag bit, and setting the size of the coefficient group using a size of the coefficient group corresponding to the flag bit in the candidate values.

Optionally, the candidate values of the size of the coefficient group are one or more fixed values.

Optionally, the method further includes: the first coefficient group parameter including an identification parameter, and configuring the candidate values of the size of the coefficient group using the identification parameter.

Optionally, the identification parameter includes at least one of: a size of a coefficient group, a side length of a coefficient group, or a width and a height of a coefficient group.

Optionally, the candidate values of the size of the coefficient group are configured using the identification parameter in one or more of the following manners: obtaining maximum and minimum values of the identification parameter, determining a value of the identification parameter excluding the maximum and minimum values according to a preset division manner, and setting the candidate values using the value of the identification parameter; obtaining the maximum value of the identification parameter and a maximum division hierarchy of the coefficient group, determining a value of the identification parameter excluding the maximum value according to the preset division manner, and setting the candidate values using the value of the identification parameter; obtaining the maximum value of the identification parameter and a different between maximum and minimum values of the size of the coefficient group, determining a value of the identification parameter excluding the maximum value according to the preset division manner, and setting the candidate values using the value of the identification parameter; obtaining the minimum value of the identification parameter and a maximum upward division hierarchy of the coefficient group, determining a value of the identification parameter excluding the minimum value according to the preset division manner, and setting the candidate values using the value of the identification parameter; or obtaining the maximum value of the identification parameter and the different between the maximum and minimum values of the size of the coefficient group, determining a value of the identification parameter excluding the minimum value according to the preset division manner, and setting the candidate values using the value of the identification parameter.

Optionally, the preset division manner includes at least one of: a quaternary division, a trinary division, or a binary division.

Optionally, the step in which the candidate values of the size of the coefficient group are configured using the identification parameter includes: setting the candidate values using a default value of the identification parameter.

Optionally, the step in which the candidate values of the size of the coefficient group are configured using the identification parameter includes: the identification parameter being one or more flag bits indicating whether a corresponding size of the coefficient group is included in the candidate values, and setting the size of the coefficient group included in the candidate values according to the identification parameter.

Optionally, the step in which the candidate values of the size of the coefficient group are configured using the identification parameter includes: the identification parameter indicating one or more size of the coefficient groups corresponding to a preset profile/tier/level, and setting the size of the coefficient group included in the candidate values according to the identification parameter.

Optically, the step in which the size of the coefficient group is determined according to the first coefficient group parameter includes: the first coefficient group parameter including a first decoding parameter of the decoded block, and setting the size of the coefficient group as a size of the coefficient group corresponding to the first decoding parameter according to the first decoding parameter of the decoded block, where the first decoding parameter includes at least one of: a size of a transform block included in the decoded block, a prediction mode of the decoded block, a transform type used by the transform block included in the decoded block, or a quantization parameter.

Optionally, the step in which the size of the coefficient group is set as the size of the coefficient group corresponding to the first decoding parameter includes: in response to the size of the transform block included in the decoded block being equal to a first preset value, setting the size of the coefficient group as a size of the coefficient group corresponding to the first preset value. Optionally, the method further includes: obtaining the size of the coefficient group corresponding to the first preset value according to the first coefficient group parameter.

Optionally, the step in which the size of the coefficient group of the transform coefficients in the encoded block is set as the size of the coefficient group corresponding to the first encoding parameter according to the first encoding parameter of the encoded block includes: in response to the prediction mode of the encoded block being equal to a first preset mode, setting the size of the coefficient group as a size of the coefficient group corresponding to the first preset mode.

Optionally, the method further includes: obtaining the size of the coefficient group corresponding to the first preset mode according to the first coefficient group parameter.

Optionally, the step in which the size of the coefficient group is set as the size of the coefficient group corresponding to the first decoding parameter includes: when the transform type used by the transform block included in the decoded block is equal to a first transform type, setting the size of the coefficient group as a size of the coefficient group corresponding to the first transform type.

Optionally, the method further includes: obtaining the size of the coefficient group corresponding to the first transform type according to the first coefficient group parameter.

Optionally, the step in which the size of the coefficient group is set as the size of the coefficient group corresponding to the first decoding parameter includes: when a value of the quantization parameter is equal to a second preset value, setting the size of the coefficient group as a size of the coefficient group corresponding to the second preset value; or when the value of the quantization parameter is within a first preset value range, setting the size of the coefficient group as a size of the coefficient group corresponding to the first preset value range.

Optionally, the method further includes: obtaining the size of the coefficient group corresponding to the second preset value according to the first coefficient group parameter, or obtaining the size of the coefficient group corresponding to the first preset value range according to the first parameter group parameter.

Optionally, the step in which the code stream is parsed and the size of the coefficient group of the transform coefficient in the decoded block is determined includes: parsing the data unit in the code steam to obtain a first scanning mode parameter, and determining the scanning mode of the transform coefficient according to the first scanning mode parameter, where the scanning mode is an order to process elements in a two-dimensional matrix of the transform coefficient, and the data unit in the code stream includes at least one of: one or more parameter sets, a slice header, or a block layer data unit.

Optionally, the step in which the data unit in the code steam is parsed to obtain the first scanning mode parameter and the scanning mode of the transform coefficient is determined according to the first scanning mode parameter includes: using a scanning mode indicated by the first scanning mode parameter as the scanning mode of the transform coefficient.

Optionally, the step in which the scanning mode indicated by the first scanning mode parameter is used as the scanning mode of the transform coefficient includes: the first scanning mode parameter indicating an adjacent decoded block of the decoded block, and setting the scanning mode of the transform coefficient using a scanning mode of the adjacent decoded block.

Optionally, the step in which the scanning mode indicated by the first scanning mode parameter is used as the scanning mode of the transform coefficient further includes: determining the scanning mode of the transform coefficient from candidate scanning modes according to the first scanning mode parameter.

Optionally, the method further includes: the first scanning mode parameter including a scanning mode index number, and setting the scanning mode of the transform coefficient using a scanning mode corresponding to the scanning mode index number in the candidate scanning modes.

Optionally, the method further includes: the first scanning mode parameter including a scanning mode indication flag bit, and setting the scanning mode of the transform coefficient using a scanning mode corresponding to the scanning mode indication flag bit in the candidate scanning modes.

Optionally, the candidate scanning modes include at least one of: one or more fixed scanning modes or the candidate scanning mode configured using the first scanning mode parameter.

Optionally, the step in which the candidate scanning mode is configured using the first scanning mode parameter includes: the first scanning mode parameter including a default scanning mode, and setting the candidate scanning mode using the default scanning mode.

Optionally, the step in which the candidate scanning mode is configured using the first scanning mode parameter includes: the first candidate scanning mode parameter including one or more candidate scanning mode indication flag bits, and setting the candidate scanning mode using a scanning mode corresponding to the one or more candidate scanning mode indication flag bits.

Optionally, the step in which the candidate scanning mode is configured using the first scanning mode parameter includes: setting the candidate scanning mode using one or more scanning modes corresponding to a preset profile/tier/level indicated by the first scanning mode parameter.

Optionally, the step in which the candidate scanning mode is configured using the first scanning mode parameter includes: setting the candidate scanning mode using a correspondence between a position of the transform coefficient indicated by the first scanning mode parameter and a position of the scanned transform coefficient after scanning.

Optically, the step in which the data unit in the code steam is parsed to obtain the first scanning mode parameter, and the scanning mode of the transform coefficient is determined according to the first scanning mode parameter includes: the first scanning mode parameter including a second decoding parameter of the decoded block, and determining the scanning mode of the transform coefficient according to the second decoding parameter, where the second decoding parameter includes at least one of: a size of a transform block included in the decoded block, a prediction mode of the decoded block, a transform type used by the transform block included in the decoded block, or a size of the decoded block.

Optionally, the step in which the scanning mode of the transform coefficient is set as the scanning mode corresponding to the second decoding parameter according to the second decoding parameter includes: in response to the size of the transform block included in the decoded block being equal to a third preset value, setting the scanning mode of the transform coefficient as a scanning mode corresponding to the third preset value.

Optionally, the method further includes: obtaining the scanning mode corresponding to the third preset value according to the first coefficient group parameter.

Optionally, the step in which the scanning mode of the transform coefficient is set as the scanning mode corresponding to the second decoding parameter according to the second decoding parameter includes: when the prediction mode of the decoded block is equal to a second preset mode, setting the scanning mode of the transform coefficient as a scanning mode corresponding to the second preset mode.

Optionally, the method further includes: obtaining the scanning mode corresponding to the second preset mode according to the first coefficient group parameter.

Optionally, the step in which the scanning mode of the transform coefficient is set as the scanning mode corresponding to the second decoding parameter according to the second decoding parameter includes: when the transform type used by the transform block included in the decoded block is equal to a second transform type, setting the scanning mode of the transform coefficient as a scanning mode corresponding to the second transform type.

Optionally, the method further includes: obtaining the scanning mode corresponding to the second transform type according to the first coefficient group parameter.

Optionally, the step in which the scanning mode of the transform coefficient is set as the scanning mode corresponding to the second decoding parameter according to the second decoding parameter includes: when the size of the decoded block is equal to a fourth preset value, setting the scanning mode of the transform coefficient as a scanning mode corresponding to the fourth preset value.

Optionally, the method further includes: obtaining the scanning mode corresponding to the fourth preset value according to the first coefficient group parameter.

Optionally, the step in which the code stream is parsed and the value of the syntax element related to the transform coefficient is determined includes that the syntax element includes at least one of: a syntax element indicating a starting position of a non-zero coefficient; a syntax element indicating that a coefficient group includes a non-zero coefficient; a syntax element indicating a position of a non-zero coefficient in a coefficient group; or a syntax element indicating a value of a non-zero coefficient in a coefficient group.

Optionally, the step in which the transform coefficient is processed to obtain the recovery value of the transform coefficient includes: in response to determining to perform scaling processing on the transform coefficient, performing the scaling processing on the transform coefficient to obtain the recovery value of the transform coefficient; or in response to determining not to perform scaling processing on the transform coefficient, setting the recovery value of the transform coefficient using the transform coefficient.

Optionally, before the processing is performed on the transform coefficient, the method further includes: parsing the code stream to obtain a third parameter for constructing a recovery value of the prediction residual of the decoded block, and determining whether to perform the scaling processing on the transform coefficient according to the third parameter.

Optionally, the step in which the recovery value of the decoded block is determined using the prediction value and the prediction residual further includes: performing in-loop filtering processing on the sum of the prediction value and the prediction residual.

Optionally, an inputted code stream is parsed, and one or more bit strings of "0" and "1" corresponding to each field in the code stream are converted into values of the corresponding parameters using an entropy decoding method and a binarization method specified in the standard. Values of other parameters are derived according to the values of the parameters. For example, when the value of a flag bit in the code stream indicates that a decoded block is a first decoded block in a picture, a parameter used for indicating an address of the first decoded block which is in a slice where the decoded block is located in the picture is set to 0.

Optionally, a parameter used for constructing the recovery value of the prediction residual of the decoded block is a transform coefficient which may be represented in the form of an M×N two-dimensional matrix, where M and N are positive integers, and M and N may be equal or unequal. The two-dimensional matrix may correspond to one transform block, and thus in the following description, the "transform block" is used to refer to the transform coefficients represented in the form of an M×N two-dimensional matrix. When indication information obtained by parsing the code stream indicates that the scaling operation is performed on the transform block, the recovered transform coefficients correspond to quantization values (i.e. "Level") values) outputted in the quantization process in the encoder in Embodiment one; otherwise, when the indication information obtained by parsing the code stream indicates that the scaling operation is not performed on the transform block, the recovered transform coefficients correspond to the preceding data obtained after the encoder transforms the prediction residual.

Optionally, the size of the coefficient group is determined, and the coefficient group includes W×H transform coefficients, where W and H are positive integers, W and H may be equal or unequal, and W≤M and H≤N. The transform block is composed of one or more coefficient groups.

Optionally, the size of the coefficient group able to be used may be a preset fixed value, or the size of the coefficient group able to be used may be obtained by parsing one or more data units in the code stream, including one or more parameter sets, a slice header, and a coding unit.

Optionally, the size of the coefficient group may be determined using an implicit derivation manner. The size of the coefficient group of the transform block may be determined according to one or more parameters obtained by parsing the code stream, such as a coding mode of a decoded block in which the transform block is located, a size of the transform block, a quantization parameter, a transform type used by the transform block, etc. Corresponding to the preceding encoder embodiment, in the following examples, two size of the coefficient groups, i.e., 4×4 and 8×8, can be used. This method can be extended to a case where more size of the coefficient groups can be used The size of the coefficient groups able to be used may be parameters obtained by parsing the code stream, or may be fixed configured values. The size of the coefficient group can be determined using one method in the following examples or jointly determined using multiple methods.

For example, the size of the coefficient group is set to 8×8 when the size of the transform block in the decoded block is greater than 16×16, and the size of the coefficient group is set to 4×4 when the size of the transform block in the decoded block is less than or equal to 16×16. For non-square rectangular transform blocks, the correspondingly used size of the coefficient group may be set according to the height and width of the transform block. For example, when the smaller one of the height and the width of the transform block is greater than 16, a rectangular coefficient group of which the smaller one of the height and the width is equal to 8 is used; otherwise, a rectangular coefficient group of which the smaller one of the height and the width is equal to 4 is used.

For example, the size of the coefficient group used for the transform block in the decoded block of the inter prediction mode is set to 8×8 (the size of the coefficient group fused by the transform blocks of 8×8 and 4×4 is set to 4×4), and the size of the coefficient group used by the transform block in the decoded block of the intra prediction mode is set to 8×8 (the size of the coefficient group used by the transform blocks of 16×16, 8×8 and 4×4 is set to 4×4).

For example, according to a quantization parameter of the decoded block, the value of the size of the coefficient group used by the transform block included in the decoded block is determined. The following is illustrated using an example of a setting manner of the quantization parameter in the H.256/HEVC standard. One implementation is that when the value of the quantization parameter is greater than or equal to 37, the size of the coefficient group is set to 8×8 (the size of the coefficient group used by the transport bocks of 8×8 and 4×4 is set to 4×4); otherwise, the size of the coefficient group is set to 4×4.

For example, for the decoded block using the transform designed based on discrete cosine transform (DCT), the size of the coefficient group is set to 8×8 (the size of the coefficient group used by transform blocks of 8×8 and 4×4 is set to 4×4). For the decoded block using the transform designed based on discrete sine transform (DST), the size of the coefficient group is set to 4×4. For the decoded block using the transform designed based on Karhunen-Loève Transform (KLT), the size of the coefficient group is set to 8×8 (the size of the coefficient group used by transform blocks of 8×8 and 4×4 is set to 4×4). For the decoded block using two or more transforms, the size of the coefficient group is set to 8×8 (the size of the coefficient group used by transform blocks of 8×8 and 4×4 is set to 4×4).

Optionally, identification information for indicating the size of the coefficient group used by the transform block is obtained by parsing one or more of the following data units in the code stream, including one or more parameter sets, a slice header, a coding unit, or a transform block data unit.

Optionally, the scanning mode of the transform coefficient is determined. In the processing process of the preceding encoder in Embodiment one, the scanning mode refers to an order to process elements in the two-dimensional matrix of the transform coefficients, and generally, this processing order also corresponds to the order in which the preceding encoder writes the transform coefficients to the code stream. Therefore, correspondingly, in the processing process, in combination with other relevant parameters (e.g., a non-zero coefficient flag bit, etc.), the scanning mode indicates the position of each transform coefficient in the transform block, according to the order of obtaining transform coefficients in the code stream by parsing the code stream. For example, according to the scanning mode, the preceding encoder writes the transform coefficient whose coordinate position in the transform block is (m, n) to the code stream in a $k^{th}$ order, and after obtaining a $k^{th}$ transform coefficient from the code stream, sets this transform coefficient to an element whose coordinate position in the transform block is (m, n). Generally, in the processing process of the preceding encoder, when the elements in one two-dimensional matrix with M rows and N columns are read in the (forward or inverse) order indicated by the scanning mode, a one-dimensional matrix with 1 row and M×N columns (or a one-dimensional matrix with M×N rows and 1 column) may be equivalently obtained. Correspondingly, in the order (forward or inverse) indicated by the scanning mode, the one-dimensional matrix with 1 row and M×N columns (or the one-dimensional matrix with M×N rows and 1 column) obtained by parsing the code stream may be rearranged into a two-dimensional matrix with 1 row and M×N columns which is consistent with the input matrix of the encoder. Similarly to the preceding encoder, the preset one or more scanning modes for the transform coefficient matrix may be used, for example, a zig-zag scanning order, horizontal scanning order, vertical scanning order, diagonal scanning order (e.g. diagonal up-right scanning order), etc.

Optionally, the scanning mode of the transform coefficient matrix of the transform block may be determined using an implicit derivation manner. The scanning mode of the transform block may be determined according to one or more parameters obtained by parsing the code stream, such as a coding mode of a decoded block in which the transform block is located, a size of the decoded block, a size of the transform block, etc.

For example, the inter prediction mode is set to use the diagonal right-up scanning mode, the intra prediction mode when the size of the decoded block is greater than 8×8 is set to use the diagonal right-up scanning mode, the intra prediction mode when the size of the decoded block is less than or equal to 8×8 is set to use the scanning mode in which the intra prediction direction indicates the direction, and the direct current (DC) mode, the planar mode and other modes that do not use directional prediction are set to use the diagonal right-up scanning mode. Optionally, the intra prediction directions may be categorized, and each category corresponds to different scanning modes. For example, the intra prediction direction in the vertical direction and the intra prediction direction with a specified angle offset to left and right in the vertical direction correspond to the vertical scanning mode, the intra prediction direction in the horizontal direction and the intra prediction direction with a specified angle offset up and down in the horizontal direction correspond to the horizontal scanning mode, and the intra prediction direction of an angle of 45 degrees and the intra prediction with a specified angle offset up and down in this angular direction correspond to the diagonal scanning mode.

Optionally, information for indicating the scanning mode used by the transform block is obtained by parsing one or more of the following data units in the code stream, including one or more parameter sets, a slice header, a coding unit, or a transform block data unit.

Optionally, information of the scanning mode is obtained by parsing one or more of the following data units in the code stream, including one or more parameter sets, a slice header, a coding unit, or a transform block data unit. The scanning mode of the transform block is determined according to scanning mode information. A representation manner of the scanning mode information is the correspondence table between the positions of the transform coefficients in the transform block and the positions of the transform coefficients after the scanning. It is to be noted that, in the preceding encoder, the correspondence table refers to that for a transform coefficient whose coordinate position is equal to (m, n) in the transform block (or whose index number is equal to m×nTbS+n, where nTbS is the width of the transform block), the corresponding number position of this transform coefficient after the scanning is equal to k. Correspondingly, in this embodiment, the equivalence information indicated by the correspondence table is that the position coordinates of a transform coefficient which is obtained by parsing the code stream and whose position number is equal to k in the transform block are (m, n) (or the index number of this transform coefficient is equal to m×nTbS+n, where nTbS is the width of the transform block). In particular, it is to be specially noted that in comparison with the method, the various scanning modes determined in the preceding method process the coefficient groups in the transform block and the transform coefficients in the coefficient groups in a fixed order, and that different scanning modes defines different scanning orders.

Optionally, the transform coefficients in the transform block are parsed. The position of each coefficient group included in the transform block is determined according to the size of the transform block and the size of the coefficient group. The position of the coefficient group may be represented as the coordinates of the position of the upper left coefficient of the coefficient group in the transform block (or decoded picture). The coefficient groups are processed sequentially according to the order indicated by the scanning mode. For one coefficient group, according to the order indicated by the scanning mode, the values of the corresponding elements in the coefficient group are set to the values of the transform coefficients obtained by parsing the code stream. In particular, when an indication indicating that the transform coefficients included in one coefficient group all are 0 (or equivalently, that this coefficient group does not include non-zero transform coefficients) is obtained by parsing the code stream, a parsing unit sets all the coefficients included in this coefficient group to 0. The order of processing the coefficient groups in the transform block and the order of processing the transform coefficients in the coefficient group may be the same or different.

Optionally, the prediction value of the decoded block is also constructed according to a parameter used for constructing the prediction value of the decoded block. The prediction value of the decoded block is constructed according to a decoded picture stored in a partial decoded picture buffer region in a picture currently being decoded, where the buffer region has been partially recovered.

When the parameter indicates that the decoded block uses the inter prediction, one or more reference lists are constructed, where each reference list includes one or more reference pictures, and the reference picture includes a reference list indication, a reference index, and a motion vector. One or more matching blocks of the decoded block are determined in the one or more reference pictures, and the outputted inter prediction value is used as the prediction value of the decoded block.

Optionally, the inter prediction value of the decoded block is obtained using a picture currently being decoded, where the decoded block is located, as the reference picture. The intra prediction herein refers to a prediction value obtained by using only the data in the picture where the decoded block is located as a reference. In this case, it is the portion that has been partially recovered in the picture currently being decoded that is used.

Optionally, when the parameter indicates that the decoded block uses intra prediction, adjacent recovered pixels of the decoded block are determined in a manner similar to the manner in Embodiment one, and the adjacent recovered pixels are used as reference pixels for the intra prediction. The intra prediction mode is determined according to the parameter used for constructing the prediction value of the decoded block, and the intra prediction value of the decoded in calculated using the same method as in the Embodiment one. Specially, when the parameter used for constructing the prediction value of the decoded block indicates the position of the matching block of the decoded block in the partial picture currently being decoded, the matching block is used as the intra prediction value of the decoded block. The determined intra prediction value is used as the prediction value of the decoded block.

Optionally, the quantization values (i.e., "Level" values) of the coefficients and a QP in the parameter used for constructing the recovery value of the prediction residual of the decoded block are used as inputs of the scaling operation. The scaling operation is performed on the quantization values of the coefficients using the QP to obtain recovery values of the transform coefficients. Therefore, an inverse quantization unit may also be referred to as a scaling unit.

Optionally, the obtained recovery values of the transform coefficients and the transform parameter in the parameter used for constructing the recovery value of the prediction residual of the decoded block. It is to be noted that when it is determined that the scaling operation is not performed on the current decoded block according to the outputted parameter used for constructing the recovery value of the prediction residual of the decoded block, the outputted transform coefficients are used for the inverse transform.

The recovery value of the prediction residual of the decoded block is obtained based on a method similar to the method in Embodiment one. It is to be noted here that the term "inverse transform" is used herein relative to the term "transform" in the encoder. In video encoding standards, a transform method is specified, that is, a transform method for converting the recovery value of the transform coefficient into the recovery value of the prediction residual.

Optionally, the recovery value of the decoded block is calculated, and the recovery value of the decoded block is stored to the picture buffer region. The picture buffer region may be a separate section of storage space allocated in the picture decoding process.

A filter parameter is obtained. The filter parameters include indication information of a filter used, a filter coefficient, and a control parameter of the filter. Filtering processing is performed on data in the picture buffer region using the filter in conjunction with the filter parameter to obtain a decoded picture of the picture. It is to be noted that the filter in this embodiment may be formed by cascading one or more filters. For example, in the H.256/HEVC standard, the filter is formed by cascading two filters: a deblocking filter and a sample value adaptive additive offset compensation filter (Sample Adaptive Offset, SAO). The filter may also include a neural network filter. Optionally, the operation of performing filtering on the data in the picture buffer region may be performed in the picture layer, that is, the filtering processing is performed on the data in the picture buffer region after recovery values of all decoded blocks in the picture are written into the picture buffer region. Optionally, the operation of performing filtering on the data in the picture buffer region may be performed in the block layer, that is, when recovery data of a certain decoded block is no longer used as reference data for subsequent decoded blocks, the filtering processing is performed on the recovery data of this decoded block.

Figure 6:
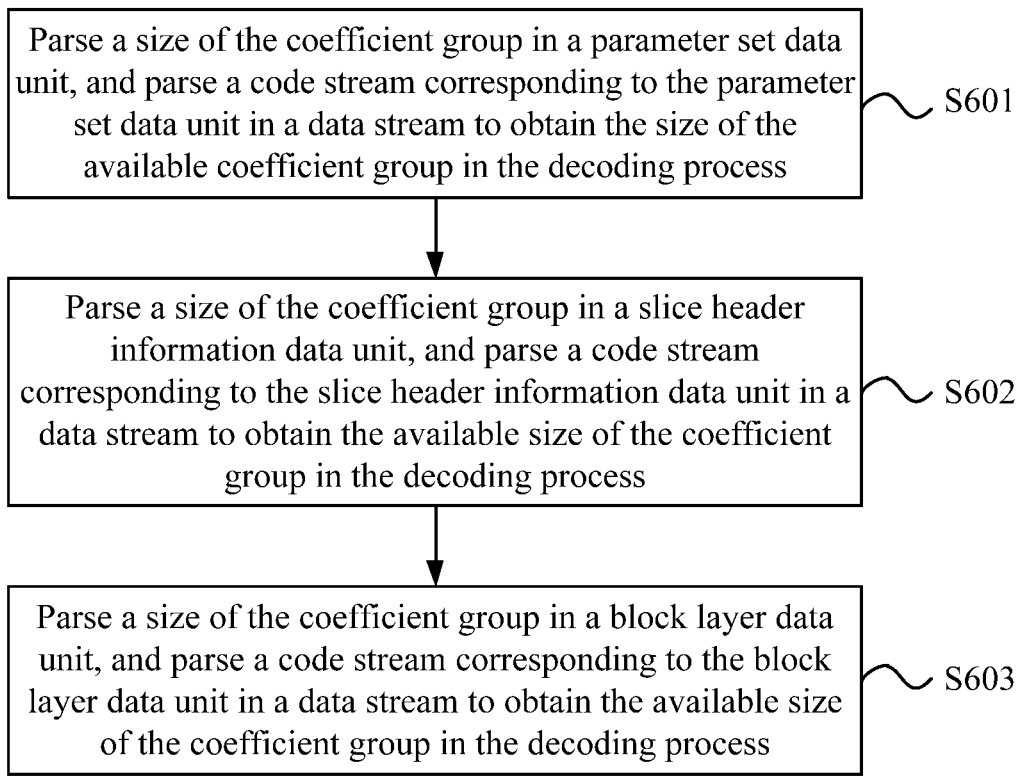
FIG. 6 is a flowchart of data processing of parsing the size of the coefficient group according to an embodiment of the disclosure.

FIG. 6 is a flowchart of data processing of parsing the size of the coefficient group according to an embodiment of the disclosure. As shown in FIG. 6, the data processing includes steps S601, S602, and S603.

In step S601, a size of the coefficient group in a parameter set data unit is parsed. A code stream corresponding to the parameter set data unit in a data stream is parsed to obtain the size of the coefficient group able to be used in the decoding process.

Optionally, the parameter set data unit refers to a parameter set data unit used for carrying parameter data applicable to the entire sequence, such as a video parameter set (VPS) in the H.256/HEVC standard and a sequence parameter set (SPS). The parameter set data unit may also include a parameter set data unit for carrying parameter data applicable to the picture, such as an adaptive parameter set (APS) and a picture parameter set (PPS) in the H.256/HEVC standard. In particular, when the parameters in the APS or PPS remain unchanged for each picture in the entire sequence, that is, the parameters in the APS or PPS are applicable to each picture in the entire sequence, the APS or PPS in this case is equivalent to a parameter set data unit carrying parameter data that is applicable to the entire sequence. Optionally, in particular, according to indication information obtained by parsing the code stream in the data stream or using a default method, the corresponding data in the parameter set data unit applicable to the sequence may be overwritten with the data in the parameter set data unit applicable to the picture.

Optionally, the code stream of the parameter set data unit in the data stream is parsed to obtain a flag bit from the parameter set data unit for indicating whether multiple size of the coefficient groups are allowed to be used. When the flag bit indicates "Allow to be used", the size of the coefficient group for decoding the transform coefficients in the decoded block may be determined from more than one candidate size of the coefficient groups in the process of decoding the decoded block. When the flag bit indicates "Not Allow to be used", only a default set size of the coefficient group is used to decode the transform coefficients.

Optionally, the code stream of the parameter set data unit in the data stream is parsed such that a default value of the size of the coefficient group is obtained from the parameter set data unit. A parameter for indicating the default value of the size of the coefficient group is obtained. The parameter may be a parameter directly indicating the size of the coefficient group, or may be a flag bit for indicating whether a corresponding size of the coefficient group is the default value of the size of the coefficient group. Optionally, when the obtained flag bit indicates "multiple size of the coefficient groups are not allowed to be used", fields after this flag bit continue to be parsed to obtain the default value of the size of the coefficient group.

Optionally, when the preceding flag bit indicates "multiple size of the coefficient groups are allowed to be used", the size of the coefficient groups allowed to be used are decoded.

Optionally, one parsing method is to parse the parameter set data unit to obtain the maximum and minimum size of the coefficient groups allowed to be used, and implicitly derive other size of the coefficient groups allowed to be used in a set derivation manner from the largest to the smallest (e.g., in a quad-tree manner). For example, if the maximum and minimum size of the coefficient groups allowed to be used obtained after parsing are 32×32 and 4×4, respectively, then according to the preceding quad-tree manner, the size of the coefficient groups allowed to be used, which are indicated by the fields of the parameter set data unit, include 32×32, 16×16, 8×8, and 4×4. A second parsing method is to parse the parameter set data unit to obtain the maximum size of the coefficient group allowed to be used and the maximum division hierarchy according to the division manner (e.g., the quad-tree manner). For example, if the maximum size of the coefficient group allowed to be used obtained after parsing is 32×32 and the maximum allowable division hierarchy obtained after parsing is 3, then the size of the coefficient groups allowed to be used, which are indicated by the fields of the parameter set data unit, include 32×32, 16×16, 8×8, and 4×4. Alternatively, the difference between the maximum and minimum size of the coefficient groups allowed to be used may be present in the code steam as the maximum division hierarchy. In the above example, when the difference between the maximum and minimum allowable values obtained after parsing is equal to 3, the minimum size of the coefficient group allowed to be used is set to 4×4 (i.e., 2(log232−3)=4). A third parsing method is to parse the parameter set data unit to obtain the minimum size of the coefficient group allowed to be used and the maximum upward hierarchy according to the division manner (e.g., the quad-tree manner). For example, if the minimum size of the coefficient group allowed to be used obtained after parsing is 4×4 and the maximum upward hierarchy obtained after parsing is 3, then the size of the coefficient groups allowed to be used, which are indicated by the fields of the parameter set data unit, include 32×32, 16×16, 8×8, and 4×4. Alternatively, the difference between the maximum and minimum size of the coefficient groups allowed to be used obtained after parsing is equal to 3, and the maximum size of the coefficient group allowed to be used is set to 32×32 (i.e., 2(log24+3)=32).

Optionally, one parsing method is to parse the parameter set data unit to obtain the maximum and minimum side lengths of the coefficient group allowed to be used, and implicitly derive other size of the coefficient groups allowed to be used in a set derivation manner from the maximum side length to the minimum side length (e.g., in a binary manner). For example, if the maximum and minimum side lengths obtained after parsing are 16 and 4, respectively, then available side lengths of the coefficient group allowed to be used, which are indicated by the fields of the parameter set data unit, include 16, 8, and 4, and corresponding indicated size of the coefficient groups (represented in the form of "width×height") include 16×16, 16×8, 16×4, 8×16, 8×8, 8×4, 4×16, 4×8, and 4×4. A second parsing method is to parse the parameter set data unit to obtain the maximum side length of the coefficient group allowed to be used and the maximum division hierarchy according to the division manner (e.g., the binary manner). For example, if the maximum side length of the coefficient group allowed to be used obtained after parsing is 16 and the maximum division hierarchy is 2, then available side lengths of the coefficient group allowed to be used, which are indicated by the fields of the parameter set data unit, include 16, 8, and 4, and corresponding indicated size of the coefficient groups include 16×16, 16×8, 16×4, 8×16, 8×8, 8×4, 4×16, 4×8, and 4×4. Alternatively, the difference between the maximum and minimum side lengths of the coefficient group allowed to be used may also be present in the code stream as the maximum division hierarchy. In the above example, when the difference between the maximum and minimum allowable values obtained after parsing is equal to 2, the minimum size of the coefficient group allowed to be used is set to 4×4 (i.e., 2(log216−2)=4). A third parsing method is to parse the parameter set data unit to obtain the minimum side length of the coefficient group allowed to be used and the maximum upward hierarchy according to the division manner (e.g., the binary manner). For example, if the minimum side length of the coefficient group allowed to be used obtained after parsing is 4 and the maximum upward hierarchy is 2, then available side lengths of the coefficient group allowed to be used, which are indicated by the fields of the parameter set data unit, include 16, 8, and 4, and corresponding indicated size of the coefficient groups include 16×16, 16×8, 16×4, 8×16, 8×8, 8×4, 4×16, 4×8, and 4×4. Alternatively, the difference between the maximum and minimum side lengths of the coefficient group allowed to be used may also be present in the code stream as the maximum upward hierarchy. In the above example, when the difference between the maximum and minimum allowable values obtained after parsing is equal to 2, the maximum size of the coefficient group allowed to be used is set to 16×16 (i.e., 2(log24+2)=16). A fourth parsing method is to parse the parameter set data unit to obtain a flag bit corresponding to each available side length, where the flag bit is used for indicating whether a side length corresponding to this flag bit is allowed to be used. For example, when the available side lengths include 32, 16, 8, and 4, the flag bit corresponding to the side length of 32 obtained after parsing indicates "Not allowed to be used", and three flag bits corresponding to side lengths of 16, 8, and 4 respectively indicate "Allowed to be used". In this manner, available side lengths of the coefficient group allowed to be used, which are indicated by the fields of the parameter set data unit, include 16, 8, and 4, and the corresponding indicated size of the coefficient groups include 16×16, 16×8, 16×4, 8×16, 8×8, 8×4, 4×16, 4×8, and 4×4.

Optionally, one parsing method is to parse the parameter set data unit to obtain the maximum and minimum values allowed to be used of the width and height of the coefficient group, and implicitly derive other size of the coefficient groups allowed to be used in a set derivation manner from the maximum width and height to the minimum width and height (e.g., in a binary manner). For example, if the maximum and minimum values allowed to be used of the width of the coefficient group obtained after parsing are 16 and 4 respectively and the maximum and minimum values allowed to be used of the height of the coefficient group obtained after parsing are 8 and 4 respectively, then the widths of the coefficient group allowed to be used, which are indicated by the fields of the parameter set data unit, include 16, 8, and 4, indicated heights of the coefficient group allowed to be used include 8 and 4, and the corresponding indicated size of the coefficient groups (represented in the form of "width×height") include 16×8, 16×4, 8×8, 8×4, 4×8, and 4×4. A second parsing method is to parse the parameter set data unit to obtain the maximum width of the coefficient group allowed to be used and the maximum division hierarchy according to the division manner (e.g., the binary manner) and the maximum height of the coefficient group allowed to be used and the maximum division hierarchy according to the division manner (e.g., the binary manner). For example, if the maximum width of the coefficient group allowed to be used obtained after parsing is 16 and the maximum division hierarchy is 2 and the maximum height of the coefficient group allowed to be used obtained after parsing is 8 and the maximum division hierarchy is 1, then the widths of the coefficient group allowed to be used, which are indicated by the fields of the parameter set data unit, include 16, 8, and 4, indicated heights of the coefficient group allowed to be used include 8 and 4, and the corresponding indicated size of the coefficient groups (represented in the form of "width×height") include 16×8, 16×4, 8×8, 8×4, 4×8, and 4×4. Alternatively, the difference between the maximum and minimum widths of the coefficient group allowed to be used may also be present in the code stream as the maximum division hierarchy, and in the above example, when the difference between the maximum and minimum allowable width values obtained by parsing the parameter set data unit is equal to 2, the minimum width of the coefficient group allowed to be used is set to 4 (i.e., 2(log216−2)=4). Alternatively, the difference between the maximum and minimum heights of the coefficient group allowed to be used may also be present in the code stream as the maximum division hierarchy, and in the above example, when the difference between the maximum and minimum allowable height values obtained by parsing the parameter set data unit is equal to 1, the minimum width of the coefficient group allowed to be used is set to 4 (i.e., 2(log28−1)=4). A third parsing method is to parse the parameter set data unit to obtain the minimum width of the coefficient group allowed to be used and the maximum upward hierarchy according to the division manner (e.g., the binary manner) and the minimum height of the coefficient group allowed to be used and the maximum upward hierarchy according to the division manner (e.g., the binary manner). For example, if the minimum width of the coefficient group allowed to be used obtained after parsing is 4 and the maximum upward hierarchy is 2 and the minimum height of the coefficient group allowed to be used obtained after parsing is 4 and the maximum upward hierarchy is 1, then the widths of the coefficient group allowed to be used, which are indicated by the fields of the parameter set data unit, include 16, 8, and 4, indicated heights of the coefficient group allowed to be used include 8 and 4, and the corresponding indicated size of the coefficient groups (represented in the form of "width×height") include 16×8, 16×4, 8×8, 8×4, 4×8, and 4×4. Alternatively, the difference between the maximum and minimum widths of the coefficient group allowed to be used may also be present in the code stream as the maximum upward hierarchy, and in the above example, when the difference between the maximum and minimum allowable width values obtained by parsing the parameter set data unit is equal to 2, the maximum width value of the coefficient group allowed to be used is set to 16 (i.e., 2(log24+2)=16). Alternatively, the difference between the maximum and minimum heights of the coefficient group allowed to be used may also be present in the code stream as the maximum upward hierarchy, and in the above example, when the difference between the maximum and minimum allowable height values obtained by parsing the parameter set data unit is equal to 1, the maximum height value of the coefficient group allowed to be used is set to 8 (i.e., 2(log24+1)=8). A fourth parsing method is to parse the parameter set data unit to obtain a flag bit corresponding to each allowable width and each allowable height, where the flag bit is used for indicating whether a width and height corresponding to this flag bit are allowed to be used. For example, when the allowable widths and heights include 32, 16, 8, and 4, the flag bit corresponding to the width of 32 obtained by parsing the parameter set data unit indicates "Not allowed to be used", three flag bits corresponding to the widths of 16, 8, and 4 indicate "Allowed to be used", two flag bits corresponding to the heights of 32 and 16 indicate "Not allowed to be used", and two flag bits corresponding to the heights of 8 and 4 indicate "Allowed to be used". In this manner, widths of the coefficient group allowed to be used, which are indicated by the fields of the parameter set data unit, include 16, 8, and 4, indicated heights of the coefficient group allowed to be used include 8 and 4, and the corresponding indicated size of the coefficient groups (represented in the form of "width×height") include 16×8, 16×4, 8×8, 8×4, 4×8, and 4×4.

Optionally, one parsing method is to parse the parameter set data unit to obtain a flag bit corresponding to each available size of the coefficient group, where the flag bit is used for indicating whether a size of the coefficient group corresponding to this flag bit is allowed to be used. For example, when the available size of the coefficient groups include 16×16, 16×8, 16×4, 8×16, 8×8, 8×4, 4×16, 4×8, and 4×4, when nine flag bits obtained by parsing the parameter set data unit indicate that "16×16 is not allowed to be used, 16×8 is allowed to be used, 16×4 is allowed to be used, 8×16 is not allowed to be used, 8×8 is allowed to be used, 8×4 is allowed to be used, 4×16 is not allowed to be used, 4×8 is allowed to be used, and 4×4 is allowed to be used", respectively, 16×8, 16×4, 8×8, 8×4, 4×8, and 4×4 are used as the size of the coefficient groups allowed to be used in the decoding process.

Optionally, the parameter set data unit is parsed, and the size of the coefficient group allowed to be used by decoded blocks using different coding modes may be obtained using the methods described above. For example, the parameter set data unit is parsed to obtain information indicating that size of the coefficient groups allowed to be used by the transform block in the decoded block using the intra prediction mode are 8×8 and 4×4 and information indicating that size of the coefficient groups allowed to be used by the transform block in the decoded block using the inter prediction mode are 16×16, 8×8, and 4×4.

Optionally, the parameter set data unit is parsed, and the size of the coefficient group allowed to be used by transform blocks using different number of transforms may be obtained by using the methods described above. For example, the parameter set data unit is parsed to obtain information indicating that size of the coefficient groups allowed to be used by the transform block using one transform are 8×8 and 4×4 and information indicating that size of the coefficient groups allowed to be used by the transform block using multiple transforms are 16×16, 8×8, and 4×4.

Optionally, the parameter set data unit is parsed, and the size of the coefficient group allowed to be used by transform blocks using different transform manners may be obtained using the methods described above. For example, the parameter set data unit is parsed to obtain information indicating that size of the coefficient groups allowed to be used by the transform block using the transform designed based on DCT are 8×8 and 4×4, information indicating that size of the coefficient groups allowed to be used by the transform block using the transform designed based on DST are 16×16, 8×8, and 4×4, and information indicating that size of the coefficient groups allowed to be used by the transform block using the transform designed based on KLT are 32×32, 16×16, 8×8, and 4×4.

Optionally, the parameter set data unit is parsed, and a control parameter used for switching the size of the coefficient groups allowed to be used is obtained. For example, when the quantization parameter is used as the control parameter for switching the size of the coefficient groups allowed to be used, the parameter set data unit is parsed using the preceding methods to obtain division intervals of the quantization parameter and the size of the coefficient groups allowed to be used in each interval. For example, one example of the obtained switching manner is a defining manner of the quantization parameter in, for example, the H.256/HEVC standard. If the value of the quantization parameter is greater than or equal to 37, the size of the coefficient groups allowed to be used are 16×16, 8×8, and 4×4; if the value of the quantization parameter is less than 37 but greater than or equal to 27, the size of the coefficient group allowed to be used is 8×8; and if the value of the quantization parameter is less than 27, the size of the coefficient group allowed to be used is 4×4.

Optionally, the size of the coefficient groups able to be used are preset in the profile/tier/level, and for different profiles/tiers/levels, the size of the coefficient group able to be used having one or more values is set. For example, for a lower level (for example, correspondingly for decoding the video with a resolution of 640×480 and below), the size of the coefficient group whose default value is equal to 4×4 is used; for a higher level (for example, correspondingly for decoding the video with a large resolution such as 720p, 1080p, and 2K), two size of the coefficient groups may be used, i.e., 8×8 and 4×4; and for the highest level (for example, correspondingly for decoding the video with a super resolution such as 4K and 8K), three size of the coefficient groups may be used, i.e., 16×16, 8×8, and 4×4. The parameter set data unit is parsed to obtain indication information of the profile/tier/level, and the size of the coefficient groups able to be used are determined.

An optional example code stream organization method is described below (this code stream organization method is the same as the method shown in Table 1), and fields of the code stream organization method are located in one or more parameter set data units. The code stream fields in Table 3 are parsed using the method described above to obtain the size of the coefficient groups allowed to be used in the decoding process.

TABLE 3

Code stream organization in the parameter set data unit

| | Descriptor |
|---|---|
| ...... | |
| log2_min_cg_side_length | ue(v) |
| log2_diff_max_cg_side_length | ue(v) |
| ...... | |
| } | |

The semantics of each syntax element in Table 3 is as follows:
log2_min_cg_side_length represents the minimum side length of the coefficient group, where the minimum side length of the coefficient group is equal to (1<<log2_min_cg_side_length), in which<< is the arithmetic right shift operator, and log2_min_cg_side_length is subject to entropy decoding using the method of ue(v) in the process of code stream parsing; log2_diff_max_cg_side_length represents the difference between the maximum and minimum side lengths of the coefficient group, where the maximum side length of the coefficient group is equal to (1<<(log2_min_cg_side_length+ log2_diff_max_cg_side_length)), and log2_diff_max_cg_side_length is subject to entropy decoding using the method of ue(v) in the process of code stream parsing.

Fields corresponding to the syntax elements in Table 3 in the code steam are parsed, and examples of determining the size of the coefficient group are described below. For example, log2_min_cg_side_length is parsed using the method of ue(v) to obtain the value of this syntax element which is equal to 2, log2_diff_max_cg_side_length is parsed using the method of ue(v) to obtain the value of this syntax element which is equal to 0, and only the coefficient group whose size is 4×4 by default is used in the decoding process.

For example, log2_min_cg_side_length is parsed using the method of ue(v) to obtain the value of this syntax element which is equal to 2, log2_diff_max_cg_side_length is parsed using the method of ue(v) to obtain the value of this syntax element which is equal to 2, and in this manner, available side lengths of the coefficient group allowed to be used in the decoding process are determined, including 16, 8, and 4, and the corresponding indicated available size of the coefficient groups includes 16×16, 16×8, 16×4, 8×16, 8×8, 8×4, 4×16, 4×8, and 4×4. An optional example code stream organization method is described below (this code stream organization method is the same as the method shown in Table 2), and fields of the code stream organization method are located in one or more parameter set data units. The code stream fields in Table 4 are parsed using the method described above to obtain the size of the coefficient groups allowed to be used in the decoding process. The code stream fields in Table 4 may indicate size of the coefficient groups allowed to be used by the transform blocks in decoded blocks using the inter mode and intra mode.

TABLE 4

Code stream organization in the parameter set data unit

| | Descriptor |
|---|---|
| ...... | |
| log2_min_cg_side_length | ue(v) |
| log2_diff_max_inter_cg_side_length | ue(v) |

TABLE 4-continued

Code stream organization in the parameter set data unit

| | Descriptor |
|---|---|
| log2_diff_max_intra_cg_side_length | ue(v) |
| ...... | |
| } | |

The semantics of each syntax element in Table 4 is as follows: log2_min_cg_side_length represents the minimum side length of the coefficient group, where the minimum side length of the coefficient group is equal to (1<<log2_min_cg_side_length), in which<< is the arithmetic right shift operator, and log2_min_cg_side_length is subject to entropy decoding using the method of ue(v) in the process of code stream parsing;
log2_diff_max_inter_cg_side_length represents the difference between the maximum and minimum side lengths of the coefficient group of the transform block in the decoded block using the inter prediction mode, where the maximum side length of the coefficient group is equal to (1<< (log2_min_cg_side_length+ log2_diff_max_cg_side_length)), and log2_diff_max_cg_side_length is subject to entropy decoding using the method of ue(v) in the process of code stream parsing; and
log2_diff_max_intra_cg_side_length represents the difference between the maximum and minimum side lengths of the coefficient group of the transform block in the decoded block using the intra prediction mode, where the maximum side length of the coefficient group is equal to (1<< (log2_min_cg_side_length+ log2_diff_max_cg_side_length)), and log2_diff_max_cg_side_length is subject to entropy decoding using the method of ue(v) in the process of code stream parsing.

Fields corresponding to the syntax elements in Table 4 in the code steam are parsed, and examples of determining the size of the coefficient group are described below. For example, log2_min_cg_side_length is parsed using the method of ue(v) to obtain the value of this syntax element which is equal to 2, log2_diff_max_inter_cg_side_length and log2_diff_max_intra_cg_side_length are separately parsed using the method of ue(v) to obtain the values of these two syntax elements which both are set to 0, and only the coefficient group whose size is 4×4 by default is used for the decoded block of the inter prediction mode and the decoded block of the intra prediction mode in the decoding process.

For example, log2_min_cg_side_length is parsed using the method of ue(v) to obtain the value of this syntax element which is equal to 2, and log2_diff_max_inter_cg_side_length and log2_diff_max_intra_cg_side_length are separately parsed using the method of ue(v) to obtain the values of these two syntax elements which are both equal to 2. As described in the preceding implementation methods, the available side lengths of the coefficient group allowed to be used in the decoding process include 16, 8, and 4, and the corresponding indicated size of the coefficient groups include 16×16, 16×8, 16×4, 8×16, 8×8, 8×4, 4×16, 4×8, and 4×4. In this case, the same coefficient group allowed to be used is used in the transform blocks in the decoded block of the inter prediction mode and the decoded block of the intra prediction mode.

For example, log2_min_cg_side_length is parsed using the method of ue(v) to obtain the value of this syntax element which is set equal to 2, log2_diff_max_inter_cg_side_length is parsed using the method of ue(v) to obtain the value of this syntax element which is set equal to 2, and log2_diff_max_intra_cg_side_length is parsed using the method of ue(v) to obtain the value of this syntax element which is set equal to 1. As described in the preceding implementation methods, the available side lengths of the coefficient group allowed to be used by the decoded block of the inter mode are determined, including 16, 8, and 4, and the corresponding indicated size of the coefficient groups include 16×16, 16×8, 16×4, 8×16, 8×8, 8×4, 4×16, 4×8, and 4×4; and the available side lengths of the coefficient group allowed to be used by the encoding block of the intra prediction mode are determined, including 8 and 4, and the corresponding indicated size of the coefficient groups include 8×8, 8×4, 4×8, and 4×4. In this case, the coefficient groups allowed to be used in the transform blocks in the decoded block of the inter prediction mode and the decoded block of the intra prediction mode are not completely the same.

In step S602, a size of the coefficient group in a slice header information data unit is parsed. A code stream corresponding to the slice header information data unit in a data stream is parsed to obtain the size of the coefficient group able to be used in the decoding process.

The parameter set identifier of a parameter set that the slice refers to is parsed, the parameter set that the slice refers to is activated, and the size of the coefficient group able to be used set in the parameter set is obtained.

Optionally, in particular, fields corresponding to a syntax unit related to the size of the coefficient group able to be used in the slice header information data unit is parsed, and the size of the coefficient group able to be used in the process of parsing the slice is obtained and correspondingly overwrites corresponding parameters obtained from the parameter set that the slice refers to. The parsing methods used herein are the same as the methods of obtaining the size of the coefficient group by parsing the parameter set data unit in step S601 except for the method of obtaining the size of the coefficient group by parsing the profile/tier/level.

Optionally, when the parameter set that the slice refers to does not include parameters related to the size of the coefficient group, the fields corresponding to the syntax unit related to the size of the coefficient group able to be used in the slice header information data unit is parsed, and the size of the coefficient group able to be used in the process of parsing the slice is obtained. The parsing methods used herein are the same as the methods of obtaining the size of the coefficient group by parsing the parameter set data unit in step S601 except for the method of obtaining the size of the coefficient group by parsing the profile/tier/level.

In step S603, a size of the coefficient group in a block layer data unit is parsed. A code stream corresponding to the block layer data unit in a data stream is parsed to obtain the size of the coefficient group able to be used in the decoding process.

The block layer data unit is parsed to obtain a parameter used for indicating the size of the coefficient group used by the transform block in the decoded block. For example, one parsing method is to parse fields corresponding to syntax element indicating the size of the coefficient group used for decoding the transform block in the block layer data unit, such as the width and height of the coefficient group. For example, one parsing method is to parse the block layer data unit to obtain one or more index values, where the index value corresponds to one size of the coefficient group. For example, one parsing method is to parse the block layer data unit to obtain one or more flag information, where the flag information is used for indicating that the transform block in the decoded block uses the same size of the coefficient group as one decoded transform block indicated by the flag information, and the decoded transform block may be a decoded transform block (e.g. upper adjacent block, left adjacent block, etc.) located in the same picture as the transform block, or may be a decoded block (i.e., time domain adjacent block) that is not located in the same picture as the transform block. One example of the flag information may be flag information indicating "the same size of the coefficient group as the upper adjacent transform block".

Figure 7:
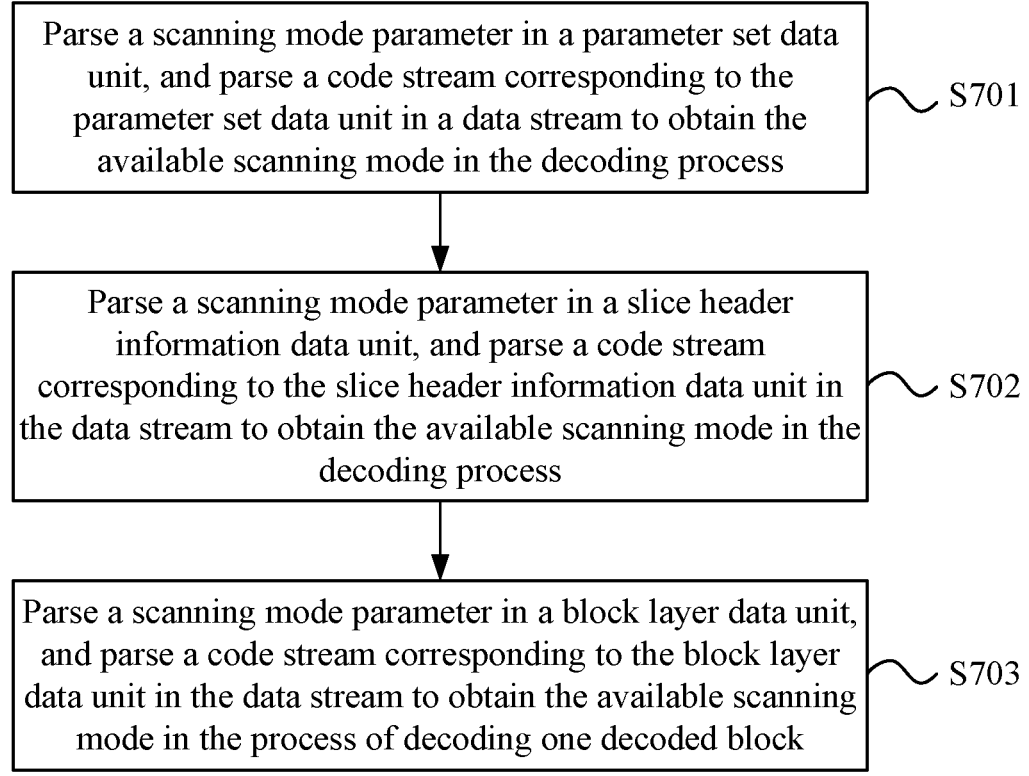
FIG. 7 is a flowchart of data processing of parsing a scanning mode parameter according to an embodiment of the disclosure.

FIG. 7 is a flowchart of data processing of parsing a scanning mode parameter according to an embodiment of the disclosure. The input of the processing process is a code stream related to the scanning mode in the data stream, and the output of the processing process is a scanning mode allowed to be used in the decoding process and a scanning mode used in the process of decoding the transform block in the decoded block.

In step S701, a scanning mode parameter is parsed in a parameter set data unit. The code stream corresponding to the parameter set data unit in the data stream is parsed to obtain the scanning mode able to be used in the decoding process.

Indication information of scanning modes allowed to be used is decoded in the parameter set data unit. The scanning mode may be a scanning mode having a preset fixed path, or may be a scanning mode having a non-fixed path. When the scanning mode having a non-fixed path is used, optionally, a correspondence of coordinates of the transform coefficient before and after scanning is parsed in the parameter set data unit. For example, for a transform coefficient whose coordinate position is equal to (m, n) in the transform block (or whose index number is equal to m×nTbS+n, where nTbS is the width of the transform block), the corresponding number position of this transform coefficient after the scanning is equal to k.

Optionally, the sizes of the coefficient group able to be used are preset in the profile/tier/level, and for different profiles/tiers/levels, one or more scanning modes able to be used are set. For example, for a lower level (for example, correspondingly for encoding the video with a resolution of 640×480 and below), the default diagonal up-right scanning mode, horizontal scanning mode and vertical scanning mode are used; for a higher level (for example, correspondingly for encoding the video with a large resolution such as 720p, 1080p, and 2K), besides the preceding three default scanning modes used for the lower level, a zig-zag scanning mode and other diagonal scanning modes (e.g. diagonal down-right, diagonal up-left, etc.,) may also be used; and for the highest level (for example, correspondingly for encoding the video with a super resolution such as 4K and 8K), besides the preceding scanning modes, a scanning mode having a non-fixed scan path may also be used. The parameter set data unit is parsed to obtain indication information of the profile/tier/level, and the scanning modes able to be used are determined. For the scanning mode having a non-fixed path, the parameter set data unit is parsed to obtain a correspondence of coordinates of the transform coefficient before and after scanning. For example, for a transform coefficient whose coordinate position is equal to (m, n) in the transform block (or whose index number is equal to m×nTbS+n, where nTbS is the width of the transform block), the corresponding number position of this transform coefficient after the scanning is equal to k.

In step S702, a scanning mode parameter is parsed in a slice header information unit. The code stream corresponding to the slice header information data unit in the data stream is parsed to obtain the scanning mode able to be used in the decoding process.

The parameter set identifier in the slice header information data unit is parsed to obtain a parameter set that the slice refers to. In the process of decoding the slice, the scanning modes able to be used, which are set in the parameter set that the slice refers to, may be used.

Optionally, in particular, slice header information is parsed to obtain a scanning mode parameter able to be used to correspondingly overwrite a corresponding scanning mode parameter obtained from the parameter set that the slice refers to. Optionally, the parsing methods used herein are the same as the methods of obtaining the scanning mode parameter by parsing the parameter set in step S701 except for the method of obtaining the scanning mode by parsing the profile/tier/level.

Optionally, when the parameter set that the slice refers to does not include the scanning mode parameter, the slice header information is parsed to obtain the scanning mode parameter able to be used in the process of parsing the slice. The parsing methods used herein are the same as the methods of obtaining the scanning mode parameter by parsing the parameter set in step S701 except for the method of obtaining the scanning mode by parsing the profile/tier/level.

Optionally, the slice header information data unit is parsed to obtain a correspondence of coordinates of the transform coefficient before and after scanning. For example, for a transform coefficient whose coordinate position is equal to (m, n) in the transform block (or whose index number is equal to m×nTbS+n, where nTbS is the width of the transform block), the corresponding number position of this transform coefficient after the scanning is equal to k.

In step S703, a scanning mode parameter is parsed in a block layer data unit. The code stream corresponding to the block layer data unit in the data stream is parsed to obtain the scanning mode able to be used in the process of decoding one decoded block.

The block layer data unit is parsed to obtain a parameter used for indicating the scanning mode used by the transform block in the encoded block. For example, one parsing method is to parse one or more index values in the block layer data unit, where the index value corresponds to one scanning mode. For example, one parsing method is to parse the correspondence of coordinates of the transform coefficient before and after scanning in the block layer data unit. For example, for a transform coefficient whose coordinate position is equal to (m, n) in the transform block (or whose index number is equal to m×nTbS+n, where nTbS is the width of the transform block), the corresponding number position of this transform coefficient after the scanning is equal to k. For example, one parsing method is to parse one or more flag information in the block layer data unit, where the flag information is used for indicating that the transform block in the decoded block uses the same scanning mode as one decoded transform block indicated by the flag information, and the decoded transform block may be a decoded transform block (e.g. upper adjacent block, left adjacent block, etc.) located in the same picture as the transform block, or may be a decoded block (i.e., time domain adjacent block) that is not located in the same picture as the transform block. One example of the flag information may be flag information indicating "the same scanning mode as the upper adjacent transform block".

From the description the preceding embodiment, it will be apparent to those skilled in the art that the method in the preceding embodiment may be implemented by software plus a necessary general-purpose hardware platform, or may of course be implemented by hardware. However, in many cases, the former is a preferred implementation. Based on this understanding, the solution provided by the present application may be embodied in the form of a computer software product. The computer software product is stored in a storage medium (such as a ROM/RAM, a magnetic disk or an optical disk) and includes several instructions for enabling a terminal device (which may be a mobile phone, a computer, a server, a network device, or the like) to execute the method according to each embodiment of the present application.

Embodiment Three

This embodiment further provides an apparatus for encoding a picture. The apparatus is configured to implement the abovementioned embodiments and preferred implementations, and what has been described will not be repeated. As used below, the term "module" may be software, hardware or a combination thereof capable of implementing predetermined functions. The apparatus in the embodiment described below is preferably implemented by software, but an implementation by hardware or by a combination of software and hardware is also possible and conceivable.

Figure 8:
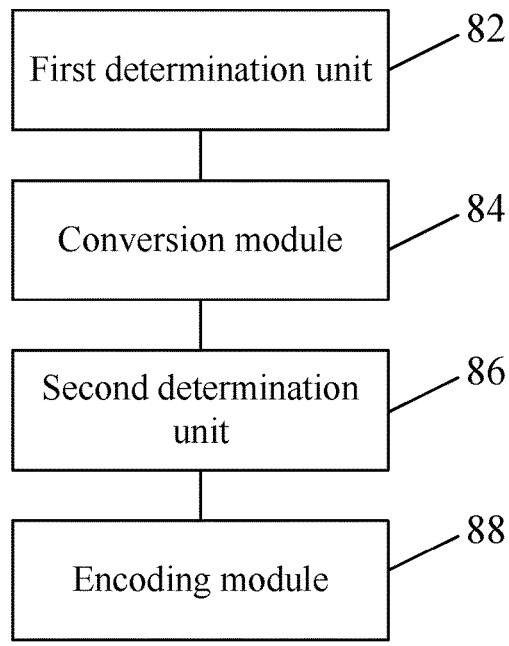
FIG. 8 is a structural block diagram of an apparatus for encoding a picture according to an embodiment of the disclosure.

FIG. 8 is a structural block diagram of an apparatus for encoding a picture according to an embodiment of the disclosure. As shown in FIG. 8, the apparatus includes a first determination module 82, a transform module 84, a second determination module 86, and an encoding module 88.

The first determination module 82 is configured to determine a prediction value of an encoded block, and calculate a prediction residual between the encoded block and the prediction value. The transform module 84 is configured to perform one or more transforms on the prediction residual to obtain transform data, and determine transform coefficients using the transform data. The second determination module 86 is configured to determine a scanning mode of the transform coefficients and a size of the coefficient group of the transform coefficients, divide the transform coefficients into one or more coefficient groups, scan transform coefficients included in each coefficient group according to the scanning mode, and convert the transform coefficients into one or more syntax elements.

The encoding module 88 is configured to encode the size of the coefficient group and a value of the one or more syntax elements, and write encoded bits to a code stream.

Figure 9:
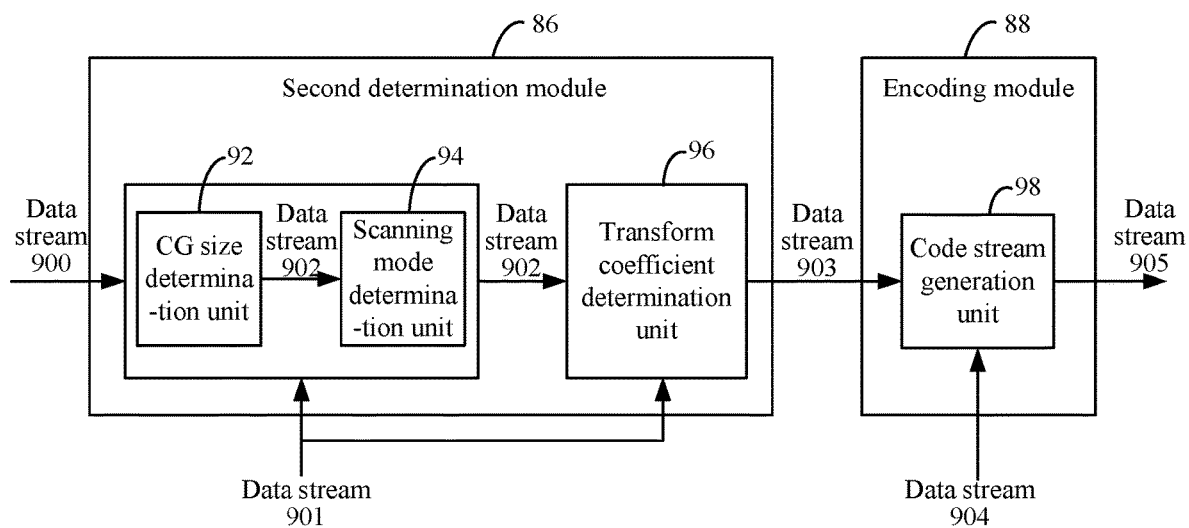
FIG. 9 is a structural block diagram of another apparatus for encoding a picture according to an embodiment of the disclosure.

FIG. 9 is a structural block diagram of another apparatus for encoding a picture according to an embodiment of the disclosure. As shown in FIG. 9, the apparatus includes all the modules shown in FIG. 8. Moreover, the second determination module 86 further includes a CG size determination unit 92, a scanning mode determination unit 94, and a transform coefficient processing unit 96. The encoding module 88 further includes a code stream generation unit 98. The second determination module 86 is configured to determine a size of the coefficient group and a scanning mode of the transform block. As shown in FIG. 9, the input data of the second determination module 86 includes a data stream 900 and a data stream 901, and the output data is a data stream 903. The data stream 900 is the output data (including the size of an encoded block where the transform block is located and an encoding mode) of the first determination module 82 and the output data (including the size of the transform block and a quantization parameter) of the transform module 84. The data stream 901 is transform coefficients in the transform block. In a case of not performing quantization on the transform block, the transform coefficients of the data stream 901 are the output data of the transform module 84 in the preceding encoder; and in a case of performing quantization on the transform block, the transform coefficients of the data stream 901 are the quantized output data in the transform module 84. The data stream 902 is an internal data stream in the second determination module 86 and is a bidirectional data stream between the CG size determination unit 92 and the scanning mode determination unit 94. The CG size determination unit 92 is configured to deliver the size of the coefficient group to the scanning mode determination unit 94 through the data stream 902, and the scanning mode determination unit 94 is configured to deliver the parameter indicating the scanning mode to the CG size determination unit 92 through the data stream 902. The data stream 903 is the output data of the second determination module 86 and is the size of the coefficient group used for performing the entropy encoding on the transform block and the parameter indicating the scanning mode. The data stream 903 further includes flag information indicating whether the size of the coefficient group used by the transform block and the parameter indicating the scanning mode are needed to be encoded.

In the second determination module 86, the CG size determination unit 92 determines the size of the coefficient group by implementing the method described in Embodiment 1 for determining the size of the coefficient group, and includes the value of the size of the coefficient group into the data stream 903. The parameters used by the CG size determination unit 92 are from the data stream 900, parameters delivered in data stream 901, and scanning mode parameters obtained from the data stream 902 when needed. The scanning mode determination unit 94 determines the scanning mode using the method described in Embodiment 1 for determining the scanning mode of the transform coefficients in the transform block, and includes the parameter indicating the scanning mode into the data stream 903. The parameters used by the scanning mode determination unit 94 are from the data stream 900, parameters delivered in data stream 901, and values of the size of the coefficient group obtained from the data stream 902 when needed.

Optionally, the second determination module 86 can jointly determine the size of the coefficient group used in the transform block and the scanning mode of the transform coefficients in the transform block by using the ROD method. One optional implementation is that the second determination module 86 delivers each candidate scanning mode from the scanning mode determination unit 94 to the CG size determination unit 92 sequentially through the data stream 902; the CG size determination unit 92 determines the size of the coefficient group of the transform block corresponding to each candidate scanning mode; the second determination module 86 calculates the number of encoded bits generated for encoding the transform block using each candidate scanning mode of the transform coefficients and the corresponding size of the coefficient group; and the second determination module 86 selects a candidate scanning mode of the transform coefficients and a size of the coefficient group corresponding to the smallest number of the encoded bits, and includes the parameter indicating the scanning mode of the transform coefficients and the value of the size of the coefficient group into the data stream 903.

Optionally, the second determination module 86 can jointly determine the size of the coefficient group used in the transform block and the scanning mode of the transform coefficients in the transform block by using the ROD method. Another optional implementation is that the second determination module 86 delivers the value of each candidate size of the coefficient group from the CG size determination unit 92 to the scanning mode determination unit 94 sequentially through the data stream 902; the scanning mode determination unit 94 determines the scanning mode of the transform block corresponding to each size of the coefficient group; 903 the second determination module 86 calculates the number of encoded bits generated for encoding the transform block using each candidate size of the coefficient group and the corresponding scanning mode; and the second determination module 86 selects a candidate size of the coefficient group and a scanning mode corresponding to the smallest number of the encoded bits, and includes the value of the size of the coefficient group and the parameter indicating the scanning mode into the data stream 903.

The transform coefficient processing unit 96 performs parameterization representation on the transform coefficients in the transform block. The input data of the transform coefficient processing unit 96 is the data stream 901 and the data stream 903, and the output data is the data stream 904. The transform coefficient processing unit 96 divides the transform coefficients of the transform block in the data stream 901 into one or more coefficient groups according to the size of the coefficient group in the data stream 903, and scans the transform coefficients in the transform block according to the parameter indicating the scanning mode in the data stream 903 to perform the parameterization representation on the transform coefficients. The transform coefficient processing unit 96 processes the coefficient groups in the transform coefficient matrix sequentially by using the scanning order indicated by the parameter indicating the scanning mode in the data stream 903. For each coefficient group, the transform coefficient processing unit 96 processes the transform coefficients in the coefficient group sequentially by using the scanning order indicated by the parameter indicating the scanning mode in the data stream 903. The order used by the transform coefficient processing unit 96 for scanning the coefficient groups and the order for scanning the transform coefficients in the coefficient group may be the same or different. In the scanning process, the transform coefficient processing unit 96 records the position of the last non-zero transform coefficient and includes the data indicating this position into the data stream 904. The transform coefficient processing unit 96, starting from the coefficient group including the last non-zero transform coefficient, sequentially determines a flag bit for indicating whether the coefficients in each coefficient group are all zero value transform coefficients (or a flag bit for indicating whether each coefficient group includes the non-zero transform coefficient) in the scanning order indicated by the parameter indicating the scan method in the data stream 903, and includes the value of the flag bit into the data stream 904. For a coefficient group which, indicated by the preceding flag bit, includes the non-zero transform coefficients, the transform coefficient processing unit 96 sequentially determines a flag bit for indicating whether the value of each transform coefficient in the coefficient group is 0 in the scanning order indicated by the parameter indicating the scanning mode in the data stream 903, and includes the flag bit in the data stream 904. For a transform coefficient whose value is not equal to 0, the transform coefficient processing unit 96 determines a symbol parameter of a symbol used for indicating the transform coefficient (for indicating whether the value of this transform coefficient is a positive value or a negative value), converts the value of the transform coefficient taking to the absolute value, and includes the symbol parameter and the absolute value of the transform coefficient into the data stream 904. Furthermore, when the flag information in the data stream 903 indicates that the size of the coefficient group used by the transform block needs to be encoded, the transform coefficient processing unit 96 includes the size of the coefficient group in the data stream 903 into the data stream 904; and when the flag information in the data stream 903 indicates that the scanning mode used by the transform block needs to be encoded, the transform coefficient processing unit 96 includes the parameter indicating the scanning mode in the data stream 903 into the data stream 904. The data stream 904 is the output data of the transform coefficient processing unit 96.

The code stream generation unit 98 encodes parameters representing the transform coefficients in the transform block, generates binary encoded bits, and writes the encoded bits to the code stream. The input data of the code stream generation unit is the data stream 904 and a data stream 905, and the output data is a data stream 906. The data stream 905 is one or more parameters such as the size of the coefficient group and the scanning mode from the encoder configuration parameters, where the configuration parameters are used for indicating the size of the coefficient group able to be used by the transform block, and may also be used for indicate the scanning mode able to be used by the transform block. In particular, if the number of size of the coefficient groups available on the encoder are fixed, the code stream generation unit 98 does not need to encode the parameters related to the available size of the coefficient groups included in the data stream 905. In particular, if the scanning modes available on the encoder are fixed, the code stream generation unit 98 does not need to encode the parameters related to the available scanning modes included in the data stream 905. The code stream generation unit 98 encodes data in the data stream 905 and the data stream 906 using an entropy encoding method to obtain binary encoded bits, and writes the encoded bits to the code stream to obtain the data stream 906. The organization manner of fields in the code stream is defined by the video encoding standard. The entropy encoding method that the code stream generation unit 98 can be used includes equal-length encoding, unequal-length encoding, arithmetic encoding, etc.

It is to be noted that the data stream refers to an entry parameter and a return parameter of a function on the software implementation, data transferred on a bus and data shared between storage units (including data shared by registers) on the hardware implementation, or the like.

It is to be noted that each module described above may be implemented by software or hardware. An implementation by hardware may, but may not necessarily, be performed in the following manners: the various modules described above are located in the same processor, or the various modules described above are located in their respective processors in any combination form.

Embodiment Four

This embodiment further provides an apparatus for decoding a picture. The apparatus is configured to implement the abovementioned embodiments and preferred implementations, and what has been described will not be repeated. As used below, the term "module" may be software, hardware or a combination thereof capable of implementing predetermined functions. The apparatus in the embodiment described below is preferably implemented by software, but an implementation by hardware or by a combination of software and hardware is also possible and conceivable.

Figure 10:
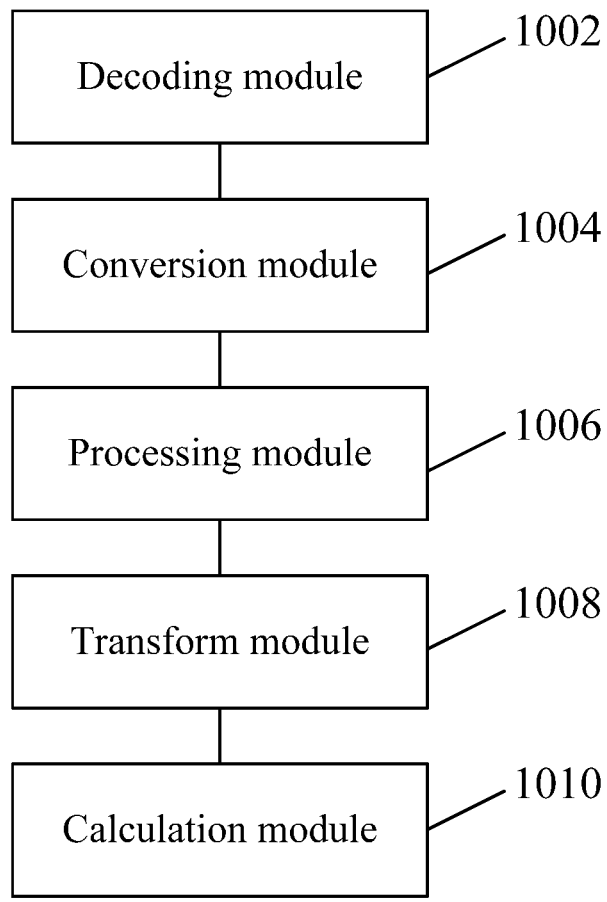
FIG. 10 is a structural block diagram of an apparatus for decoding a picture according to an embodiment of the disclosure.

FIG. 10 is a structural block diagram of an apparatus for decoding a picture according to an embodiment of the disclosure. As shown in FIG. 10, the apparatus includes a decoding module 1002, a conversion module 1004, a processing module 1006, a transform module 1008, and a calculation module 1010.

The decoding module 1002 is configured to parse a code stream, and determine a prediction value of a decoded block, a scanning mode of a transform coefficient in the decoded block, a size of the coefficient group, and a value of a syntax element related to a transform coefficient.

The conversion module 1004 is configured to, according to the scanning mode of the transform coefficients and the size of the coefficient group, process a coefficient group in the decoded block, and convert the syntax element into a transform coefficient in the coefficient group.

The processing module 1006 is configured to process the transform coefficient to obtain a recovery value of the transform coefficient.

The transform module 1008 is configured to process the transform coefficient, and perform one or more transforms on the processed data to obtain a prediction residual of the decoded block.

The calculation module 1010 is configured to determine a recovery value of the decoded block using the prediction value and the prediction residual.

Figure 11:
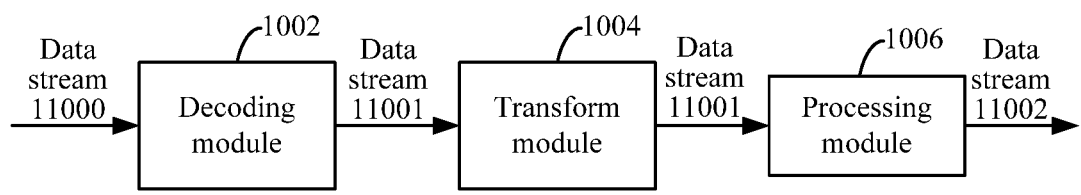
FIG. 11 is a structural block diagram of another apparatus for decoding a picture according to an embodiment of the disclosure.

FIG. 11 is a structural block diagram of another apparatus for decoding a picture according to an embodiment of the disclosure. As shown in FIG. 11, the apparatus includes a decoding module 1002, a conversion module 1004, and a processing module 1006.

The decoding module 1002 determines a size of the coefficient group and a scanning mode of the transform block. The input data of the decoding module 1002 includes a data stream 11000, and its output data is a data stream 11001. The data stream 11000 is a code stream and is the output data of the decoder. The decoding module 1002 parses the data stream 11000 according to a code stream organization structure defined in the video encoding standard and the entropy decoding method of each field to obtain one or more parameter set data units and one or more slice data units (including slice header data units and slice data data units). The decoding unit 1002 parses the slice data data unit to obtain block layer data units of one or more transform blocks. The parameters related to the size of the coefficient group and scanning mode included in the data units obtained by the decoding module 1002 include the size of the coefficient group used by the transform block and the scanning mode parameter included in the current decoded block in the data stream 11001. The data stream 11001 is the output data of the decoding module 1002. The entropy decoding method that can be used by the decoding module 1002 include: a method of performing entropy decoding on code words generated using equal-length encoding, a method of performing entropy decoding on code words generated using unequal-length encoding, and a method of performing entropy encoding on code words generated using arithmetic encoding. The decoding module 1002 reads relevant parameters from the obtained data units and determines the size of the coefficient group used for decoding the transform coefficients in the transform block. Optionally, according to field data included in each data unit in the data stream 11000, the decoding module 1002 may obtain parameters related to the available size of the coefficient groups from the parameter set data unit and determines the candidate size of the coefficient groups that may be used in the decoding process. Optionally, according to the field data included in each data unit in the data stream 11000, the decoding module 1002 may obtain parameters related to the available size of the coefficient groups from the slice header information data unit and determines the candidate size of the coefficient groups that may be used in the decoding process. In particular, the parameters related to the available size of the coefficient groups that the decoding module 1002 can obtain from the slice header information data unit correspondingly overwrite parameters obtained from the parameter set data unit as parameters of the size of the coefficient group available in the process of decoding the slice. The decoding module 1002 uses the parameters in the block layer data unit to determine the size of the coefficient group used by the transform block in the decoded block. The decoding module 1002 includes the size of the coefficient group in the data stream 11001.

The decoding module 1002 reads relevant parameters from the obtained data units and determines the scanning mode used for decoding the transform coefficients in the transform block. Optionally, according to the field data included in each data unit in the data stream 11000, the decoding module 1002 may obtain parameters related to the available scanning modes from the parameter set data unit and determines the scanning mode that may be used in the decoding process. The available scanning mode obtained by the decoding module 1002 in the parameter set data unit may be a scanning mode having a fixed path, i.e., a scanning mode whose scan path has been preset in the decoder. In particular, the available scanning mode obtained by the decoding module 1002 in the parameter set data unit may be a scanning mode having a non-fixed path, i.e., a scanning mode having the scan path which is written in the code stream of the parameter set data unit as described in Embodiment three. The decoding module 1002 obtains s parameter related to the scanning mode in the parameter set data unit. Optionally, the parameter describes a correspondence of coordinates of the transform coefficient before and after scanning. For example, for a transform coefficient whose coordinate position is equal to (m, n) in the transform block (or whose index number is equal to m×nTbS+n, where nTbS is the width of the transform block), the corresponding number position of this transform coefficient after the scanning is equal to k.

Optionally, according to the field data included in each data unit in the data stream 11000, the decoding module 1002 may obtain parameters related to the available scanning modes from the slice header information data unit and determines the candidate scanning modes that may be used in the decoding process. In particular, the parameters related to the scanning mode that the decoding module 1002 can obtain from the slice header information data unit correspondingly overwrite parameters obtained from the parameter set data unit as the scanning mode available in the process of decoding the slice. The decoding module 1002 uses the parameters in the block layer data unit to determine the scanning mode used by the transform block in the decoded block. The decoding module 1002 includes the parameter of the scanning mode available in the decoding process into the data stream 11001.

In particular, if the number of size of the coefficient groups available on the decoder and the values thereof are fixed, the decoding module 1002 obtains the number of available size of the coefficient groups and the values thereof by reading information pre-stored in the decoder without parsing the code stream. In particular, if the scanning mode available on the decoder is fixed, the decoding module 1002 obtains the available scanning mode by reading information pre-stored in the decoder without parsing the code stream.

The decoding module 1002 parses the data unit corresponding to the transform block in the code stream and obtains, in addition to the size of the coefficient group and the scanning mode, parameters related to the transform coefficient, where the parameters include parameters indicating one or more of the following information: the position of the last non-zero coefficient in the transform block, whether the transform coefficients included in the coefficient group are all zero (or equivalently, whether the coefficient group includes non-zero transform coefficients), or the value of the transform coefficient (or the symbol of the transform coefficient or the absolute value of the transform coefficient). The decoding module 1002 also includes the above parameter in the data stream 11001.

The processing module 1006 determines a recovery value of the transform coefficient in the transform block. The input data of a transform coefficient recovery unit is the data stream 11001, and its output data is a data stream 11002. The data stream 11002 includes the transform coefficients of the transform blocks in the decoded block. In the data stream 11002, the transform coefficient can be represented in the form of an M×N two-dimensional matrix, where M and N are positive integers and M and N may be equal or unequal. The two-dimensional matrix may correspond to one transform block, and thus in the following description, the "transform block" is used to refer to the transform coefficients represented in the form of an M×N two-dimensional matrix. When indication information obtained by the decoding module 1002 by parsing the code stream indicates that the scaling (also referred to as inverse quantization) is performed on the transform block, the recovery value of the transform coefficient included in the data stream 11002 outputted by the processing module 1006 corresponds to the quantization value (i.e. "Level" value) of the coefficient outputted by a quantization unit 209 in the preceding encoder, and the decoder uses the data stream 11002 as the input data of an inverse quantization unit 305; otherwise, when the indication information obtained by the decoding module 1002 by parsing the code stream indicates that the scaling is not performed on the transform block, the recovery value of the transform coefficient included in the data stream 11002 outputted by the processing module 1006 corresponds to the data obtained by transforming the prediction residual outputted by a transform unit 84 in the preceding encoder, and the decoder uses the data stream 11002 as the input data of an inverse transform unit 306.

The processing module 1006 determines the position of each coefficient group included in the transform block according to the size of the transform block and the size of the coefficient group. The position of the coefficient group may be represented as the coordinates of the position of the upper left coefficient of the coefficient group in the transform block (or decoded picture). The processing module 1006 processes coefficient groups sequentially according to the order indicated by the scanning mode in the data stream 11001. For one coefficient group, the processing module 1006, according to the order indicated by the scanning mode, sets the values of the corresponding elements in the coefficient group to the values of the transform coefficients obtained by parsing the code stream. In particular, when the processing module 1006 obtains an indication indicating that the transform coefficients included in one coefficient group all are 0 (or equivalently, that this coefficient group does not include non-zero transform coefficients) from the data stream 11001, the parsing unit sets all the coefficients included in this coefficient group to 0. In particular, when the processing module 1006 obtains the position of the last non-zero coefficient from the data stream 11001, the parsing unit, according to the scanning mode, sets values of other coefficients after the position of the last non-zero coefficient to 0. In particular, the order for the processing module 1006 to process the coefficient groups in the transform block and the order to process the transform coefficients in the coefficient group may be the same or different. The processing module 1006 includes the recovered transform block (i.e., a transform coefficient represented in the form of a two-dimensional matrix (or other data forms equivalent to the two-dimensional matrix)) into the data stream 11002.

It is to be noted that the data stream refers to an entry parameter and a return parameter of a function on the software implementation, data transferred on a bus and data shared between storage units (including data shared by registers) on the hardware implementation, or the like.

It is to be noted that each module described above may be implemented by software or hardware. An implementation by hardware may, but may not necessarily, be performed in the following manners: the various modules described above are located in the same processor, or the various modules described above are located in their respective processors in any combination form.

Embodiment Five

Figure 12:
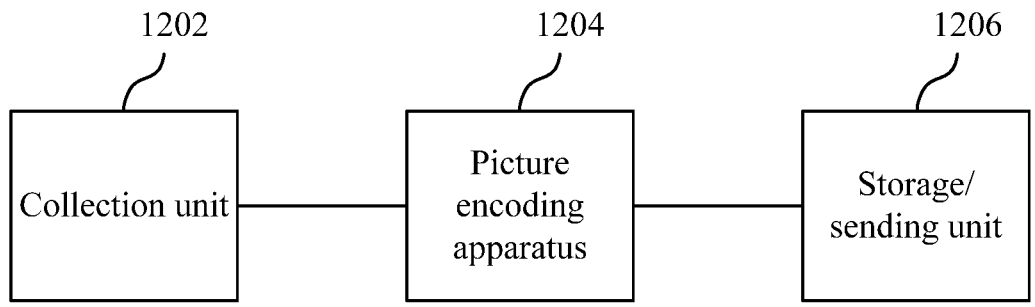
FIG. 12 is a diagram showing an electronic device including the apparatus for encoding a picture described above.

FIG. 12 is a diagram showing an electronic device including the abovementioned apparatus for encoding a picture. As shown in FIG. 12, the apparatus includes a collection unit 102, a picture encoding apparatus 1204, and a storage/sending unit 1206.

The collection unit 102 collects a video or picture. The acquisition unit 1202 may include at least one camera for acquiring a natural video or a natural picture. Optionally, the acquisition unit 1202 may also be provided with a camera for acquiring a depth video or a depth picture. Optionally, the acquisition unit may also be provided with an infrared camera. Optionally, the acquisition unit may also be provided with a remote sensing camera. The acquisition unit 1202 may include an apparatus or a device that generates a video or picture through radiation transmission or scanning.

Optionally, pre-processing may be performed on an input video or picture in the acquisition unit 1202, such as auto focus, auto white balance, auto exposure, backlight compensation, noise reduction, sharpening, splicing, increasing or decreasing image resolution, increasing or decreasing a video frame rate, and virtual view synthesis.

The acquisition unit 1202 may also receive a video or picture outputted by other devices or units. For example, the acquisition unit 1202 may be a component unit of a transcoder that inputs partially decoded pictures to the acquisition unit 1202. For example, the acquisition unit 1202 receives videos or pictures transmitted from other devices through a data connection.

It is to be noted that, in addition to videos or pictures, the acquisition unit 1202 may also acquire other media information such as audio. The acquisition unit 1202 may also receive artificially generated information such as texts, subtitles, and computer-generated pictures or videos.

The picture encoding apparatus 1204 is the encoder illustrated in FIG. 2. The input of the picture encoding apparatus 1204 is a video or picture outputted by the acquisition unit 1202. The picture encoding apparatus 1204 encodes the video or picture, and outputs a video or picture code stream. The storage/sending unit 1206 receives the video or picture code stream outputted by the picture encoding apparatus 1204 and performs system layer processing on the video or picture code stream, for example, performs encapsulation on the video or picture code stream according to standards such as a transmission protocol and a media file format. The storage/sending unit 1206 stores the transmission stream or media file obtained after the system layer processing into a memory of the electronic device, or sends the obtained transmission stream or media file through a wired or wireless network.

It is to be noted that in addition to the video or picture code stream outputted by the picture encoding apparatus 1204, the input of the storage/sending unit 1206 may also include audio code streams, text, subtitles, pictures, and the like. The storage/sending unit 1206 encapsulates these inputs and the code stream outputted by the picture encoding apparatus 1204 into the transmission stream or the media file according to standards such as a media file format and a transmission protocol.

The electronic device in this embodiment may be a device that can generate or process the video or picture code stream in a video communication application such as a mobile phone, a computer, a media server, a portable mobile terminal, a digital video camcorder, a digital camera, a television broadcasting system device, a content delivery network device, a surveillance camera, and a conference television system device.

Embodiment Six

Figure 13:
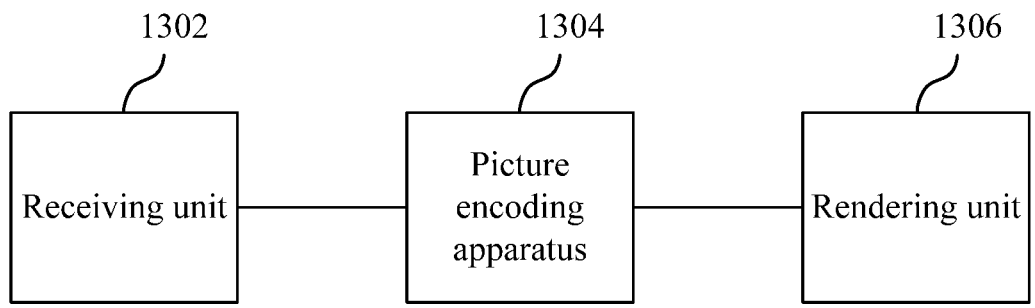
FIG. 13 is a diagram showing an electronic device including the apparatus for decoding a picture described above.

FIG. 13 is a diagram showing an electronic device including the abovementioned apparatus for decoding a picture. As shown in FIG. 13, the electronic device includes a receiving unit 1302, a picture decoding apparatus 1304, and a rendering unit 1306.

The receiving unit 1302 receives a video or picture code stream. The receiving unit 1302 receives the video or picture code stream through a wired or wireless network, reads a memory of the electronic device to obtain the video or picture code stream, or receives the video or picture code stream transmitted from other devices through a data connection.

The input of the receiving unit 1302 may also be a transmission stream or a media file that includes the video or picture code stream. The receiving unit 1302 extracts the video or picture code stream from the received transmission stream or media file according to standards such as a transmission protocol and a media file format.

The receiving unit 1302 outputs the video or picture code stream to the picture decoding apparatus 1304.

It is to be noted that in addition to the video or picture code stream, the output of the receiving unit 1302 may also include audio code streams, text, subtitles, pictures, and the like. The receiving unit 1302 transmits these outputs to the corresponding processing units in the electronic device. For example, the receiving unit 1302 outputs an audio code stream to an audio decoder included in the electronic device.

The picture decoding apparatus 1304 is the decoder illustrated in FIG. 3. The input of the picture decoding apparatus 1304 is a video or picture code stream outputted by the receiving unit 1302. The picture decoding apparatus 1304 decodes the video or picture code stream to output the decoded and recovered video or picture.

The rendering unit 1306 receives the decoded and recovered video or picture outputted by the picture decoding apparatus 1304. The rendering unit 1306 renders the decoded and recovered video or picture to a viewer. The rendering unit 1306 may be a component of the electronic device, such as a display screen, and may also be an independent device connected to the electronic device through a data connection, such as a projector and a display. Optionally, the rendering unit 1306 may perform post-processing on the decoded and recovered video or picture, such as auto focus, auto white balance, auto exposure adjustment, backlight compensation, noise reduction, sharpening, splicing, increasing or decreasing image resolution, increasing or decreasing a video frame rate, and virtual view synthesis.

It is to be noted that in addition to the decoded and recovered video or picture, the input of the rendering unit 1306 may also include media data outputted from other units in the electronic device, such as audio, text, subtitles, and pictures. The input of the rendering unit 1306 also includes artificially generated data such as labeled data such as lines drawn by a local lecturer on key content in a distance education application. The rendering unit 1306 superimposes the inputted media data and displays the superimposed data to the viewer.

The electronic device in this embodiment may be a device that can decode or process the video or picture code stream in a video communication application such as a mobile phone, a computer, a set-top box, a television, a player, a media server, a portable mobile terminal, a digital video camcorder, a digital camera, a television broadcasting system device, a content delivery network device, and a conference television system device.

Embodiment Seven

Figure 14:
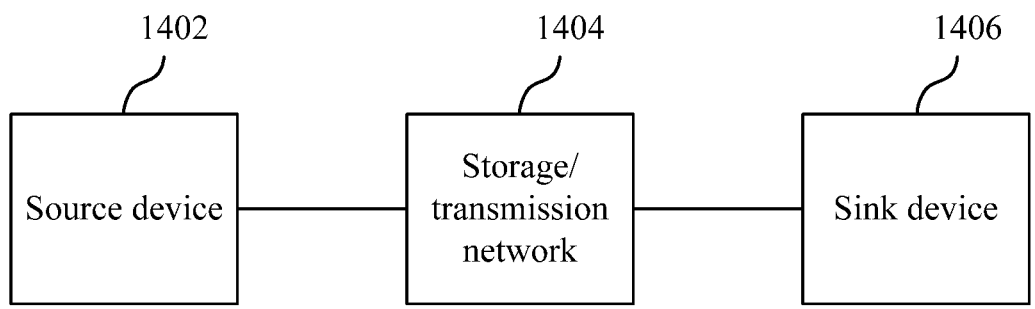
FIG. 14 is a diagram showing an electronic system including the electronic device described above.

FIG. 14 is a diagram showing an electronic system including the abovementioned electronic device. As shown in FIG. 14, the electronic system includes a source device 1402, a storage/transmission network 1404, and a sink device 1406.

The source device 1402 includes the electronic device illustrated in FIG. 12.

The storage/transmission network 1404 may include a memory in a device or electronic system or an external memory that performs data read and write operations through a data connection, and may also include a data transmission network composed of a wired network and a wireless network. The storage/transmission network 1404 provides a memory or a data transmission network for a storage/sending device in the source device 1402.

The source device 1406 includes the electronic device illustrated in FIG. 13. The receiving unit 901 in the sink device 1406 receives a video or picture code stream provided by the storage/transmission network 1404, a transmission stream including the video or picture code stream, or a media file including the video or picture code stream.

The electronic system in this embodiment may be a system or a device that can generate, store/transmit, and decode a video or picture code stream in a video communication application such as a mobile phone, a computer, an IPTV system, an OTT system, an Internet multimedia system, a digital television broadcasting system, a surveillance system, a portable mobile terminal, a digital video camcorder, a digital camera, and a conference television system device.

Embodiment Eight

This embodiment further provides a storage medium. The storage medium is configured to store a computer program. When the computer program is executed, the steps in any one of preceding method embodiments are performed.

Optionally, in the embodiment, the preceding storage medium may include, but is not limited to, a USB flash drive, a ROM, a RAM, a mobile hard disk, a magnetic disk, an optical disk or another medium capable of storing a computer program.

Apparently, it is to be understood by those skilled in the art that each of the modules or steps of the present application may be implemented by a general-purpose computing apparatus and may be concentrated on a single computing apparatus or distributed on a network formed by multiple computing apparatuses. Optionally, these modules or steps may be implemented by program codes executable by the computing apparatus. Thus, these modules or steps may be stored in a storage apparatus and executed by the computing apparatus. Moreover, in some cases, the illustrated or described steps may be executed in sequences different from the sequence described herein. Alternatively, these modules or steps may be implemented by being made into integrated circuit modules separately or multiple ones of these modules or steps may be implemented by being made into a single integrated circuit module. In this manner, the present application is not limited to any specific combination of hardware and software.

The above are merely preferred embodiments of the present application and are not intended to limit the present application. For those skilled in the art, the present application may have various modifications and variations. Any modification, equivalent substitution, improvement and the like made within the principle of the present disclosure shall fall within the scope of the present application.

What is claimed is:

1. A method for decoding a picture, comprising:
parsing a code stream, and determining a prediction value of a decoded block;
parsing the code stream, and determining a scanning mode of transform coefficients in the decoded block, a size of a coefficient group, and a value of a syntax element related to the transform coefficients;
processing, according to the scanning mode of the transform coefficients and the size of the coefficient group, at least one coefficient group in the decoded block, and converting the value of the syntax element into the transform coefficients;
processing the transform coefficients to obtain a recovery value of the transform coefficients;
performing at least one transform on the recovery value of the transform coefficients to obtain a prediction residual of the decoded block; and
determining a recovery value of the decoded block using the prediction value and the prediction residual;
wherein, the parsing the code stream and determining the size of the coefficient group comprises: parsing the code stream to obtain a first coefficient group parameter from a data unit in the code stream, and determining the size of the coefficient group according to the first coefficient group parameter; wherein the data unit in the code stream comprises at least one of: at least one parameter set, a slice header, or a block layer data unit;
the first coefficient group parameter comprises a first decoding parameter of the decoded block; and
the determining the size of the coefficient group according to the first coefficient group parameter comprises: setting the size of the coefficient group as a size of the coefficient group corresponding to the first decoding parameter according to the first decoding parameter of the decoded block, wherein the first decoding parameter comprises at least one of: a prediction mode of the decoded block, a transform type used by the transform block comprised in the decoded block, or a quantization parameter; and wherein the size of the coefficient group corresponding to the first decoding parameter is represented by W×H, W and H are positive integers, the transform coefficients in the decoded block are divided into the at least one coefficient group in the decoded block by the size of the coefficient group corresponding to the first decoding parameter, and each coefficient group in the decoded block includes W×H transform coefficients.

2. The method of claim 1, wherein the parsing the code stream, and determining the prediction value of the decoded block comprises at least one of:

parsing the code stream to obtain an inter prediction parameter of the decoded block, and determining the prediction value of the decoded block using at least one decoded picture as a reference picture according to the inter prediction parameter; or parsing the code stream to obtain an intra prediction parameter of the decoded block, and determining the prediction value of the decoded block using a decoded portion in a picture where the decoded block is located as a reference according to the intra prediction parameter.

3. The method of claim 1, wherein the determining the size of the coefficient group according to the first coefficient group parameter comprises:

determining the size of the coefficient group from candidate values of the size of the coefficient group according to first coefficient group parameter.

4. The method of claim 3, further comprising:

in response to the first coefficient group parameter comprising an identification parameter, configuring the candidate values of the size of the coefficient group using the identification parameter.

5. The method of claim 4, wherein the configuring the candidate values of the size of the coefficient group using the identification parameter comprises:

configuring the candidate values of the size of the coefficient group using the identification parameter through at least one of the following manners:

obtaining maximum and minimum values of the identification parameter, determining a value of the identification parameter excluding the maximum and minimum values according to a preset division manner, and setting the candidate values using all values of the identification parameter;

obtaining the maximum value of the identification parameter and a maximum division hierarchy of the coefficient group, determining a value of the identification parameter excluding the maximum value according to the preset division manner, and setting the candidate values using all values of the identification parameter;

obtaining the maximum value of the identification parameter and a different between maximum and minimum values of the size of the identification parameter, determining a value of the identification parameter excluding the maximum value according to the preset division manner, and setting the candidate values using all values of the identification parameter;

obtaining the minimum value of the identification parameter and a maximum upward division hierarchy of the coefficient group, determining a value of the identification parameter excluding the minimum value according to the preset division manner, and setting the candidate values using all values of the identification parameter; or obtaining the maximum value of the identification parameter and the different between the maximum and minimum values of the size of the identification parameter, determining a value of the identification parameter excluding the minimum value according to the preset division manner, and setting the candidate values using all values of the identification parameter.

6. The method of claim 1, wherein setting the size of the coefficient group as the size of the coefficient group corresponding to the first decoding parameter comprises:

in response to a value of the quantization parameter being equal to a second preset value, setting the size of the coefficient group as a size of the coefficient group corresponding to the second preset value;

or in response to the value of the quantization parameter being within a first preset value range, setting the size of the coefficient group as a size of the coefficient group corresponding to the first preset value range.

7. The method of claim 1, wherein the parsing the code stream and determining the scanning mode of the transform coefficients comprises:

parsing the data unit in the code steam to obtain a first scanning mode parameter, and determining the scanning mode of the transform coefficients according to the first scanning mode parameter;

wherein the scanning mode is an order to process elements in a two-dimensional matrix of the transform coefficients, and the data unit in the code stream comprises at least one of: at least one parameter set, a slice header, or a block layer data unit.

8. The method of claim 7, wherein the determining the scanning mode of the transform coefficients according to the first scanning mode parameter comprises:

using a scanning mode indicated by the first scanning mode parameter as the scanning mode of the transform coefficients.

9. The method of claim 8, wherein the using the scanning mode indicated by the first scanning mode parameter as the scanning mode of the transform coefficients comprises:

determining the scanning mode of the transform coefficients from candidate scanning modes according to the first scanning mode parameter.

10. The method of claim 9, wherein the candidate scanning modes comprise at least one of:

at least one fixed scanning mode, or the candidate scanning mode configured using the first scanning mode parameter.

11. The method of claim 7, wherein the determining the scanning mode of the transform coefficients according to the first scanning mode parameter comprises:

the first scanning mode parameter comprising a second decoding parameter of the decoded block; and determining the scanning mode of the transform coefficients according to the second decoding parameter, wherein the second decoding parameter comprises at least one of: a size of a transform block comprised in the decoded block, a prediction mode of the decoded block, a transform type used by the transform block comprised in the decoded block, or a size of the decoded block.

12. The method of claim 11, wherein determining the scanning mode of the transform coefficients according to the second decoding parameter comprises:

in response to the prediction mode of the decoded block being equal to a second preset mode, setting the scanning mode of the transform coefficients as a scanning mode corresponding to the second preset mode.

13. The method of claim 11, wherein determining the scanning mode of the transform coefficients according to the second decoding parameter comprises:
in response to the transform type used by the transform block comprised in the decoded block being equal to a second transform type, setting the scanning mode of the transform coefficients as a scanning mode corresponding to the second transform type.

14. The method of 11, wherein determining the scanning mode of the transform coefficients according to the second decoding parameter comprises:
in response to the size of the decoded block being equal to a fourth preset value, setting the scanning mode of the transform coefficients as a scanning mode corresponding to the fourth preset value.

15. The method of claim 1, wherein
the syntax element comprises at least one of:
a syntax element indicating a starting position of a non-zero coefficient;
a syntax element indicating that a coefficient group comprises a non-zero coefficient;
a syntax element indicating a position of a non-zero coefficient in a coefficient group; or
a syntax element indicating a value of a non-zero coefficient in a coefficient group.

16. The method of claim 1, wherein processing the transform coefficients to obtain the recovery value of the transform coefficients comprises:
in response to determining to perform scaling processing on the transform coefficients, performing the scaling processing on the transform coefficients to obtain the recovery value of the transform coefficients; or
in response to determining not to perform scaling processing on the transform coefficients, setting the recovery value of the transform coefficients using the transform coefficients.

17. The method of claim 16, before processing the transform coefficients, further comprising:
parsing the code stream to obtain a third parameter for constructing a recovery value of the prediction residual of the decoded block; and
determining whether to perform the scaling processing on the transform coefficients according to the third parameter;
wherein determining the recovery value of the decoded block using the prediction value and the prediction residual comprises:
performing in-loop filtering processing on a sum of the prediction value and the prediction residual.

18. An apparatus for decoding a picture, comprising:
a decoding module, which is configured to parse a code stream, and determine a prediction value of a decoded block, a scanning mode of transform coefficients in the decoded block, a size of a coefficient group, and a value of a syntax element related to the transform coefficients;
a conversion module, which is configured to, according to the scanning mode of the transform coefficients and the size of the coefficient group, process at least one coefficient group in the decoded block, and convert the syntax element into the transform coefficients;
a processing module, which is configured to process the transform coefficients to obtain a recovery value of the transform coefficients;
a transform module, which is configured to perform at least one transform on the recovery value of the transform coefficients to obtain a prediction residual of the decoded block; and
a calculation module, which is configured to determine a recovery value of the decoded block using the prediction value and the prediction residual;
wherein, the decoding module is configured to parse a code stream and determine the size of the coefficient group in the following manner parsing the code stream to obtain a first coefficient group parameter from a data unit in the code stream, and determining the size of the coefficient group according to the first coefficient group parameter; wherein the data unit in the code stream comprises at least one of: at least one parameter set, a slice header, or a block layer data unit;
the first coefficient group parameter comprises a first decoding parameter of the decoded block; and
the decoding module is configured to determine the size of the coefficient group according to the first coefficient group parameter in the following manner setting the size of the coefficient group as a size of the coefficient group corresponding to the first decoding parameter according to the first decoding parameter of the decoded block, wherein the first decoding parameter comprises at least one of: a prediction mode of the decoded block, a transform type used by the transform block comprised in the decoded block, or a quantization parameter; and
wherein the size of the coefficient group corresponding to the first decoding parameter is represented by W×H, W and H are positive integers, the transform coefficients in the decoded block are divided into the at least one coefficient group in the decoded block by the size of the coefficient group corresponding to the first decoding parameter, and each coefficient group in the decoded block includes W×H transform coefficients.

* * * * *